US012801906B2

(12) United States Patent
Sanchez et al.

(10) Patent No.: US 12,801,906 B2
(45) Date of Patent: Nov. 17, 2026

(54) NEURAL NETWORK ACCELERATOR WITH CONFIGURABLE POOLING PROCESSING UNIT

(71) Applicant: Imagination Technologies Limited, Kings Langley (GB)

(72) Inventors: Javier Sanchez, Hertfordshire (GB); David Hough, Hertfordshire (GB); Alan Vines, Hertfordshire (GB)

(73) Assignee: Imagination Technologies Limited, Kings Langley (GB)

(*) Notice: Subject to any disclaimer, the term of this patent is extended or adjusted under 35 U.S.C. 154(b) by 901 days.

(21) Appl. No.: 18/092,095

(22) Filed: Dec. 30, 2022

(65) Prior Publication Data

US 2023/0259743 A1 Aug. 17, 2023

(30) Foreign Application Priority Data

Dec. 31, 2021 (GB) ..................................... 2119144
Dec. 31, 2021 (GB) ..................................... 2119145

(51) Int. Cl.

*G06N 3/063* (2023.01)
*G06F 17/15* (2006.01)
*G06N 3/0464* (2023.01)

(52) U.S. Cl.

CPC ........... *G06N 3/063* (2013.01); *G06F 17/153* (2013.01); *G06N 3/0464* (2023.01)

(58) Field of Classification Search

CPC ............ G06F 17/15–153; G06F 17/16; G06N 3/0464; G06N 3/0495; G06N 3/06; G06N 3/063

See application file for complete search history.

(56) References Cited

U.S. PATENT DOCUMENTS

2015/0309961 A1* 10/2015 Ozaki ..................... G06F 17/10 706/16
2018/0189649 A1* 7/2018 Narayan ............... G06F 1/3243
(Continued)

FOREIGN PATENT DOCUMENTS

EP 3480749 A1 * 5/2019 ............ G06N 3/045
EP 4206993 A1 7/2023
(Continued)

OTHER PUBLICATIONS

Wu, Ning, et al. "A reconfigurable convolutional neural network-accelerated coprocessor based on RISC-V instruction set." Electronics 9.6 (2020): 1005. (Year: 2020).*
(Continued)

*Primary Examiner* — Matthew D Sandifer
(74) *Attorney, Agent, or Firm* — Potomac Law Group, PLLC; Vincent M DeLuca

(57) ABSTRACT

A neural network accelerator includes a plurality of hardware processing units, each hardware processing unit comprising hardware to accelerate performing one or more neural network operations on data; and a crossbar coupled to each hardware processing unit of the plurality of hardware processing units and configured to selectively form, from a plurality of selectable pipelines, a pipeline from one or more of the hardware processing units of the plurality of hardware processing units to process input data to the neural network accelerator. The plurality of hardware processing units comprising (i) a convolution processing unit configured to accelerate performing convolution operations on data, and (ii) a configurable pooling processing unit configured to selectively perform an operation of a plurality of selectable operations on data, the plurality of selectable operations comprising a depth-wise convolution operation and one or more pooling operations.

20 Claims, 26 Drawing Sheets

(56) References Cited

U.S. PATENT DOCUMENTS

| | | | | |
|---|---|---|---|---|
| 2018/0315153 | A1* | 11/2018 | Park | G06F 17/153 |
| 2019/0087718 | A1 | 3/2019 | Martin et al. | |
| 2019/0138567 | A1* | 5/2019 | Martin | G06F 17/153 |
| 2019/0294413 | A1 | 9/2019 | Vantrease et al. | |
| 2020/0293867 | A1 | 9/2020 | Shao et al. | |
| 2021/0182594 | A1 | 6/2021 | Ha | |
| 2021/0295140 | A1 | 9/2021 | Holm et al. | |
| 2021/0374508 | A1 | 12/2021 | Whatmough et al. | |
| 2022/0044114 | A1 | 2/2022 | Sriram et al. | |
| 2023/0062910 | A1 | 3/2023 | Desoli et al. | |

FOREIGN PATENT DOCUMENTS

| | | | | |
|---|---|---|---|---|
| EP | 4206996 | A1 | 7/2023 | |
| GB | 2560600 | A | 9/2018 | |
| GB | 2582868 | A * | 10/2020 | G06N 3/08 |

OTHER PUBLICATIONS

Liu et al., "An FGPA-Based CNN Accelerator Integrating Depthwise Separable Convolution," Electronics, vol. 8, No. 281, 2019, 18 pages.

Gopalakrishnan et al., "Hardware-friendly Neural Network Architecture for Neuromorphic Computing," arXiv:1906.08853, Cornell University Library, 2019, 18 pages.

* cited by examiner

NEURAL NETWORK ACCELERATOR WITH CONFIGURABLE POOLING PROCESSING UNIT

TECHNICAL FIELD

This application is directed to neural network accelerators.

BACKGROUND

A Deep Neural Network (DNN) is a form of artificial neural network comprising a plurality of interconnected layers that can be used for machine learning applications. In particular, a DNN can be used in signal processing applications, including, but not limited to, image processing and computer vision applications. FIG. 1 illustrates an example DNN 100 that comprises a plurality of layers 102, 104, 106. Each layer 102, 104, 106 receives input data, and processes the input data in accordance with the layer to produce output data. The output data is either provided to another layer as the input data, or is output as the final output data of the DNN. For example, in the DNN 100 of FIG. 1, the first layer 102 receives the original input data 108 to the DNN 100, and processes the input data in accordance with the first layer 102 to produce output data 110. The output data 110 of the first layer 102 becomes the input data to the second layer 104, and the second layer 104 processes the input data 110 in accordance with the second layer 104 to produce output data 112. The output data 112 of the second layer 104 becomes the input data to the third layer 106, and the third layer 106 processes the input data 112 in accordance with the third layer 106 to produce output data 114. The output data 114 of the third layer 106 is then output as the final output data of the DNN. Where the DNN is used for classification, the output data 114 may be a vector of length A, wherein A is the number of classes and each value in the vector represents the probability of a certain class.

The data input to and output from a layer of a DNN can be described as a tensor. As is known to those of skill in the art, a tensor is a generalization of vectors and matrices and can be described as an n-dimensional array. A vector is a one-dimensional tensor, and a matrix is a two-dimensional tensor. The tensors in a DNN are often, but are not necessarily, three-dimensional. Reference is made to FIG. 2 which illustrates an example three-dimensional (3D) tensor 200. The 3D tensor 200 may be described as C planes of data, where each plane has a dimension H×W. Each plane may be referred to as a channel of the tensor. Akin to how an element of a picture is referred to as a pixel, an element of a tensor may be referred to as a tensel.

The processing that is performed on the input data to a layer depends on the type of layer. For example, each layer of a DNN may be one of a plurality of different types. Example DNN layer types include, but are not limited to, a convolution layer, an activation layer, a normalisation layer, a pooling layer, and a fully connected layer. It will be evident to a person of skill in the art that these are example DNN layer types and that this is not an exhaustive list and there may be other DNN layer types.

A convolution layer convolves the input data with weights associated with the layer. Specifically, each convolution layer is associated with a plurality of weights $k_0 \ldots k_g$, which may also be referred to as filter weights or coefficients. The weights are grouped to form, or define, one or more filters or kernels, and each filter may be associated with an offset bias bias. Each filter may have a dimension M×N×C (i.e. each filter may comprise a set of M×N×C weights k) and may be applied to the input data according to a convolution operation across steps $s_W$ and $s_H$ in the W and H directions as shown in FIG. 2. The step sizes $s_W$ and $s_H$ may be referred to as the strides of the convolution. The number of filters and/or the number of weights per filter may vary between convolution layers. A convolutional neural network (CNN), which is a specific type of DNN that is effective for image recognition and classification, generally comprises a plurality of convolution layers.

An activation layer, which typically, but not necessarily follows a convolution layer, applies one or more activation functions to the input data to the layer. An activation function receives an input tensor and performs a certain non-linear mathematical operation on each value or element in the input tensor. In other words, the activation function operates on each value or element in the input tensor separately. In some examples, an activation layer may act as rectified linear unit (ReLU) by implementing an ReLU function (i.e. $f(x)=\max(0, x)$) or a Parametric Rectified Linear Unit (PReLU) by implementing a PreLU function.

A normalisation layer is configured to perform a normalising function, such as a Local Response Normalisation (LRN) function on the input data. A pooling layer, which is typically, but not necessarily inserted between successive convolution layers, performs a pooling function, such as a max, min or average function, to summarise subsets of the input data. The purpose of a pooling layer is thus to reduce the spatial size of the representation to reduce the number of parameters and computation in the network, and hence to also control overfitting.

A fully connected layer, which typically, but not necessarily follows a plurality of convolution and pooling layers takes a three-dimensional set of input data values and outputs a vector of length A. Where the DNN is used for classification, A may be the number of classes, and each value in the vector may represent the probability of a certain class. The vector of length A is generated through a matrix multiplication of a set of weights, optionally followed by a bias offset. A fully connected layer thus receives a set of weights and a bias.

Accordingly, each layer of a DNN receives input data values (e.g. an input tensor) and generates output data values (e.g. an output tensor); and some layers (such as, but not limited to, convolution layers and fully-connected layers) also receive weights and/or biases.

DNNs are often computationally complex to implement. Accordingly, neural network accelerators have been developed that allow neural networks, including DNNs, to be implemented in an efficient manner (e.g. in a manner that requires less silicon area or less processing power).

The embodiments described below are provided by way of example only and are not limiting of implementations which solve any or all of the disadvantages of known neural network accelerators and/or components thereof.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are neural network accelerators. The neural network accelerators include: a plurality of hardware processing units, each hardware processing unit comprising hardware to accelerate performing one or more neural network operations on data; and a crossbar coupled to each hardware processing unit of the plurality of hardware processing units and configured to selectively form, from a plurality of selectable pipelines, a pipeline from one or more of the hardware processing units of the plurality of hardware processing units to process input data to the neural network accelerator. The plurality of hardware processing units comprising (i) a convolution processing unit configured to accelerate performing convolution operations on data, and (ii) a configurable pooling processing unit configured to selectively perform an operation of a plurality of selectable operations on data, the plurality of selectable operations comprising a depth-wise convolution operation and one or more pooling operations.

A first aspect provides a neural network accelerator comprising: a plurality of hardware processing units, each hardware processing unit comprising hardware to accelerate performing one or more neural network operations on data, the plurality of hardware processing units comprising (i) a convolution processing unit configured to accelerate performing convolution operations on data, and (ii) a configurable pooling processing unit configured to selectively perform an operation of a plurality of selectable operations on data, the plurality of selectable operations comprising a depth-wise convolution operation and one or more pooling operations; and a crossbar coupled to each hardware processing unit of the plurality of hardware processing units, the crossbar configured to selectively form, from a plurality of selectable pipelines, a pipeline from one or more of the hardware processing units of the plurality of hardware processing units to process input data to the neural network accelerator.

At least two of the plurality of selectable pipelines may comprise a same set of two or more hardware processing units of the plurality of hardware processing units in a different order.

The one or more pooling operations comprises an average pooling operation, a minimum pooling operation and/or a maximum pooling operation.

The configurable pooling processing unit may comprise one or more pool engines, each pool engine configurable to receive tensels of a channel of an input tensor and generate one of a plurality of different types of channel outputs, the plurality of different types of channel outputs comprising a depth-wise convolution channel output and one or more pooling operation channel outputs.

The one or more pooling operations may comprise an average pooling operation.

Each of the one or more pool engines may comprise a reduction engine configurable to generate for a block of tensels of a channel of the input tensor, one of a plurality of types of block outputs, the plurality of types of block outputs comprising a sum of tensels in the block and a weighted sum of tensels in the block; and a division engine configurable to selectively perform a division operation on the block output generated by the reduction engine. When an average pooling operation is to be performed on the input tensor, the reduction engine may be configured to generate a sum of tensels in the block and the division engine is enabled to divide the block output generated by the reduction engine by a number of tensels in the block. When a depth-wise convolution operation is to be performed on the input tensor, the reduction engine may be configured to generate a weighted sum for the block and the division engine is disabled.

A block of tensels may comprise one or more rows of tensels and one or more columns of tensels, and the reduction engine may be configured to generate a block output by generating column outputs and generating the block output from one or more column outputs.

When an average pooling operation is to be performed on the input tensor, the reduction engine may be configured to generate a sum for each column of a block, and generate the sum for the block by summing the appropriate column sums, and when a depth-wise convolution operation is to be performed on the input tensor, the reduction engine may be configured to generate a weighted sum for each column of a block, and generate the weighted sum for the block by summing the appropriate column weighted sums.

The reduction engine may comprise: a vertical pool engine configurable to receive a column of tensels and generate one of a plurality of types of column outputs for that column; a collector storage unit configured to temporarily store the column outputs generated by the vertical pool engine; and a horizontal pool engine configured to generate a block output from the appropriate column outputs stored in the collector storage unit.

When an average pooling operation is to be performed on the input tensor, the vertical pool engine may be is configured to receive a column of tensels in a block and generate a sum of the received tensels; and when a depth-wise convolution operation is to be performed on the input tensor, the vertical pool engine may be configured to receive a column of tensels in a block, and generate a plurality of weighted sums based on the received tensels, each weighted sum based on a different set of weights.

The configurable pooling processing unit may be configured to receive an input tensor from the crossbar in one or more of a front end processing order and a partial back end processing order, the input tensor comprising a width dimension, a height dimension and a channel dimension; wherein in the front end processing order tensels of the input tensor are received in channel order, width order and height order on a block basis, each block comprising tensels of the input tensor in a same channel and at a same height; and wherein in the partial back end processing order tensels of the input tensor are received in a width order up to a maximum number of widths, channel order and height order on a block basis, each block comprising tensels of the input tensor at a same height and a same width.

The neural network accelerator may be configured to process a neural network in a plurality of hardware passes of the neural network accelerator, wherein, in a hardware pass of the neural network accelerator, the neural network accelerator may be configured to load input data into the neural network accelerator and process the input data via a pipeline of the plurality of selectable pipelines.

The crossbar may be configured to receive, for a hardware pass, information identifying a pipeline of the plurality of selectable pipelines to be formed in that hardware pass.

The neural network accelerator may further comprise a data input unit configurable to receive the input data to the neural network accelerator and output the received input data to an output port of the data input unit; wherein the output port of the data input unit may be coupled to the crossbar and the crossbar may be configured to selectively connect the output port of the data input unit to an input port of a hardware processing unit of the plurality of the hardware processing units.

The neural network accelerator may further comprise a second data input unit configurable to receive the input data to the neural network accelerator and output the received input data to an output port of the second input data unit; wherein the output port of the second data input unit may be coupled to the crossbar and the crossbar may be configured to selectively connect the output port of the second data input unit to an input port of a hardware processing unit of the plurality of hardware processing units.

The plurality of hardware processing units may comprise an element-wise operations processing unit configured to accelerate performing one or more element-wise operations on a set of data, the element-wise operations processing unit may be configurable to perform the one or more element-wise operations using secondary input data; and the second data input unit may be configurable to receive one of the input data to the neural network accelerator and the secondary input data.

The plurality of hardware processing units may comprise an activation processing unit configured to accelerate applying an activation function to data, and at least one of the hardware processing units of the plurality of hardware processing units may comprise logic configured to apply an activation function to data generated by that hardware processing unit prior to outputting the generated data.

The plurality of hardware processing units may comprise a plurality of tensel rescale processing units, each tensel rescale processing unit may be configurable to receive a tensor comprising one or more channels, and quantise the received tensor on a per tensor or a per channel basis to an affine fixed point number format.

The crossbar may comprise a plurality of input ports, a plurality of output ports, and a plurality of multiplexors that selectively connect the input ports of the crossbar to the output ports of the crossbar.

The plurality of multiplexors may comprise an output port multiplexor for each output port of the crossbar, each output port multiplexor configured to selectively connect one of a subset of the plurality of input ports of the crossbar to that output port of the crossbar (320).

The plurality of hardware processing units may comprise one or more of an activation processing unit configured to accelerate applying an activation function to data, an element-wise operations processing unit configured to accelerate performing one or more element-wise operations on a set of data, a normalisation processing unit configured to accelerate applying a normalisation function to data, and an interleave processing unit configured to accelerate rearrangement of data.

A second aspect provides a method of processing a neural network at a neural network accelerator, the neural network being processed in one or more hardware passes of the neural network accelerator, the method comprising, for at least one hardware pass of the one or more hardware passes: receiving, at the neural network accelerator, information identifying a pipeline of a plurality of selectable pipelines, each pipeline of the plurality of selectable pipelines being formed of one or more hardware processing units of a plurality of hardware processing units, each hardware processing unit of the plurality of hardware processing units comprising hardware to accelerate performing one or more neural network operations on data, the plurality of hardware processing units comprising (i) a convolution processing unit configured to accelerate performing convolution operations on data, and (ii) a configurable pooling processing unit configured to selectively perform an operation of a plurality of selectable operations on data, the plurality of selectable operations comprising a depth-wise convolution operation and one or more pooling operations; dynamically connecting the one or more processing units of the identified pipeline to form the identified pipeline; and processing input data for the hardware pass using the formed pipeline to generate processed data for the hardware pass.

The configurable pooling processing units and the neural network accelerators described herein may be embodied in hardware on an integrated circuit. There may be provided a method of manufacturing, at an integrated circuit manufacturing system, a configurable pooling processing unit or a neural network accelerator described herein. There may be provided an integrated circuit definition dataset that, when processed in an integrated circuit manufacturing system, configures the system to manufacture a configurable pooling processing unit or neural network accelerator described herein. There may be provided a non-transitory computer readable storage medium having stored thereon a computer readable description of a configurable pooling processing unit or a neural network accelerator described herein that, when processed in an integrated circuit manufacturing system, causes the integrated circuit manufacturing system to manufacture an integrated circuit embodying the configurable pooling processing unit or the neural network accelerator.

There may be provided an integrated circuit manufacturing system comprising: a non-transitory computer readable storage medium having stored thereon a computer readable description of a configurable pooling processing unit or a neural network accelerator described herein; a layout processing system configured to process the computer readable description so as to generate a circuit layout description of an integrated circuit embodying the configurable pooling processing unit or the neural network accelerator; and an integrated circuit generation system configured to manufacture an integrated circuit embodying the configurable pooling processing unit or the neural network accelerator according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
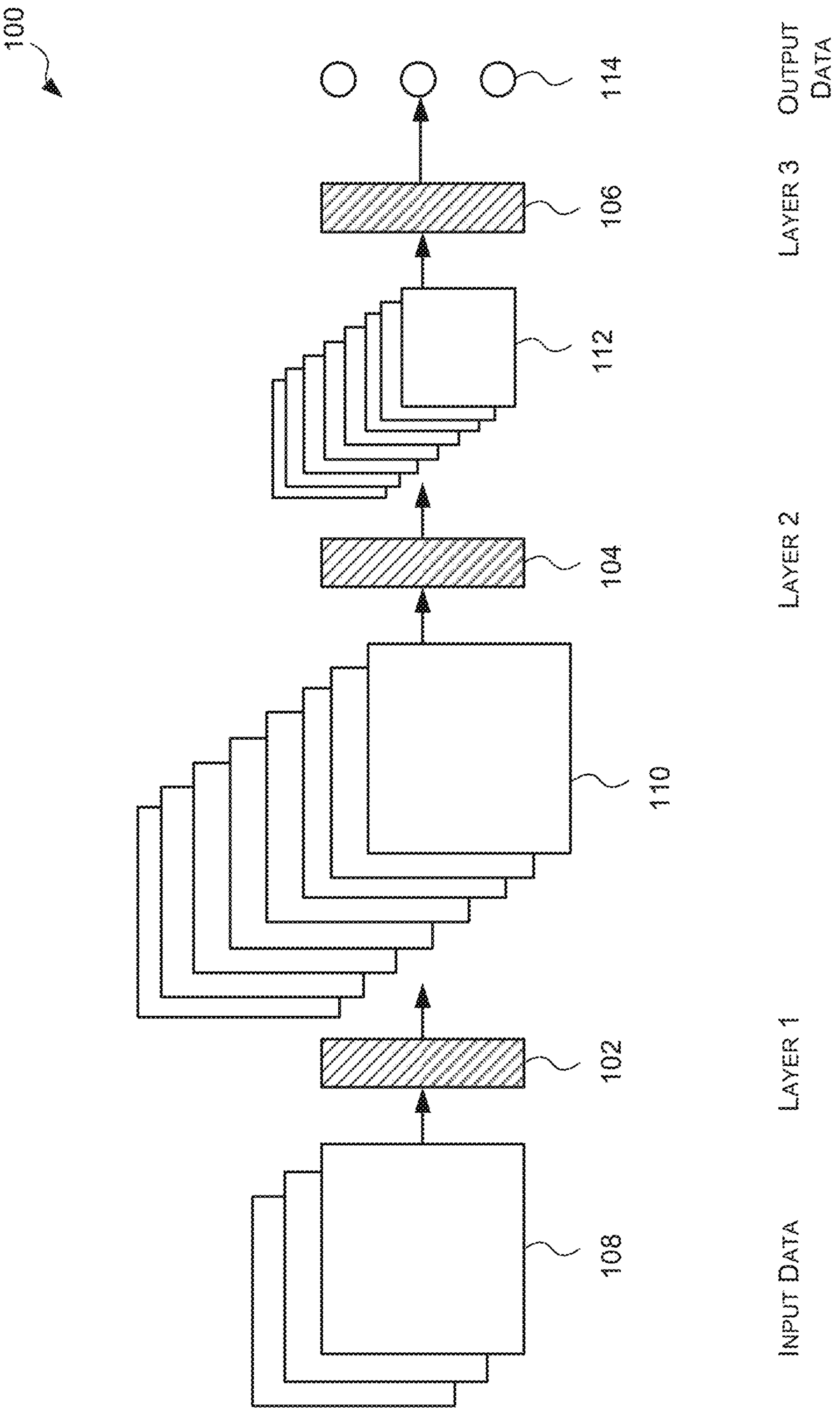
FIG. 1 is a schematic diagram of an example deep neural network (DNN)

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

A neural network accelerator (NNA) is hardware that is designed to accelerate the processing of a neural network (NN). As is known to those of skill in the art, a hardware accelerator is hardware designed to perform a specific set of one or more functions more efficiently than a general processing unit, such as a central processing unit (CPU). Accordingly, in contrast to a general CPU which can be configured to perform any number of functions, an accelerator can only perform a limited set of one or more functions. NNAs have one or more hardware processing units which are each designed to accelerate one or more neural network operations. Each hardware processing is therefore itself a hardware accelerator. A neural network operation is defined herein as an operation that is used to implement all or a part of a neural network layer. A neural network layer may be implemented by one or more neural network operations. Example neural network operations include, but are not limited to convolution operations, non-linear operations, pooling operations and normalisation operations.

An NNA may, therefore, have, for example, a convolution processing unit which is configured to accelerate convolution operations, an activation processing unit which is configured to accelerate non-linear operations, a pooling processing unit which is configured to accelerate pooling operations, and/or a normalisation processing unit configured to accelerate normalisation operations. It will be evident to a person of skill in the art that this is just an example set of hardware processing units that an NNA may have, and NNAs may have additional hardware processing units, fewer hardware processing units or a different combination of hardware processing units.

Some NNAs, such as that described in the Applicant's Published GB Patent Application No. 2566702, which is herein incorporated by reference in its entirety, may be configured to process or implement a NN over a number of hardware passes of the NNA. A hardware pass of the NNA is defined herein as the loading of input data into the NNA and processing the input data using one or more hardware processing units of the NNA to generate processed data, or output data. The output data of a hardware pass may be output from the NNA to memory or, stored in the NNA for use in a subsequent hardware pass. The memory which is used to store the output data of a hardware pass may be memory that is external to the NNA, but is internal to the chip on which the NNA is situated (i.e. on-chip memory), or memory that is external to the NNA and is external to the chip on which the NNA is situated (i.e. off-chip memory).

In some NNAs, to allow the input data for a hardware pass to be processed by more than one hardware processing unit in a hardware pass, the hardware processing units may be configured in a fixed order pipeline. As is known to those of skill in the art, a pipeline comprises a set of processing units wherein the output of a processing unit in the set is the input to a processing unit in the set. For example, if the NNA comprises a convolution processing unit, an activation processing unit, a normalisation processing unit and a pooling processing unit, the hardware processing units may be connected to form a pipeline such that the input data can be processed by the convolution processing unit, activation processing unit, normalisation processing unit and then the pooling processing unit in a hardware pass. NNAs may have the pipeline configured to allow the input data to be processed by the convolution processing unit and then the activation processing unit since classical neural networks comprise sequences of a convolution layer followed by an activation layer. Furthermore, to allow input data to be only processed by a single hardware processing unit in a hardware pass, the NNA may allow any of the hardware processing units in the pipeline to be bypassed in a hardware pass. A hardware processing unit may be by-passed by either (i) having a by-pass path so that the data is not input to the hardware processing unit; or (ii) configuring the hardware processing unit to simply pass the received data to the output. However, as the pipeline is fixed, the order in which the hardware processing units process data in a hardware pass is fixed.

While fixed pipeline structures are designed to take advantage of the structure of classical neural networks, the order of the layers (and thus operations) in a NN can be arbitrary. Furthermore, as the use of NNs continues to expand and evolve, more and more neural networks are being developed that do not have the classical structure. Therefore, having a fixed order pipeline limits the efficiency of the NNA in processing some neural networks. For example, if a NN comprises a pooling layer followed by a convolution layer, then an NNA with a fixed hardware pipeline comprising a convolution processing unit followed by an activation processing unit would have to implement such a sequence in two hardware passes since activation operations cannot precede convolution operations in the same hardware pass.

Accordingly, as described in the applicant's UK Patent Application no. 2114052.0, which is herein incorporated by reference in its entirety, the Applicant developed an NNA with a configurable pipeline of hardware processing units. Specifically, in such NNAs the hardware processing units are connected to a crossbar which can selectively, on a per hardware pass basis, form one of a plurality of pipelines from the hardware processing units (i.e. dynamically connect a selected set of the hardware processing units in a selected order to form a pipeline therefrom). This allows different pipelines of hardware processing units to be implemented in different hardware passes. For example, in a first hardware pass the crossbar may be configured to form a pipeline that comprises the activation processing unit followed by the convolution processing unit such that input data to the NNA can be processed by the activation processing unit and then the convolution processing unit; and in a second hardware pass the crossbar may be configured to form a pipeline that comprises the convolution processing unit, the activation processing unit and the pooling processing unit such that input data to the NNA can be processed by the convolution processing unit, the activation processing unit and then the pooling processing unit. Therefore, in such NNAs, not only are the hardware processing units that are active (i.e. process data) in a hardware pass configurable, but the order in which the hardware processing units process data in a hardware pass is also configurable.

The hardware processing units that are active, or process data, in a hardware pass, and optionally, the order of the active hardware processing units, may be determined, for example, in software, based on the order of the layers in the NN, the available hardware processing units and the size of the NNA storage units. Specifically, there may be a software tool that is configured to map the neural network to a set of operations that can be performed by the NNA and then group those operations into hardware passes in a greedy fashion either from the start or the end of the NN. For example, the software tool may first group the layers of the NN into layer groups where a layer group is a group of layers in which the operations used to implement those layers could be performed in a single hardware pass of the NNA. A layer group may, in some cases, be further split into smaller chunks each of which can be executed in a hardware pass. A layer group may be split into smaller chunks due to hardware restrictions on the amount of processing that can be performed in a hardware pass or the amount of data that can be stored in a hardware pass. For example, a convolution layer may comprise 64 filters, but the NNA may only be able to perform a convolution with up to 32 filters in a hardware pass. In such cases, 32 of the filters may be processed in a first hardware pass, and the remaining 32 filters may be processed in a second hardware pass. The more operations that can be performed in a hardware pass, the more efficiently the NN can be implemented as this minimises the number of memory reads and writes, and increases the performance by allowing the processing of a subsequent operation to start before the previous operation has completed.

Once the software tool has identified a set of hardware passes to implement an NNA, control or command information may be sent to the NNA for each hardware pass that indicates to the NNA how it should configure itself for that hardware pass.

Such NNAs may have a convolution processing unit that is configured to accelerate convolution operations and any convolution operation used to implement a NN is processed by the convolution processing unit. Where hardware processing units can only be used once in a hardware pass of the NNA, this means that only one convolution operation can be performed in a hardware pass.

Such convolution processing units may be designed to efficiently implement a 2D convolution. As is known to those of a skill in the art, in a 2D convolution the weights form a plurality of 3D filters, and each of the plurality of filters is convolved with a 3D input tensor. Each filter has the same number of channels as the input tensor and produces one channel of the output. Therefore, if there are L filters, there are L channels in the output. Accordingly, the number of filters may also be referred to as the number of output channels.

Figure 3:
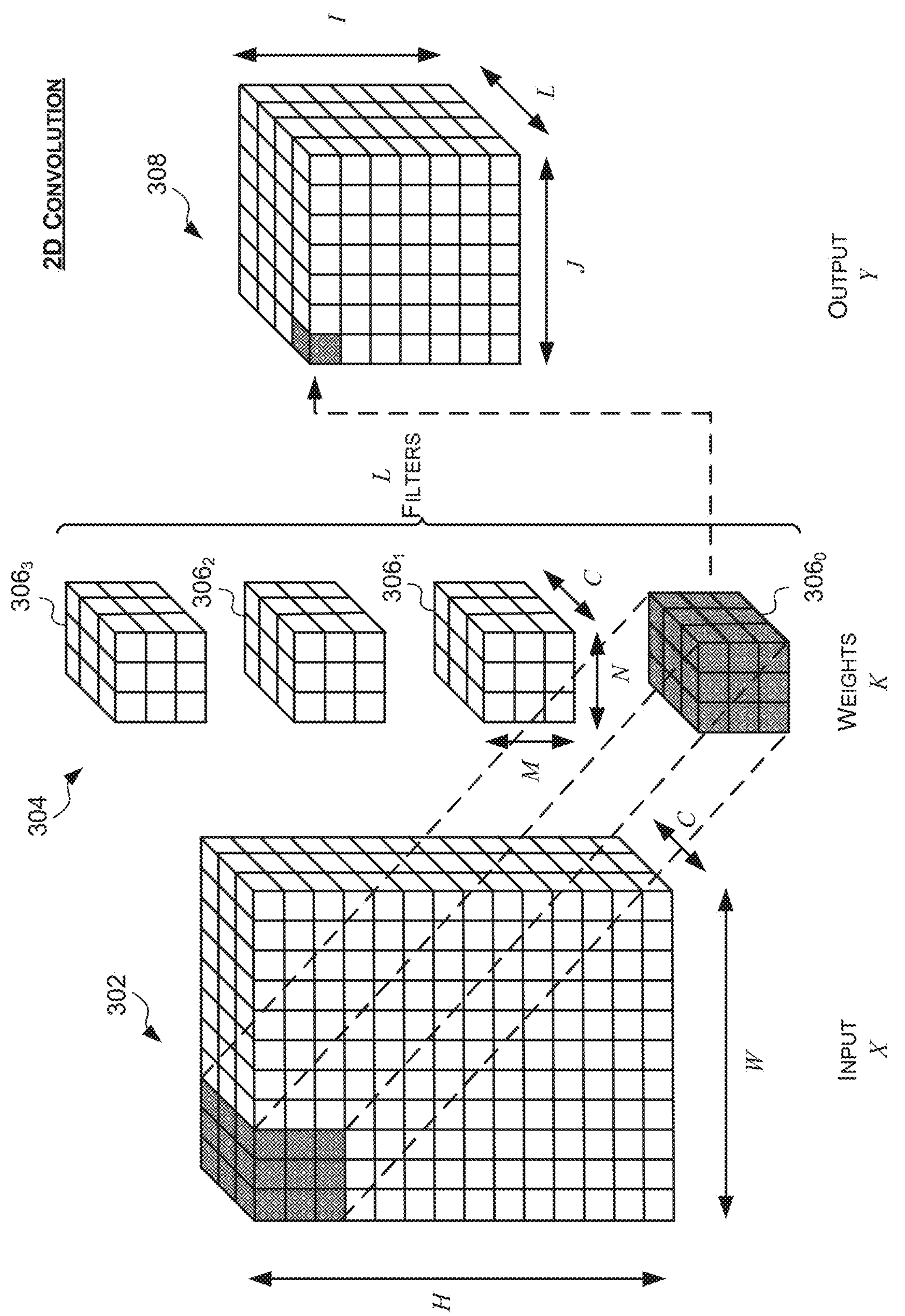
FIG. 3 is a schematic diagram illustrating an example 2D convolution.

FIG. 3 illustrates an example 2D convolution between a three-dimensional (3D) input tensor X 302 with a height H, width W, and channels C and a set of weights K 304 that form a four-dimensional (4D) tensor comprising a plurality of (e.g. L) 3D filters or kernels $\mathbf{306}_0$, $\mathbf{306}_1$, $\mathbf{306}_2$, $\mathbf{306}_3$ with a height M, width N, and channels C. Each filter $\mathbf{306}_0$, $\mathbf{306}_1$, $\mathbf{306}_2$, $\mathbf{306}_3$ is convolved with the 3D input tensor X 302 to produce one channel, or one plane, of the output tensor Y 308. Each channel of the output tensor Y is generated by sliding a filter $\mathbf{306}_0$, $\mathbf{306}_1$, $\mathbf{306}_2$ or $\mathbf{306}_3$ over the input tensor X in the height dimension H and the width dimension W (in accordance with the stride(s) and dilation(s) of the convolution), and generating the dot product of the input values and the weights at each position.

While 2D convolutions are the most common type of convolutions implemented in a NN, other convolutions, such as depth-wise convolutions, are becoming more prominent in NNs. As is known to those of skill in the art, in a depth-wise convolution there is a set of one or more filters per channel of the input tensor, and each channel of the input tensor is convolved with each filter in the corresponding set of filters to generate an output channel. In some cases, there is a single filter per channel, but in other cases there may be multiple filters per channel. The number of filters per channel may be referred to as the channel multiplier, T.

Therefore the number of channels of the output tensor of a depth-wise convolution is T*C.

Figure 4:
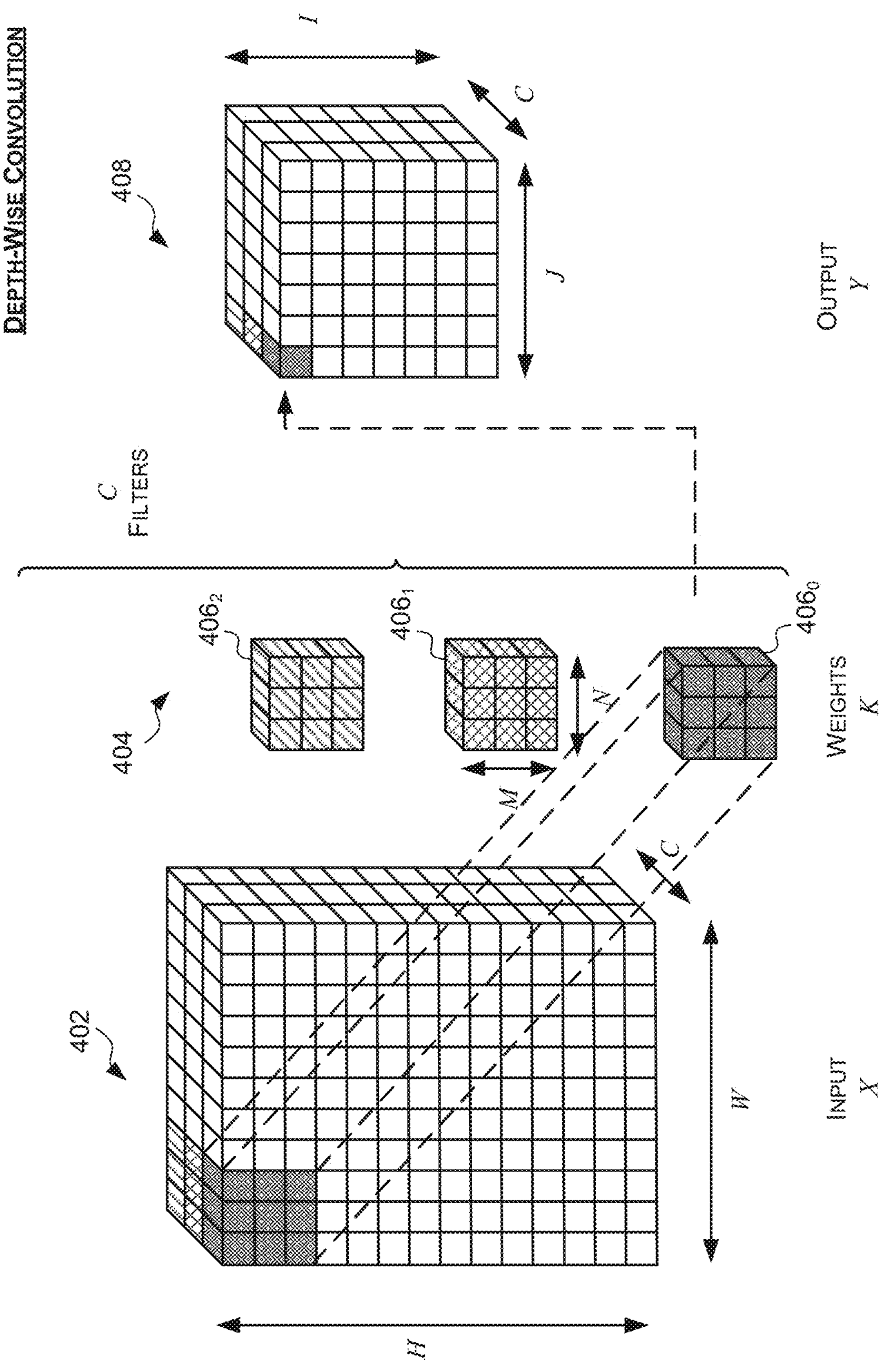
FIG. 4 is a schematic diagram illustrating an example 2D depth-wise convolution.

FIG. 4 illustrates an example depth-wise convolution where the channel multiplier is 1 (i.e. there is a single filter per channel of the input tensor). Specifically, FIG. 4 shows an example depth-wise convolution between a three-dimensional (3D) input tensor X 402 with a height H, width W, and channels C and a set of weights K 404 that form a three-dimensional (3D) tensor comprising a plurality of (e.g. C) 2D filters or kernels $\mathbf{406}_0$, $\mathbf{406}_1$, $\mathbf{406}_2$, with a height M, width N. Each filter $\mathbf{406}_0$, $\mathbf{406}_1$, $\mathbf{406}_2$, is convolved with a single channel of the 3D input tensor X 402 to produce one channel, or one plane, of the output tensor Y 408. Specifically, the first channel of the input tensor 402 is convolved with the first filter $\mathbf{406}_0$, the second channel of the input tensor 402 is convolved with the second filter $\mathbf{406}_1$, and the third channel of the input tensor 402 is convolved with the third filter $\mathbf{406}_2$. Each channel of the output tensor Y is generated by sliding a filter $\mathbf{406}_0$, $\mathbf{406}_1$, $\mathbf{406}_2$ over a single channel of the input tensor 402 in the height dimension H and the width dimension W (in accordance with the stride(s) and dilation(s) of the convolution), and generating the dot product of the input values and the weights at each position. It can be seen that a depth-wise convolution is a simpler operation than a 2D convolution. Accordingly, it may be inefficient to use the convolution processing unit to implement a depth-wise convolution.

Furthermore, it has become common to implement a convolution decomposition as a 2D convolution, activation, depth-wise convolution and an activation. Where such a sequence of operations occurs in a NN, this would require two hardware passes of an NNA with a single convolution processing unit as the 2D convolution and the depth-wise convolution would have to be performed by the convolution processing unit in separate hardware passes.

The inventors have identified that an NNA can more efficiently implement NNs with similar sequences of operations by having a configurable pooling processing unit which can be dynamically configured to perform a pooling operation or a depth-wise convolution. Some pooling operations, such an average pooling operation, can be performed in a similar manner as a depth-wise convolution as they both operate on windows of the input tensor in the same channel so the same hardware can be used to efficiently perform both operations.

Accordingly, described herein are configurable pooling processing units, for use in a neural network accelerator, which can be dynamically configured to perform a pooling operation or a depth-wise convolution operation. Adding the ability for the pooling processing unit to perform a depth-wise convolution has the advantage of allowing multiple convolution operations to be performed in the same hardware pass (e.g. a 2D convolution can be performed by a convolution processing unit and a depth-wise convolution can be performed by the configurable pooling processing unit), and may allow depth-wise convolution operations to be performed more efficiently in terms of power consumption and resources.

Figure 5:
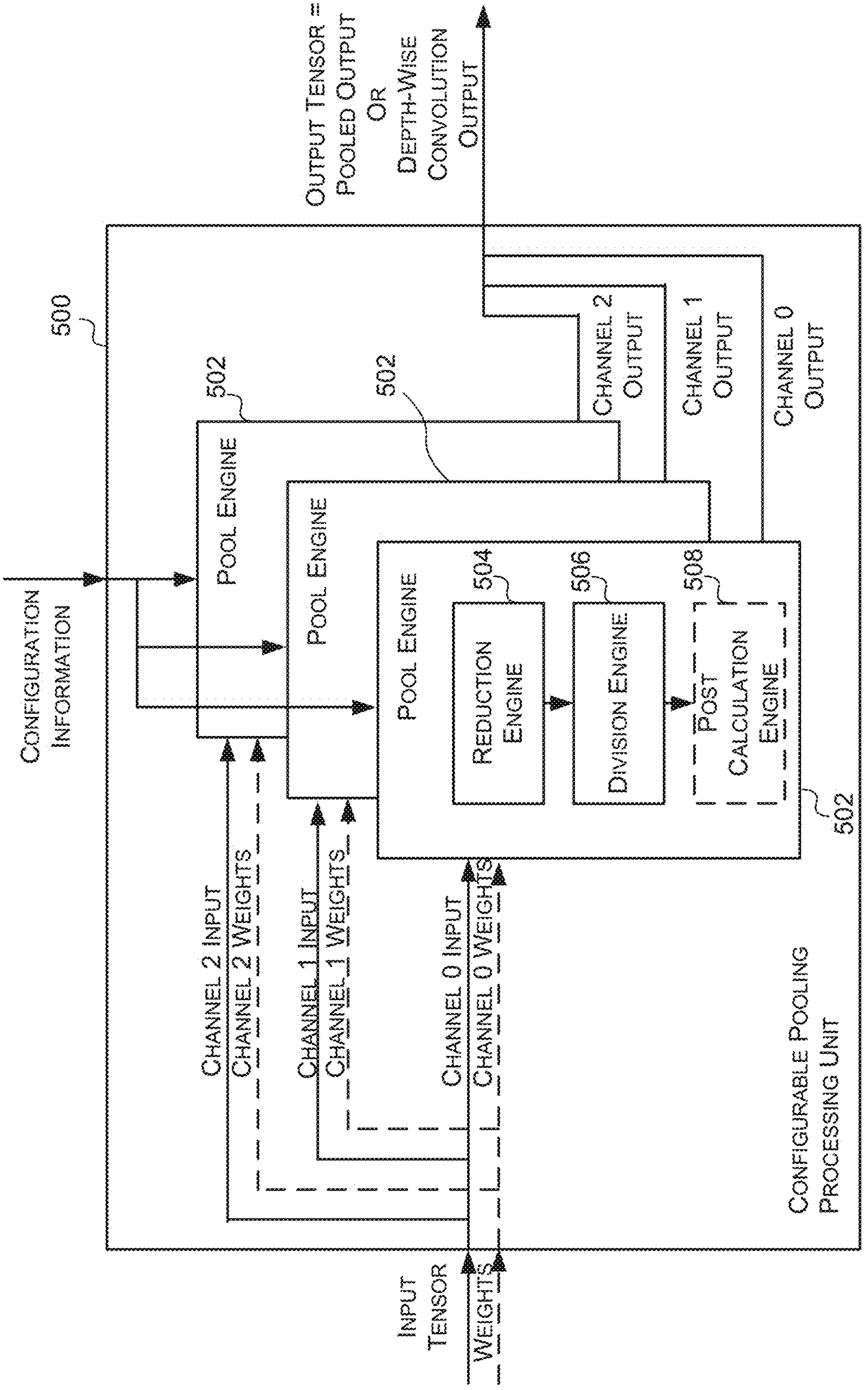
FIG. 5 is a block diagram of an example configurable pooling processing unit comprising pool engines with a reduction engine and a post calculation engine.

Reference is now made to FIG. 5 which illustrates an example configurable pooling processing unit 500 which can be dynamically configured to perform a depth-wise convolution operation or a pooling operation on an input tensor. The configurable pooling processing unit is a hardware accelerator to accelerate depth-wise convolution operations and one or more pooling operations. The configurable pooling processing unit 500 is configured to receive an input tensor and configuration information identifying the operation to be performed on the input tensor, and perform the identified operation on the input tensor to generate an output tensor. The identified operation is one of a plurality of selectable operations. The plurality of selectable operations comprises at least one pooling operation and a depth-wise convolution operation. A pooling operation is an operation that reduces the size of the data by summarizing blocks or subsets of data in the same channel. Example pooling operations include a maximum operation, a minimum operation, and an average operation. In a NN, the purpose of a pooling operation is to reduce the spatial size of the representation to reduce the number of parameters and computations in the NN, and hence to also control overfitting. Since both pooling operations and depth-wise convolution operations involve performing a mathematical operation on windows or blocks of tensels in a channel of the input tensor, hardware that is efficient at processing windows of channels of an input tensor can be used to implement both pooling operations and depth-wise convolution operations efficiently.

In some cases, as shown in FIG. 5, the configurable pooling processing unit 500 may comprise a plurality of pool engines 502. Each pool engine 502 is configured to receive a channel of the input tensor and configuration information indicating which of a plurality of different channel outputs are to be generated, and generate the identified channel output from the received channel of the input tensor. The plurality of different channel outputs includes one or more pooling channel outputs and a depth-wise convolution channel output.

Having a plurality of pool engines 502 allows multiple channels of the input tensor to be processed at the same time. In some cases, there may be sixteen pool engines 502. However, it will be evident to a person of skill in the art that this is an example only and that a configurable pooling processing unit 500 may have any number of pool engines 502. Where the configurable pooling processing unit is intended to be part of a neural network accelerator with a fixed or dynamically configurable pipeline, the number of pool engines 502 may be selected so that the configurable pooling processing unit 500 is not the bottleneck of any pipeline. As described in more detail below, a neural network accelerator may have a convolution processing unit that is configured to perform convolution operations. The convolution processing unit may have a plurality of convolution engines which are each configured to perform multiply accumulate operations. The number of convolution engines may determine how fast the neural network accelerator can operate. In some cases, it may be advantageous for the number of pool engines to be equal to the number of convolution engines. In other cases, it may be advantageous for the number of pool engines to be greater than the number of convolution engines. For example, having more pool engines than convolution engines may be advantageous in hardware passes where the input tensor can be provided to the configurable pooling processing unit at a faster rate than the rate at which the convolution processing unit can produce output data. This may occur in hardware passes in which the input data is processed by the configurable pooling processing unit before the convolution processing unit, or hardware passes where the data is processed by the configurable pooling processing unit, and the convolution processing unit is not active in that hardware pass.

Depending on the number of channels in the input tensor, and the number of pool engines 502, each pool engine 502 may process more than one channel of the input tensor. For example, a first pool engine 502 may first receive and process a channel (e.g. channel 0) of the input tensor to generate one channel of the output tensor, and subsequently receive and process another channel (e.g. channel 5) of the input tensor to generate another channel of the output tensor. In some cases, the configurable pooling processing unit 500 may be configured to divide the channels of the input tensor equally amongst the pool engines 502. In some cases, the pool engines 502 may be configured to interleave the processing of multiple channels. For example, a pool engine 502 may be configured to generate part of the output for a first channel, generate part of the output for a second channel, and then go back to processing the first channel.

In some cases, as shown in FIG. 5, each pool engine 502 may comprise a reduction engine 504, a division engine 506 and, optionally, a post calculation engine 508. The reduction engine 504 is configured to generate, for N×M blocks or windows of the received channel of the input tensor (wherein N and M are integers greater than or equal to 1), one of a plurality of different types of block outputs. A block output is a single value that is generated from the tensels in the block or window. The plurality of different types of block outputs supported by the reduction engine 504 is dependent on the types of operations supported by the configurable pooling processing unit 500. As noted above, the configurable pooling processing unit 500 supports a depth-wise convolution operation and one or more pooling operations. The one or more pooling operations may include, for example, one or more of an average pooling operation, a maximum pooling operation and a minimum pooling operation.

Where the configurable pooling processing unit supports an average pooling operation, the different types of block outputs may include (i) a weighted sum block output which is a weighted sum of the tensels in a block, and (ii) a sum block output which is the sum of the tensels in the block. The weighted sum block output can be used to generate a depth-wise convolution output and the sum block output can be used to generate an average pooling output. Where the configurable pooling processing unit 500 also supports a maximum pooling operation and/or a minimum pooling operation, the different types of block outputs supported by the reduction engine 504 may further include a maximum block output which is the maximum of the tensels in the block and/or a minimum block output which is the minimum of the tensels in the block.

The size of the blocks to be processed by the reduction engine 504 may be specified by the configuration information. As described in more detail below, there may be a maximum block size which can be processed by a reduction engine 504, and the maximum block size may be different for different operations. For example, in some cases, the maximum block size for a pooling operation may be larger than the maximum block size for a depth-wise convolution operation to reduce the number of multipliers in the reduction engine 504. Example implementations of the reduction engine 504 are described with respect to FIGS. 6 and 7.

The division engine 506 is configured to divide the output of the reduction engine 504 by N×M where the block or window is of size N×M. The division engine may only be used for some types of operations. Accordingly, it may be possible to disable or by-pass the division engine 506.

If the pool engine 502 is configured in this manner then (i) when the configurable pooling processing unit 500 is configured to perform a depth-wise convolution operation, the reduction engine 504 may be configured to generate, for each N×M block or window of the received channel of the input tensor, a weighted sum of tensels in the block where the weights correspond to the weights of the filter to be applied to the received channel, and the division engine 506 may be disabled or by-passed; (ii) when the configurable pooling processing unit 500 is configured to perform an average pooling operation, the reduction engine 504 may be configured to generate for each N×M block or window of the received channel of the input tensor, a sum of the tensels in the block, and the division engine 506 may be enabled so as to divide the output of the reduction engine 504 by N×M; (iii) when the configurable pooling processing unit 500 is configured to perform a maximum pooling operation, the reduction engine 504 may be configured to output, for each N×M block or window of the received channel of the input tensor, the maximum tensel in the block, and the division engine 506 may be disabled or by-passed; and (iv) when the configurable pooling processing unit 500 is configured to perform a minimum pooling operation, the reduction engine 504 may be configured to output, for each N×M block or window of the received channel of the input tensor, the minimum tensel in the block, and the division engine 506 may be disabled or by-passed.

As described above, a pool engine 502 may further comprise a post calculation engine 508 that can be used to apply formatting changes etc. to the output of the reduction engine 504 or the division engine 506. An example implementation of a post calculation engine 508 is described below with respect to FIG. 15.

As described in more detail below, the configurable pooling processing unit 500 may, in some cases, comprise other components or elements not shown in FIG. 5. For example, the configurable pooling processing unit 500 may also comprise one or more controllers which are configured to control the receiving of the input tensor, weights, and/or configuration information and providing the appropriate input tensels, weights and control information to the pool engines 502 (and the components thereof).

Figure 6:
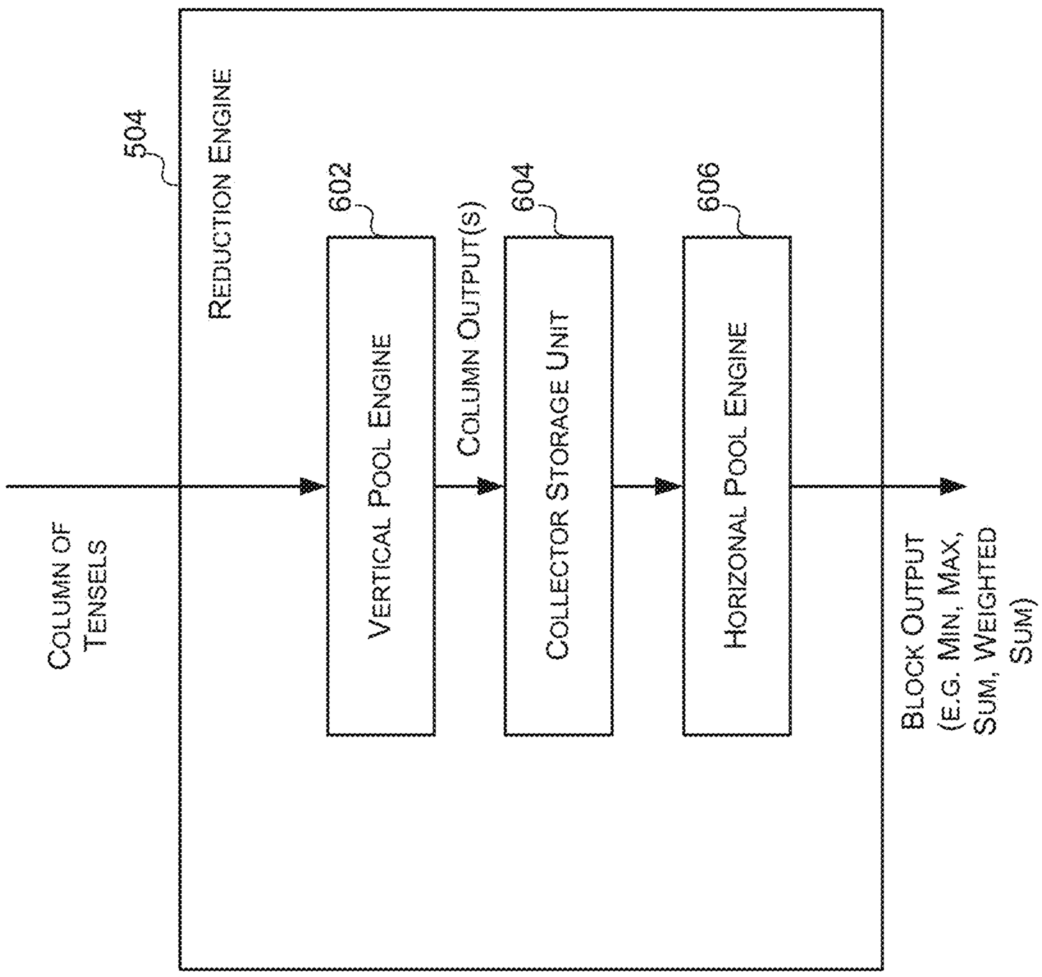
FIG. 6 is a block diagram of an example implementation of the reduction engine of FIG. 5 comprising a vertical pool engine, a collector storage unit and a horizontal pool engine.

Reference is now made to FIG. 6 which illustrates an example implementation of the reduction engine 504 of FIG. 5. As described above, each reduction engine 504 can generate one of a plurality of different types of block outputs for each N×M block of a received channel of the input tensor. The plurality of different types of block outputs supported by the reduction engine 504 may include, for example, a weighted sum of the tensels in the block, the sum of the tensels in the block, the maximum of the tensels in the block and/or the minimum of the tensels in the block.

The example reduction engine 504 of FIG. 6 is configured to generate a block output on a column basis first and then generate the final block output from the column outputs. Specifically, the reduction engine 504 of FIG. 6 comprises a vertical pool engine 602, a collector storage unit 604 and a horizontal pool engine 606. The vertical pool engine 602 is configured to receive a column of tensels in a block or window, and to generate one or more column outputs of a particular type based thereon. The type of column output that is generated by a vertical pool engine 602, and the number of column outputs per column, is based on the type of block output that the reduction engine 504 is to generate. For example, if the reduction engine 504 is configured to output a sum of the tensels in a block, then the vertical pool engine 602 may be configured to generate a sum of the tensels in the received column; if the reduction engine 504 is configured to output a maximum of the tensels in a block, then the vertical pool engine 602 may be configured to output the maximum tensel (i.e. the tensel with the largest value) in the received column; and if the reduction engine 504 is configured to output a minimum of the tensels in a block, then the vertical pool engine 602 may be configured to output the minimum tensel (i.e. the tensel with the smallest value) in the received column. Accordingly, in each of these configurations of the reduction engine 504, the vertical pool engine 602 generates a single column output per column. Since columns can belong to more than one block or window, performing these operations on a column basis allows the column outputs to be used to generate more than one block output.

If, however, the reduction engine 504 is configured to generate a weighted sum of the tensels in a block or window, the vertical pool engine 602 may be configured to generate, one or more weighted sums for each received column of tensels. In some cases, the vertical pool engine 602 may be configured to generate multiple column outputs (weighted sums) per received column of tensels. For example, the vertical pool engine 602 may be configured to generate, a weighted sum from the tensels in the column for each column of weights in the filter to be applied to the channel. As described above, a column of input tensels may belong to multiple blocks or windows, and for a depth-wise convolution, different weights will be applied to that column for each block or window it belongs to. Accordingly, calculating a weighted sum for each block or window the column may belong to at the same time can save time and power as the column does not have to be loaded into the vertical pool engine 602 multiple times to have different weights applied thereto. This will be described in more detail below using an example.

An example implementation of the vertical pool engine 602 is described below with respect to FIG. 7.

The collector storage unit 604 is configured to temporarily store the column outputs generated by the vertical pool engine 602. The collector storage unit 604 may not be necessarily large enough to store all of the column outputs for a channel, or even for a whole row of the output. The number of column outputs that can be stored in the collector storage unit 604 may define the maximum width of a window or block for a pooling operation or a depth-wise convolution operation. As described in more detail below, pooling operations may have a larger maximum window width than depth-wise convolutions. This is because of the increased amount of data that has to be stored in the collector storage unit 604 per column of a window for a depth-wise convolution. For example, for a depth-wise convolution, multiple column outputs may be stored in the collector storage unit for each column of a window, whereas for a pooling operation only one column output may be stored in the collector storage unit 604 for each column of a window. Therefore where the maximum window width for a pooling operation may be equal to the number of column outputs that can be stored in the collector storage unit 604, the maximum window width for a depth-wise pooling operation (with a stride of 1) may be equal to the number of column outputs that can be stored in the collector storage unit divided by the number of column outputs that have to be stored per column. However, the theoretical maximum width for a depth-wise can may depend on the stride of the depth-wise convolution in the width direction. In one example, the maximum window width for pooling operations is sixteen whereas the maximum window width for a depth-wise convolution operation is three.

In some cases, the collector storage unit 604 may be implemented by a shift register. As described in more detail below, this may allow the column outputs for particular operations to always be located in the same location of the collector storage unit 604. However, in other examples, the collector storage unit 604 may be implemented by a simple register and the column outputs to be used by the horizontal pool engine 606 may be identified by pointers into the register which are updated after each set of one or more column outputs generated by the vertical pool engine 602. This may provide power savings over actually shifting the data.

The horizontal pool engine 606 is configured to generate a block output from a plurality of column outputs stored in the collector storage unit 604. The specific column outputs in the collector storage unit 604 that are used, and how they are combined, to generate a block output will depend on the type of block output to be generated. For example, if the reduction engine 504 is configured to output the maximum or minimum tensel of a block, then the horizontal pool engine 606 is configured to identify the column outputs in the collector storage unit 604 corresponding to each column of the block and select the highest or lowest of the identified column outputs, respectively. If, however, the reduction engine 504 is configured to output the sum of the tensels in the block, then the horizontal pool engine 606 is configured to identify the column outputs in the collector storage unit 604 corresponding to each column of the block and generate the sum of the identified column outputs.

Finally, if the reduction engine 504 is configured to output the weighed sum of the tensels in a block or window, then the horizontal pool engine 606 is configured to identify the column outputs in the collector storage unit 604 corresponding to each column of the block and were generated by the appropriate weights, and generate the sum of the identified column outputs. For example, as described above, the vertical pool engine 602 may be configured to output, for example, multiple column outputs per received column of tensels, wherein each column output is the weighted sum of the tensels based on a different set of weights. For example, if the filter is of size 3×3 then each block or window will be of size 3×3. One weighted sum block output will be generated by summing (i) the weighted sum of the first three tensels in the first column of the channel based on the weights in the first column of the filter; (ii) the weighted sum of the first three tensels in the second column of the channel based on the weights in the second column of the filter; and (iii) the weighted sum of the first three tensels in the third column of the channel based on the weights in the third column of the filter. Accordingly, to generate this weighted sum block output the horizontal pool engine 606 identifies the column outputs in the collector storage unit 604 that correspond to (i), (ii) and (iii) and generates the sum thereof.

Another weighted sum block output will be generated by summing (i) the weighted sum of the first three tensels in the second column of the channel based on the weights in the first column of the filter; (ii) the weighted sum of the first three tensels in the third column of the channel based on the weights in the second column of the filter; and (iii) the weighted sum of the first three tensels in the fourth column of the channel based on the weights in the third column of the filter. Accordingly, to generate this weighted sum block output the horizontal pool engine 606 identifies the column outputs in the collector storage unit 604 that correspond to (i), (ii) and (iii) and generates the sum thereof. This will be described in more detail below with the use of an example.

In some cases, the horizontal pool engine 606 may only be able to process a maximum number of column outputs per cycle. For example, the horizontal pool engine 606 may only be able to process four column outputs per cycle. If the window width is greater than the maximum number of column outputs per cycle it may take multiple cycles for the horizontal pool engine 606 to generate a block output. For example, if the horizontal pool engine 606 can process up to four column outputs per cycle and the width of the window is 16, then it may take four cycles to generate the block output.

Figure 7:
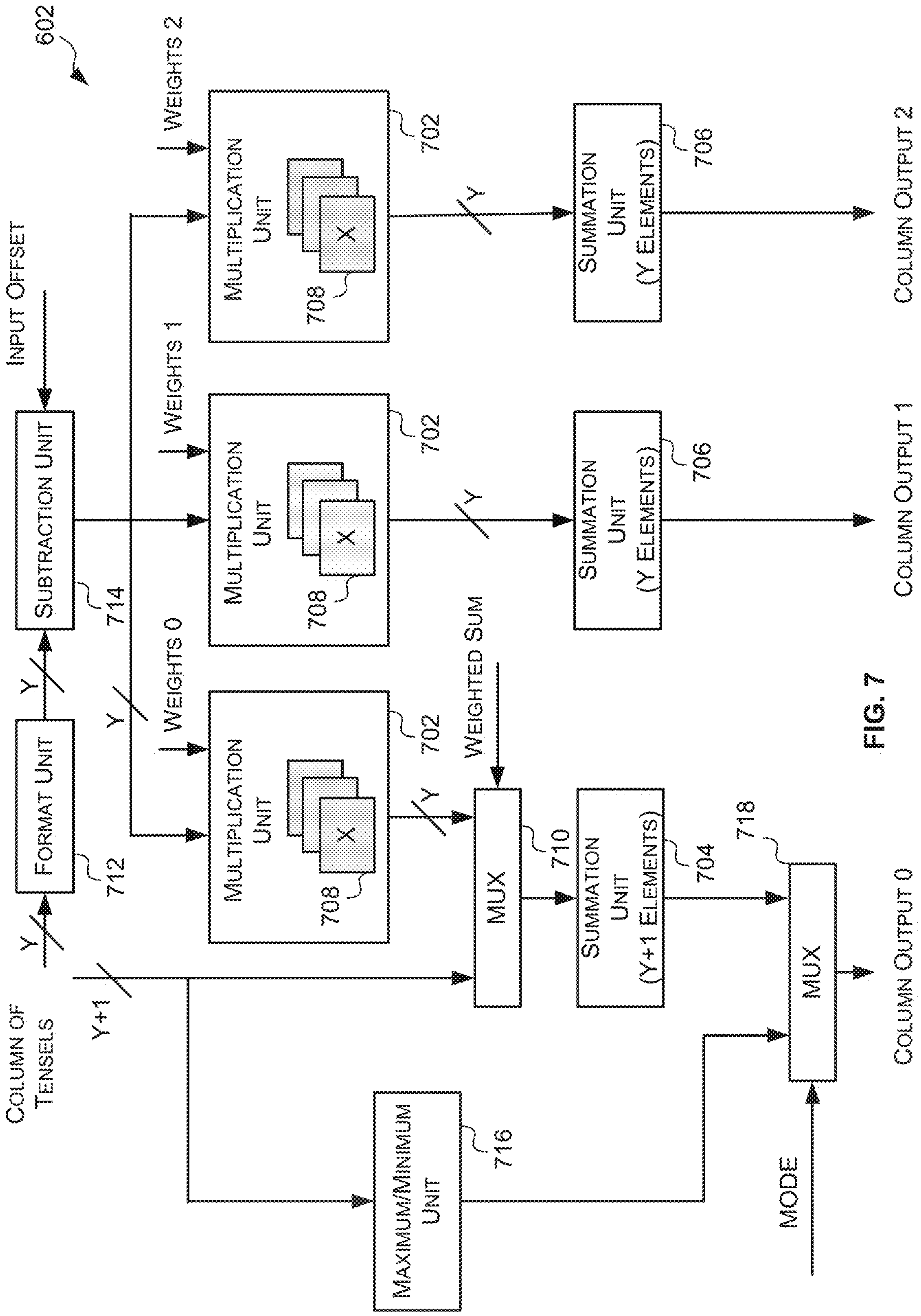
FIG. 7 is a block diagram of an example implementation of the vertical pool engine of FIG. 6.

Reference is now made to FIG. 7 which illustrates an example implementation of the vertical pool engine 602 of FIG. 6. As described above, the vertical pool engine 602 is configured to receive a column of tensels of an input tensor, and generate one or more column outputs therefrom. As noted above, the number and type of column outputs that are generated for a column of tensels is based on the configuration of the reduction engine 504 to which the vertical pool engine 602 forms part of.

As will be described in more detail below, in some cases the vertical pool engine 602 may only be able to receive and process a predetermined number of tensels per cycle, thus, depending on the size of the column, it may take multiple cycles to generate the one or more column outputs. The term "column of tensels" will be used herein to refer to a column of a window or block of the input tensor, and the term "partial column of tensels" will be referred to herein as a portion or subset of a column of tensels (i.e. fewer tensels than the column of tensels). For example, if a column of tensels comprises sixteen tensels and the vertical pool engine can only receive and process four tensels per cycle, then it may take four cycles to generate the one or more column outputs for the column. Also, as will be described in more detail below, the maximum number of tensels that can be received and processed in a cycle may vary between types of column outputs to be generated.

The example vertical pool engine 602 of FIG. 7 comprises a plurality of multiplication units 702, and a plurality of summation units 704, 706.

Each of the plurality of multiplication units 702 is configured to receive a set of multiplication input elements and a set of weights and multiply, using a set of multipliers 708, each received multiplication input element with a corresponding one of the weights to generate a multiplication output. In the example shown in FIG. 7, each multiplication unit 702 receives the same set of multiplication input elements which correspond to the column or partial column of tensels received by the vertical pool engine 602 in a cycle. Each multiplication unit 702 can receive a different set of weights. In the example shown in FIG. 7 there are three multiplication units 702 which allows a received column or partial column of tensels to be multiplied with up to three sets of weights. However, it will be evident to a person of skill in the art that this is an example only and that the vertical pool engine 602 may comprise two or more multiplication units.

Each summation unit 704, 706 is configured to receive a set of input elements and sum the received input elements to generate a sum output. The input elements received by a first one of the summation units 704 may be either the multiplication outputs of a first one of the multiplication units 702, or the column or partial column of tensels received by the vertical pool engine 602 in a cycle. Accordingly, the first summation unit 704 can generate a sum of the input tensels or a weighted sum of the input tensels for one set of weights. In the example shown in FIG. 7 the first summation unit 704 is preceded by a multiplexor 710 which is configured to receive the column or partial column of tensels received by the vertical pool engine 602 in a cycle and the multiplication outputs for the first multiplication unit 702 and selectively provide one of the sets of inputs to the first summation unit 704 in response to a control signal (e.g. a "WEIGHTED SUM" control signal). However, it will be evident to a person of skill in the art that this is only an example of hardware that may be used to selectively provide one of a plurality of sets of input elements to the first summation unit 704 and that any suitable hardware may be used to selectively provide one of a plurality of sets of input elements to the first summation unit 704.

The remaining summation units 706 are configured to receive the multiplication outputs of one of the other multiplication units 702. For example, the second summation unit 706 of FIG. 7 is configured to receive the multiplication outputs of the second multiplication unit 702, and the third summation unit 706 is configured to receive the multiplication outputs of the third multiplication unit 702. Accordingly, each of the remaining summation units 706 is configured to generate a weighted sum of the column of tensels for a different set of weights. There is one summation unit 704, 706 for each multiplication unit 702. Accordingly, since there are three multiplication units 702 in the example shown in FIG. 7 there are three summation units 704, 706.

When the configurable pooling processing unit 500 is configured to perform a depth-wise convolution operation on an input tensor, the vertical pool engine 602 of a pool engine 502 may be configured to receive a column or partial column of tensels for a channel of the input tensor, the different columns of the filter to be applied to the channel are loaded into different multiplication units 702, the multiplication units 702 are configured to multiply each received tensel with a corresponding weight to generate a multiplication output, and the summation units 704, 706 are configured to generate a sum of the multiplication outputs of one of the multiplication units 702. In contrast, where the configurable pooling processing unit 500 is configured to perform an average pooling operation on an input tensor, the vertical pool engine 602 of a pool engine 502 is configured to receive a column or partial column of tensels for a channel of the input tensor, the first summation unit 704 is configured to generate the sum thereof and the multiplication units 702 are not used and/or are disabled.

To limit the size and complexity of the vertical pool engine 602, the vertical pool engine 602 may only be able to receive and process up to a maximum number of tensels at a time (e.g. each cycle). For example, the vertical pool engine 602 may only be able to receive and process up to four tensels at a time. In some cases, the maximum number of tensels that can be received and processed at a time may be based on the type of column output to be generated. Specifically, to reduce the number of multipliers 708 in the vertical pool engine 602, the maximum number of tensels from which a weighted sum can be generated may be less than the maximum number of tensels from which a sum may be generated. For example, in the example shown in FIG. 7, a weighted sum may be generated for up to Y tensels and a sum may be generated for up to Y+1 tensels. In one example, Y is equal to three, such that a weighted sum may generated for up to three tensels, and a sum may be generated for up to four tensels. It will be evident to a person of skill in that art that this is an example only and Y may be any integer greater than or equal to two. In such cases, the first summation unit 704 may be able to sum Y+1 input elements whereas the other summation units 706 may only be able to sum Y input elements. In yet other cases, the maximum number of tensels for a sum and a weighted sum may be the same.

In some cases, the number of input elements that can be processed for a weighted sum (Y), and the number of multiplication units may define the maximum filter size/ window size for a depth-wise convolution. The inventors have determined that a maximum filter size/window size of 3×3 for a depth-wise convolution produces a good balance between the size and complexity of the configuration pooling processing unit and the use thereof. Specifically, as described above, it is advantageous if a column of tensels is loaded into the vertical pool engine 602 only once. Therefore, it is advantageous to multiply a column of tensels by all of the necessary weights at the same time. Therefore, if the filter (and the window) has a width of A (e.g. the filter and window have A columns), then each column of tensels is advantageously multiplied against each of the A columns of weights at the same time. Since it will take column outputs related to A different input columns to generate a block output, the collector storage unit would have to be able to store up to A*A column outputs to support a depth-wise convolution with a A×A filter. Accordingly, if the collector storage unit is capable of storing sixteen column outputs, then the collector storage unit could support a depth-wise convolution with a maximum filter size of 4×4 without having to increase the size the collector storage unit. However, this would require seven additional multipliers and one additional summation unit in the vertical pool engine compared to supporting filters with a maximum size of 3×3. Furthermore, the inventors have identified that in a neural network the filters of depth-wise convolutions tend to have odd dimensions (e.g. 3×3, 5×5 . . . ). Therefore, increasing the supported filter size from 3×3 to 4×4 would significantly increase the size of each vertical pool engine (and thus the configurable pooling processing unit) with limited benefit.

In some cases, the maximum size of a column of tensels supported by the configurable pooling processing unit for a particular operation may be greater than the maximum number of tensels that can be processed by the vertical pool engine 602 in a cycle for that operation. In these cases, the vertical pool engine 602 may be configured to generate the one or more column outputs over a plurality of cycles. For example, if the maximum number of tensels that can be received and processed for a sum output is four, and the maximum number of tensels in a column is sixteen, then the vertical pool engine 602 may be configured to generate the column output over four cycles. Specifically, to generate a sum column output for a column of 16 tensels, the vertical pool engine 602 may be configured to receive the first four tensels of the column and generate the sum thereof (a partial column output) in a first cycle, receive the next four tensels of the column and generate the sum thereof (a partial column output) in a second cycle, receive the next four tensels of the column and generate the sum thereof (a partial column output) in a third cycle, and receive the last four tensels of the column and generate the sum thereof (a partial column output) in a fourth cycle, and generate a final column output by summing the partial column outputs generated in the four cycles.

In these cases, the vertical pool engine 602 may comprise hardware (not shown) that is configured to generate the final column output from the partial column outputs generated in multiple cycles. The hardware may be configured to keep a running column output which is updated after each cycle. Specifically, the running column output may be initialized to a starting value and after the first cycle an operation is performed on the partial output generated in that cycle and the running column output which is used update the running column output. Then, once the desired number of cycles have been completed, the running column output is output to the collector storage unit as the final column output. The starting value and the operation that is performed on the partial output and the running column output depends on the type of column output to be generated by the vertical pool engine 602. For example, if the vertical pool engine 602 is configured to generate a sum column output, then the starting value may be zero such that the running column output may be initialized to zero, then after each cycle the partial output generated in that cycle is added to the running column output. Similarly, if the vertical pool engine 602 is configured to generate a maximum column output or a minimum column output, then the starting value may be set the minimum tensel value or the maximum tensel value respectively, and, after each cycle, the partial output generated in that cycle is compared to the running column output and the running column output is set to the higher or lower of the partial output and the running column output, respectively.

The vertical pool engine 602 may be configured to receive and process tensels with a maximum bit width. In some cases, to reduce the complexity of the multipliers 708 in the vertical pool engine 602, the maximum bit width (which may also be referred to as the bit depth) of tensels for a weighted sum may be less than the maximum bit width of tensels for a sum. For example, a sum may be generated from tensels with a maximum bit width of 16 and a weighted sum may be generated from tensels with a maximum bit width of 9. This allows a significant reduction in the size of the multipliers 708. Specifically, 9 bit by 9 bit multipliers which produce an 18 bit output can be used rather than 16 bit by 16 bit multipliers which produce a 32 bit output. In cases where the maximum bit width of tensels differs between the operation to be performed, the vertical pool engine 602 may comprise a format unit 712 which is configured to convert the received input tensels to the reduced format (e.g. reduce 16-bit signed inputs to 9 bits). In some cases, where the maximum bit width for a weighted sum is Z and the maximum bit width for received input tensels is Q, then the format unit 712 may be configured to select and output the Z−1 least significant bits (LSBs) of each of the received input tensels and add the sign as the $Z^{th}$ bit. In these cases, it is assumed that while the received input tensels are sixteen bits each, when the vertical pool engine 602 is configured to generate a weighted sum, only the eight LSBs have valid data, such that the eight MSBs are just the sign extension of the eight bits. Accordingly, the format unit 712 may be simply discarding the redundant bits.

In some cases, the vertical pool engine 602 may be able to receive the input tensels in one of one or more fixed point number formats. For example, the vertical pool engine 602 may be able to receive the input tensels in a symmetric fixed point number format (a fixed point format in which the range of values supported by the fixed point number format is centred at zero), such as a fixed point number format defined by a fixed integer exponent exp and a b-bit mantissa m such that a value u is equal to $u=2^{exp}m$. In some cases, the mantissa m may be represented in two's complement format. However, in other cases other signed or unsigned integer formats may be used. Different tensors and different layers of a tensor may be represented using different mantissa bit lengths m and/or different exponents b.

The vertical pool engine 602 may alternatively or additionally be able to receive the input tensels an affine fixed point number format—i.e. a fixed point number format which defines an offset and a scale. An example of an affine fixed point format is the 8-bit asymmetric fixed point (Q8A) format. In one example the Q8A format is defined by a minimum representable number $r_{min}$, a maximum representable number $r_{max}$, and a zero point z, and each number is represented by an 8-bit interpolation number $d_{QbA}$. The 8-bit number $d_{QbA}$ defines a linear interpolation factor between the minimum and maximum representable numbers. In a variant of this fixed point number format the number of bits used to store the interpolation factor may be configurable on a per network parameter set basis. In this variant, where the number of bits is b, a floating point value is approximated as shown in equation (1):

$$d_{float} = \frac{(r_{max} - r_{min})(d_{QbA} - z)}{2^b - 1} \quad (1)$$

In another example the Q8A format may be defined by a zero point z which will always map exactly to 0, a scale factor and an 8-bit number. In this example, a floating point value is approximated is shown in equation (2):

$$d_{float} = (d_{B8A} - z) * \text{scale} \quad (2)$$

In some cases, where an operation, such a multiplication, is performed on tensels in an affine fixed point number format that can result in a change of scale, it may be more hardware efficient to perform the processing in a manner such that the output data does not accurately reflect the scale and/or offset. Accordingly, to be able to perform the multiplications more efficiently when the tensels are in an affine fixed point number format the vertical pool engine 602 may comprise a subtraction unit 714 which is configured to remove a received offset (e.g. zero point) from the received tensels before they are provided to the multiplication units 702. Removing the offset may mean that the output of the configurable pooling processing unit 500 may be subsequently re-quantised to the affine fixed point number format. As described in more detail below, this re-quantisation may be performed by a tensel rescale processing unit.

The summation units 704, 706 and multiplication units 702 allow the vertical pool engine 602 to generate a sum of tensels and one or more weighted sum of tensels. This allows the pool engine 502 and thus the configurable pooling processing unit 500 to perform a depth-wise convolution operation or an average pooling operation on an input tensor. Where the configurable pooling processing unit also supports a maximum pooling operation and/or a minimum pooling operation, the vertical pool engine 602 may also comprise a maximum/minimum unit 716 which is configured to receive the received column, or partial column, of tensels and output the maximum or minimum of those tensels. In these cases, the vertical pool engine 602 may also comprise a second multiplexor 718 which is configured to selectively output, in response to a control signal (e.g. a "MODE" signal), one of the output of the maximum/minimum unit 716 and the output of the first summation unit 704.

Figure 8:
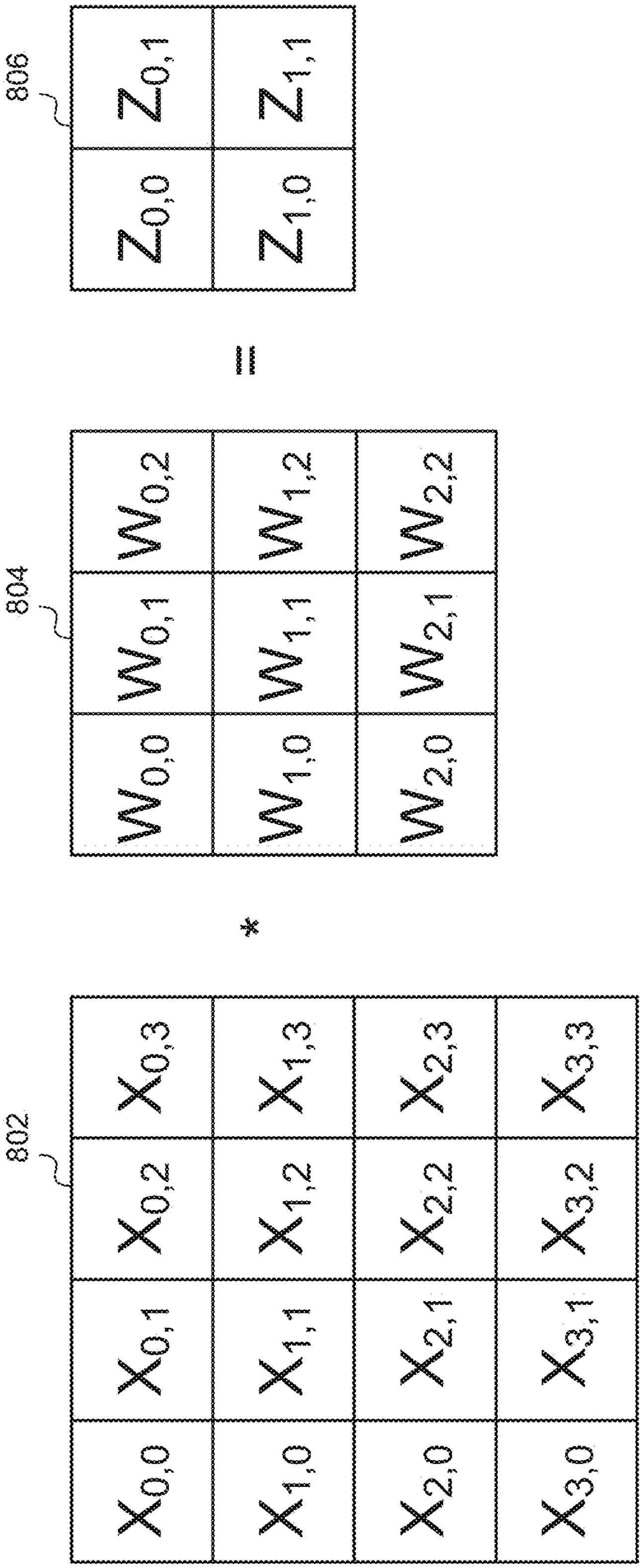
FIG. 8 is a schematic diagram illustrating an example convolution between a 4×4 channel of an input tensor and a 3×3 filter.
Figure 9:
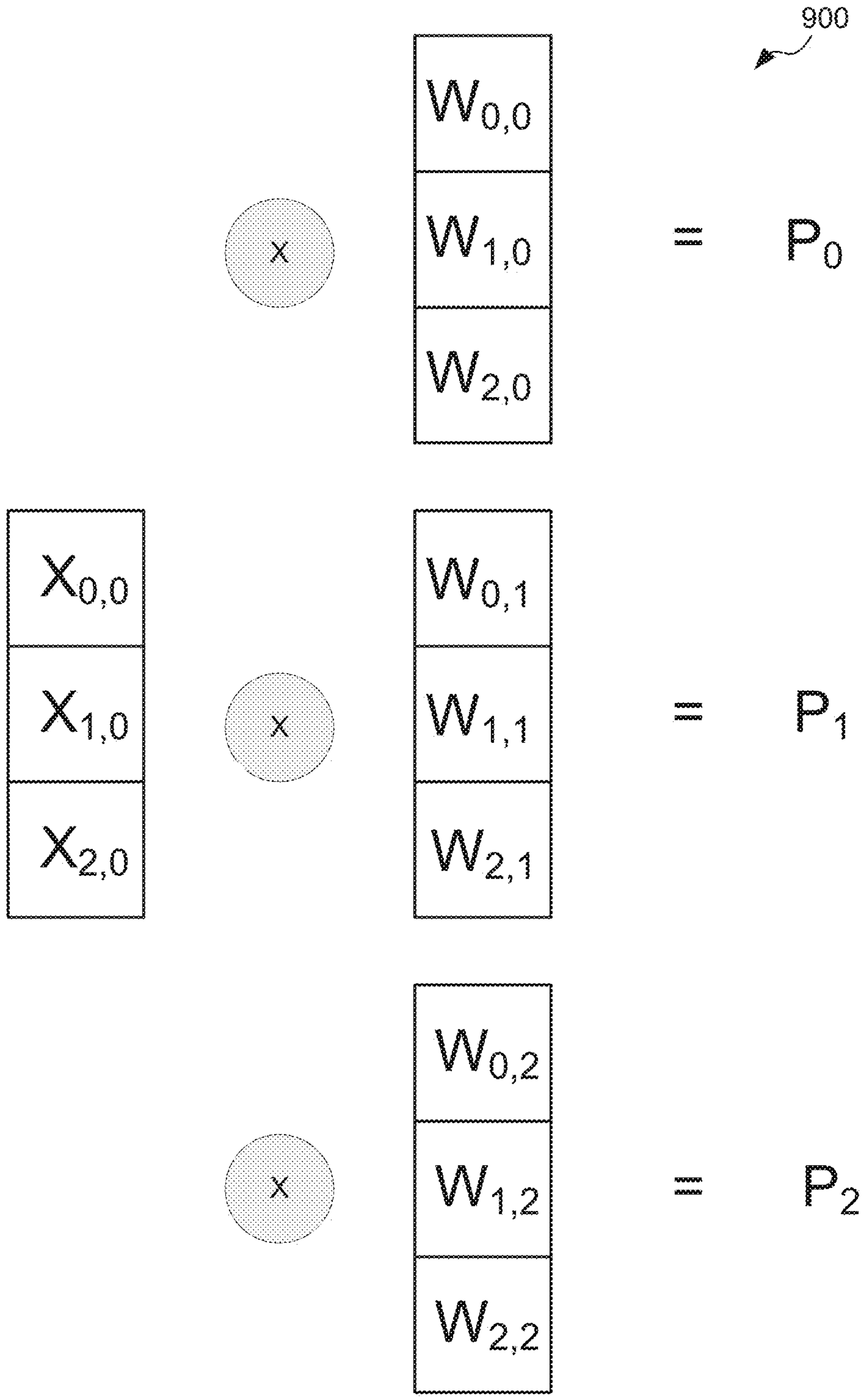
FIG. 9 is a schematic diagram illustrating the multiplications that may be performed by the vertical pool engine of FIG. 7 in a first cycle to perform the convolution of FIG. 8.
Figure 10:
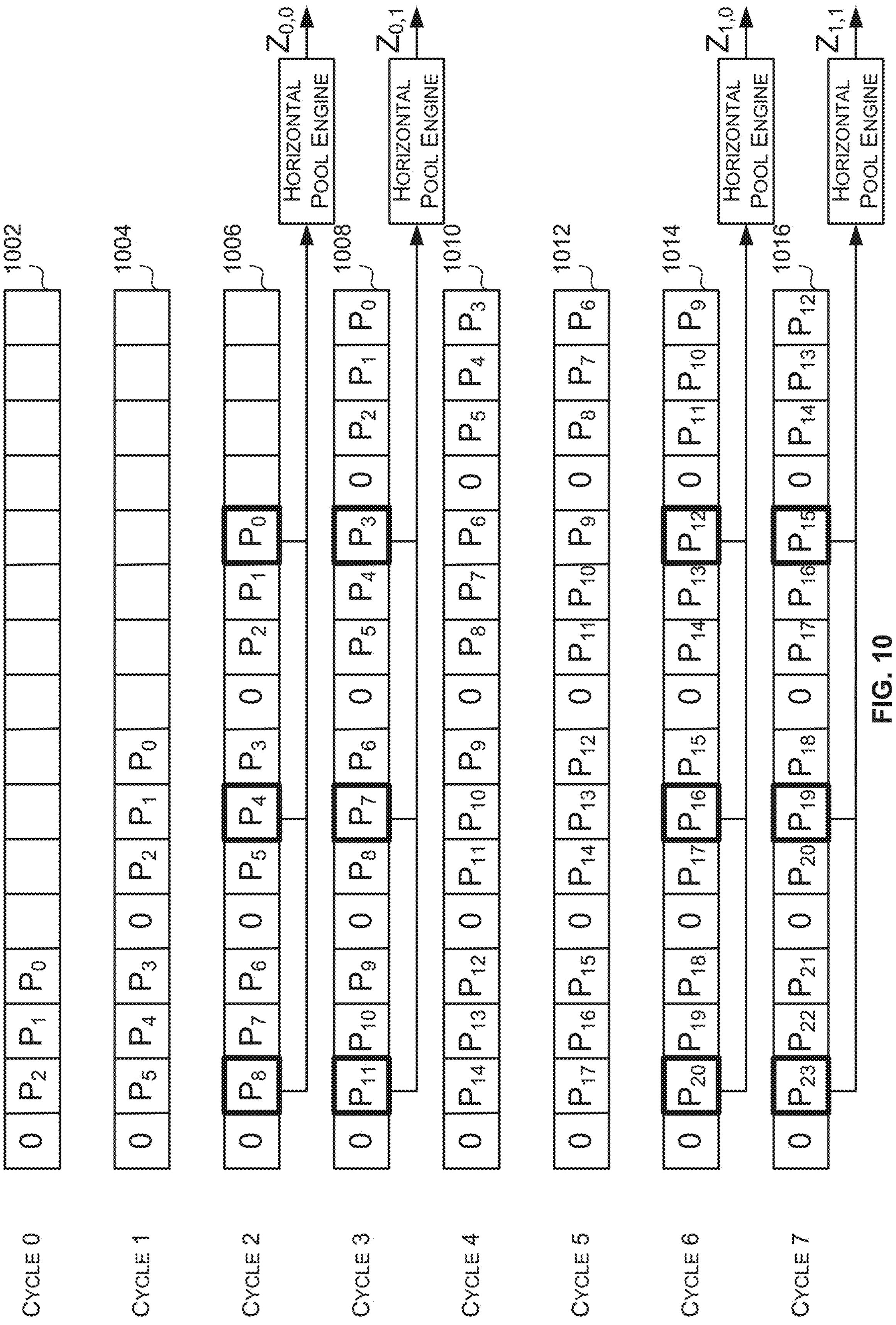
FIG. 10 is a schematic diagram illustrating the state of the collector storage unit of FIG. 6 over several cycles when the reduction engine is configured to perform the convolution of FIG. 8.
Figure 11:
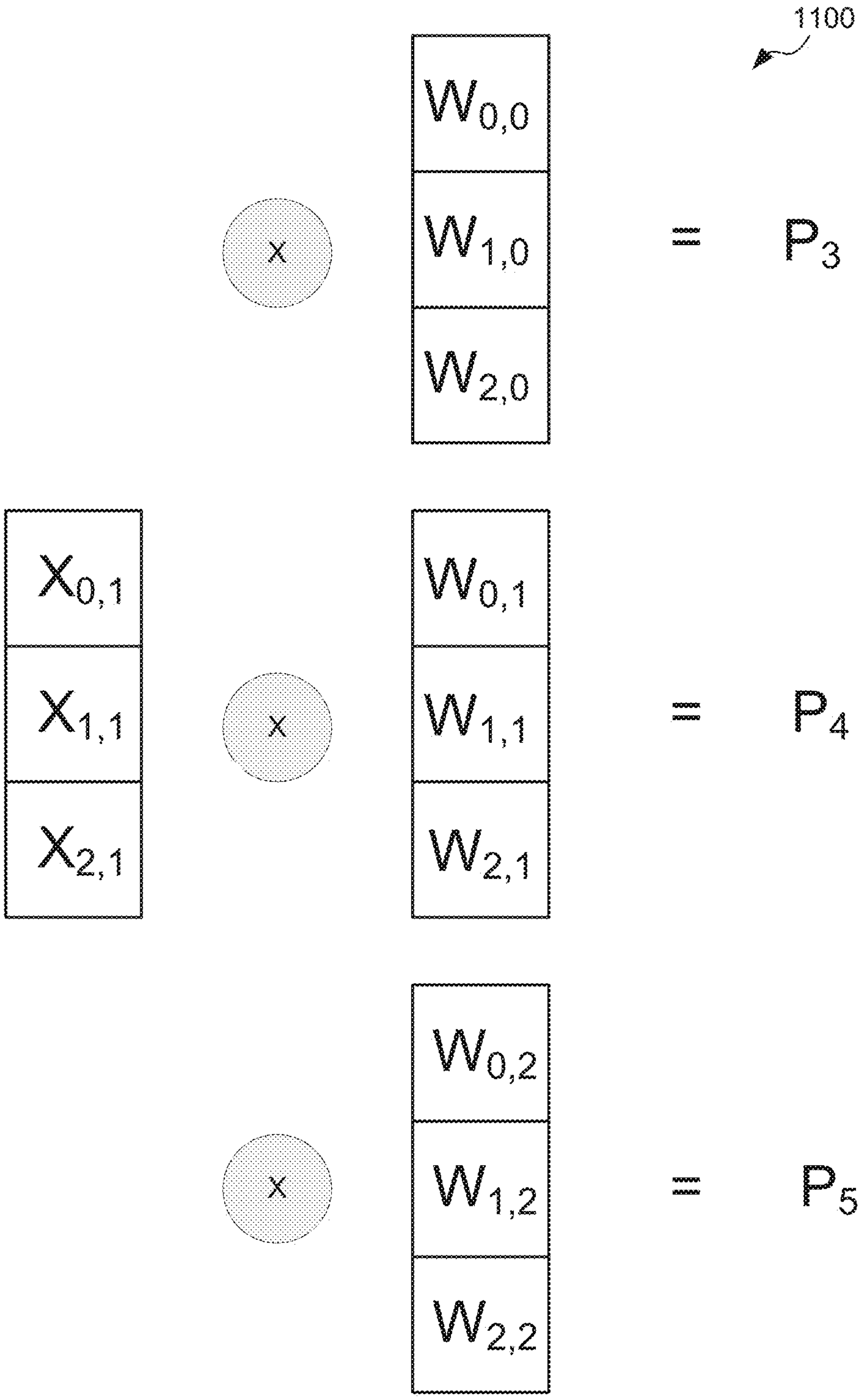
FIG. 11 is a schematic diagram illustrating the multiplications that may be performed by the vertical pool engine of FIG. 7 in a second cycle to perform the convolution of FIG. 8.
Figure 12:
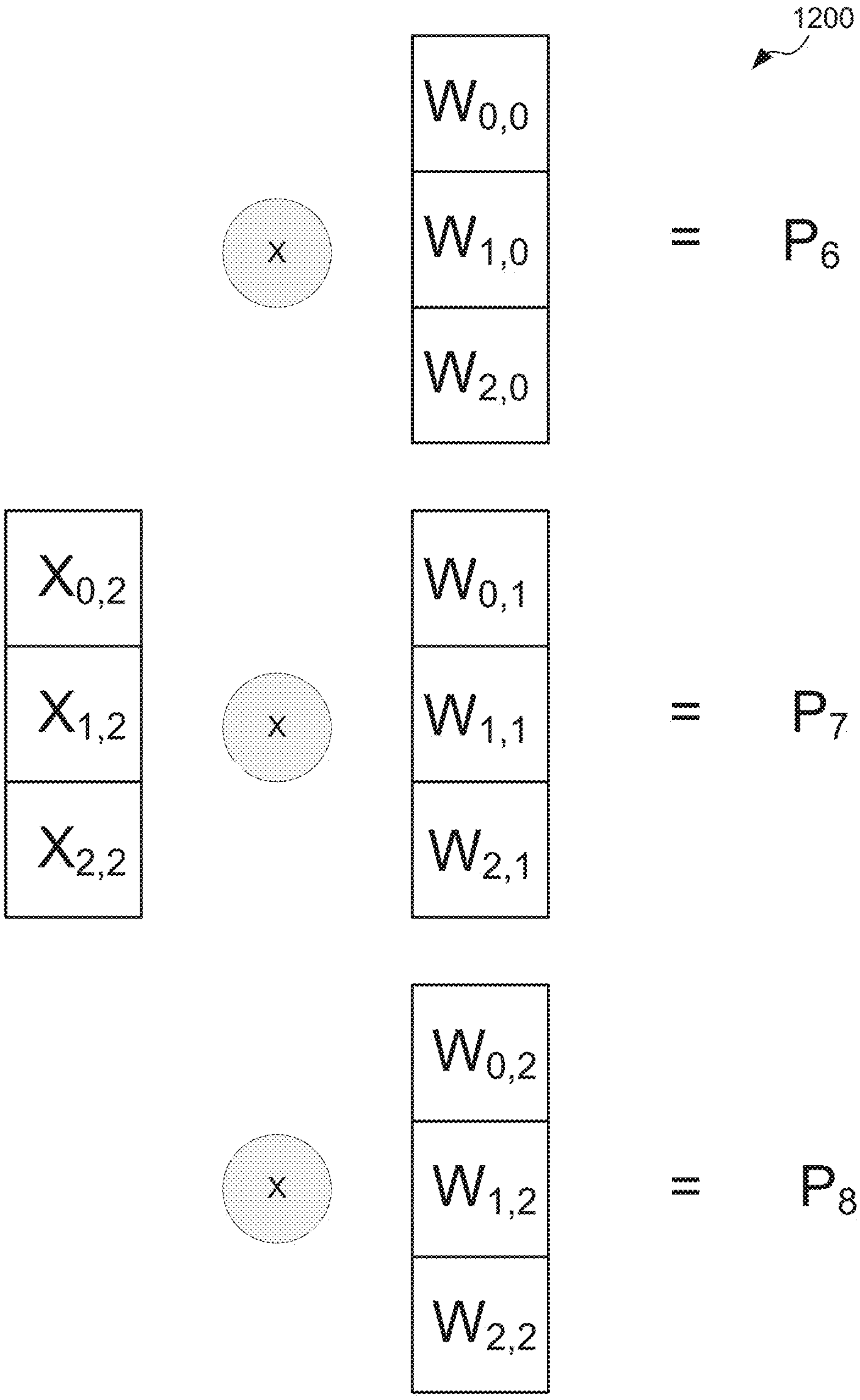
FIG. 12 is a schematic diagram illustrating the multiplications that may be performed by the vertical pool engine of FIG. 7 in a third cycle to perform the convolution of FIG. 8.

The operation of the reduction engine 504 of FIG. 6, when the vertical pool engine 602 is implemented as shown in FIG. 7, to generate a weighted sum (as part of a depth-wise convolution operation) will now be described for an example using FIGS. 8 to 12. Specifically, FIG. 8 illustrates a 4×4 channel 802 of an input tensor which is to be convolved with a 3×3 filter 804 with vertical and horizontal strides of 1. The tensels of the input channel 802 are denoted $X_{x,y}$ where x denotes the row and y denotes the column of the tensel. For example, $X_{1,2}$ is the input tensel at row 1 and column 2 of the channel. The weights in the filter 804 are denoted $W_{x,y}$ where x denotes the row and y denotes the column of the filter. For example, $W_{1,2}$ is the weight at row 1 and column 2 of the filter. A convolution operation between the input channel 802 and the filter 804 of FIG. 8 is performed by sliding the filter 804 across the input channel 802 in the width and height dimensions in accordance with the horizontal and vertical strides respectively and calculating the dot product between the overlapping input tensels and weights at each filter position. This will result in a 2×2 output 806. The tensels of the output 806 are denoted $Z_{x,y}$ where x denotes the row and y denotes the column of the output. For example, $Z_{1,1}$ is the output tensel at row 1 and column 1.

To perform this convolution operation using the reduction engine 504 of FIG. 6 and the vertical pool engine 602 of FIG. 7, the weights in the first column of the filter ($W_{0,0}$, $W_{1,0}$, $W_{2,0}$) are loaded into the first multiplication unit, the weights in the second column of the filter ($W_{0,1}$, $W_{1,1}$, $W_{2,1}$) are loaded into the second multiplication unit, and the weights in the third column of the filter ($W_{0,2}$, $W_{1,2}$, $W_{2,2}$) are loaded into the third multiplication unit. Then the input tensels of the input channel 802 are provided to the reduction engine 504, and then the multiplication units thereof, a column at a time, where a column of the input channel 802 is a column of a window of the input channels. The windows of the input channel and the size thereof are defined by the size of the filter, the stride(s) of the convolution, and the dilation of the convolution. Specifically, in the example of FIG. 8, since the filter is 3×3 in size, the dilation is 1 and the strides in the horizontal and vertical directions are 1, the windows comprise 3×3 blocks of tensels which are one column or one row apart. For example Table 1 shows the tensels forming the first 3×3 window of the input channel and Table 2 shows the tensels for the second 3×3 window of the input channel. Therefore in this example, each column of tensels provided to the reduction engine 504 comprises a block of 3 consecutive tensels in the same column. The columns are provided in horizontal order and then vertical order. Specifically, all the columns in the same three rows are provided before providing columns in the next three rows.

TABLE 1

| First 3 × 3 Window of Input Channel | | |
|---|---|---|
| First Column | Second Column | Third Column |
| $X_{0,0}$ | $X_{0,1}$ | $X_{0,2}$ |
| $X_{1,0}$ | $X_{1,1}$ | $X_{1,2}$ |
| $X_{2,0}$ | $X_{2,1}$ | $X_{2,2}$ |

TABLE 2

| Second 3 × 3 Window of Input Channel | | |
|---|---|---|
| First Column | Second Column | Third Column |
| $X_{0,1}$ | $X_{0,2}$ | $X_{0,3}$ |
| $X_{1,1}$ | $X_{1,2}$ | $X_{1,3}$ |
| $X_{2,1}$ | $X_{2,2}$ | $X_{2,3}$ |

Accordingly, in a first cycle (cycle 0), the vertical pool engine 602 is provided with the first three tensels in column 0 ($X_{0,0}$, $X_{1,0}$, $X_{2,0}$) of the input channel and the vertical pool engine 602 is configured to calculate the weighted sum of those tensels for each column of weights. In particular, the first multiplication unit is configured to generate $W_{0,0}*X_{0,0}$, $W_{1,0}*X_{1,0}$, $W_{2,0}*X_{2,0}$, the second multiplication unit is configured to generate $W_{0,1}*X_{0,0}$, $W_{1,1}*X_{1,0}$, $W_{2,1}*X_{2,0}$, the third multiplication unit is configured to generate $W_{0,2}*X_{0,0}$, $W_{1,2}*X_{1,0}$, $W_{2,2}*X_{2,0}$; and the first summation unit is configured to generate the sum $W_{0,0}*X_{0,0}+W_{1,0}*X_{1,0}+W_{2,0}*X_{2,0}$, the second summation unit is configured to generate the sum $W_{0,1}*X_{0,0}+W_{1,1}*X_{1,0}+W_{2,1}*X_{2,0}$, and the third summation unit is configured to generate the sum $W_{0,2}*X_{0,0}+W_{1,2}*X_{1,0}+W_{2,2}*X_{2,0}$. This results in the following three column outputs (which may also be referred to as partial outputs)—$P_0$, $P_1$, $P_2$—which is illustrated at 900 of FIG. 9.

$$P_0=W_{0,0}*X_{0,0}+W_{1,0}*X_{1,0}+W_{2,0}*X_{2,0}$$

$$P_1=W_{0,1}*X_{0,0}+W_{1,1}*X_{1,0}+W_{2,1}*X_{2,0}$$

$$P_2=W_{0,2}*X_{0,0}+W_{1,2}*X_{1,0}+W_{2,2}*X_{2,0}$$

The three column outputs ($P_0$, $P_1$, $P_2$) are stored in the collector storage unit. Where the collector storage unit is implemented as a shift register, the three column outputs ($P_0$, $P_1$, $P_2$) may be shifted onto the shift register in order as shown at 1002 of FIG. 10. At this point there are not enough column outputs in the collector storage unit to generate a block output. Specifically, the first weighted sum block output is the weighted sum of the first window of the input channel (shown in Table 1) with the filter. At this point only the first column output is in the collector storage unit. Accordingly, the horizontal pool engine 606 may not perform any operation in this cycle.

In the next cycle (cycle 1) the vertical pool engine 602 is provided with the first three tensels in column 1 of the input tensor ($X_{0,1}$, $X_{1,1}$, $X_{2,1}$) and the vertical pool engine 602 is configured to calculate the weighted sum of those tensels for each column of weights. Specifically, the first multiplication unit is configured to generate $W_{0,0}*X_{0,1}$, $W_{1,0}*X_{1,1}$, $W_{2,0}*X_{2,1}$, the second multiplication unit is configured to generate $W_{0,1}*X_{0,1}$, $W_{1,1}*X_{1,1}$, $W_{2,1}*X_{2,1}$, the third multiplication unit is configured to generate $W_{0,2}*X_{0,1}$, $W_{1,2}*X_{1,1}$, $W_{2,2}*X_{2,1}$; and the first summation unit is configured to generate the sum $W_{0,0}*X_{0,1}+W_{1,0}*X_{1,1}+W_{2,0}*X_{2,1}$, the second summation unit is configured to generate the sum $W_{0,1}*X_{0,1}+W_{1,1}*X_{1,1}+W_{2,1}*X_{2,1}$, and the third summation unit is configured to generate the sum $W_{0,2}*X_{0,1}+W_{1,2}*X_{1,1}+W_{2,2}*X_{2,1}$. This results in the following three column outputs (which may also be referred to as partial outputs)—$P_3$, $P_4$, $P_5$—which is illustrated at 1100 of FIG. 11.

$$P_3=W_{0,0}*X_{0,1}+W_{1,0}*X_{1,1}+W_{2,0}*X_{2,1}$$

$$P_4=W_{0,1}*X_{0,1}+W_{1,1}*X_{1,1}+W_{2,1}*X_{2,1}$$

$$P_5=W_{0,2}*X_{0,1}+W_{1,2}*X_{1,1}+W_{2,2}*X_{2,1}$$

The three column outputs ($P_3$, $P_4$, $P_5$) are stored in the collector storage unit. Where the collector storage unit is implemented as a shift register, the three column outputs ($P_3$, $P_4$, $P_5$) may be shifted onto the shift register in order as shown at 1004 of FIG. 10. At this point there are still not enough column outputs in the collector storage unit to generate an output tensel, so the horizontal pool engine 606 may not perform any operation in this cycle.

In the next cycle (cycle 2) the vertical pool engine 602 is provided with the first three tensels in column 2 ($X_{0,2}$, $X_{1,2}$, $X_{2,2}$) of the input channel and the vertical pool engine 602 is configured to calculate the weighted sum of those tensels for each column of weights. Specifically, the first multiplication unit is configured to generate $W_{0,0}*X_{0,2}$, $W_{1,0}*X_{1,2}$, $W_{2,0}*X_{2,2}$, the second multiplication unit is configured to generate $W_{0,1}*X_{0,2}$, $W_{1,1}*X_{1,2}$, $W_{2,1}*X_{2,2}$, the third multiplication unit is configured to generate $W_{0,2}*X_{0,2}$, $W_{1,2}*X_{1,2}$, $W_{2,2}*X_{2,2}$; and the first summation unit is configured to generate the sum $W_{0,0}*X_{0,2}+W_{1,0}*X_{1,2}+W_{2,0}*X_{2,2}$, the second summation unit is configured to generate the sum $W_{0,1}*X_{0,2}+W_{1,1}*X_{1,2}+W_{2,1}*X_{2,2}$, and the third summation unit is configured to generate the sum $W_{0,2}*X_{0,2}+W_{1,2}*X_{1,2}+W_{2,2}*X_{2,2}$. This results in the following three column outputs (which may also be referred to as partial outputs)—$P_6$, $P_7$, $P_8$—which is illustrated at 1200 of FIG. 12.

$$P_6=W_{0,0}*X_{0,2}+W_{1,0}*X_{1,2}+W_{2,0}*X_{2,2}$$

$$P_7=W_{0,1}*X_{0,2}+W_{1,1}*X_{1,2}+W_{2,1}*X_{2,2}$$

$$P_8=W_{0,2}*X_{0,2}+W_{1,2}*X_{1,2}+W_{2,2}*X_{2,2}$$

The three column outputs ($P_6$, $P_7$, $P_8$) are stored in the collector storage unit. Where the collector storage unit is implemented as a shift register, the three column outputs ($P_6$, $P_7$, $P_8$) may be shifted onto the shift register in order as shown at 1006 of FIG. 10. At this point the collector storage unit comprises enough column outputs to generate a block output (e.g. output tensel $Z_{0,0}$). Specifically, column outputs $P_0$, $P_4$, and $P_8$ can be combined to generate a weighted sum for the first block or window of the input channel (i.e. output tensel $Z_{0,0}$). Accordingly, the horizontal pool engine 606 may be configured to select column outputs $P_0$, $P_4$, and $P_8$ and generate the sum thereof to generate a first block output.

In the next cycle (cycle 3) the first three tensels of column 3 ($X_{0,3}$, $X_{1,3}$, $X_{2,3}$) of the input channel are provided to the vertical pool engine 602. The multiplication units and the summation units then together generate the following three column outputs—$P_9$, $P_{10}$, $P_{11}$.

$$P_9=W_{0,0}*X_{0,3}+W_{1,0}*X_{1,3}+W_{2,0}*X_{2,3}$$

$$P_{10}=W_{0,1}*X_{0,3}+W_{1,1}*X_{1,3}+W_{2,1}*X_{2,3}$$

$$P_{11}=W_{0,2}*X_{0,3}+W_{1,2}*X_{1,3}+W_{2,2}*X_{2,3}$$

The three column outputs ($P_9$, $P_{10}$, $P_{11}$) are stored in the collector storage unit. Where the collector storage unit is implemented as a shift register, the three column outputs ($P_9$, $P_{10}$, $P_{11}$) may be shifted onto the shift register in order as shown at 1008 of FIG. 10. The horizontal pool engine 606 then selects column outputs $P_3$, $P_7$, and $P_{11}$ and generates the sum thereof to generate a second block output (e.g. output tensel $Z_{0,1}$)—i.e. the block output for window 2 (Table 2 above).

Since there are no more columns of the input channel at this vertical position, this is repeated for the columns starting at the next vertical position. Specifically, the tensels in rows 1-3 of column 0 are provided to the vertical pool engine and weighted sum column outputs are generated therefore and stored in the collector storage unit; the tensels in rows 1-3 of column 1 are provided to the vertical pool engine 602 and weighted sum column outputs are generated therefore and stored in the collector storage unit; the tensels in rows 1-3 of column 2 are provided to the vertical pool engine and weighted sum column outputs are generated therefore and stored in the collector storage unit; and then the tensels in rows 1-3 of column 3 are provided to the vertical pool engine and weighted sum column outputs are generated therefore and stored in the collector storage unit. This is shown in Table 3 below and FIG. 10. The shift register after cycles 4, 5, 6 and 7 are shown at 1010, 1012, 1014 and 1016 of FIG. 10.

TABLE 3

| Cycle | Weighted Sum Column Output | Input Tensels | | | Weights | | |
|---|---|---|---|---|---|---|---|
| 0 | $P_0$ | $X_{0,0}$ | $X_{1,0}$ | $X_{2,0}$ | $W_{0,0}$ | $W_{1,0}$ | $W_{2,0}$ |
| | $P_1$ | $X_{0,0}$ | $X_{1,0}$ | $X_{2,0}$ | $W_{0,1}$ | $W_{1,1}$ | $W_{2,1}$ |
| | $P_2$ | $X_{0,0}$ | $X_{1,0}$ | $X_{2,0}$ | $W_{0,2}$ | $W_{1,2}$ | $W_{2,2}$ |
| 1 | $P_3$ | $X_{0,1}$ | $X_{1,1}$ | $X_{2,1}$ | $W_{0,0}$ | $W_{1,0}$ | $W_{2,0}$ |
| | $P_4$ | $X_{0,1}$ | $X_{1,1}$ | $X_{2,1}$ | $W_{0,1}$ | $W_{1,1}$ | $W_{2,1}$ |
| | $P_5$ | $X_{0,1}$ | $X_{1,1}$ | $X_{2,1}$ | $W_{0,2}$ | $W_{1,2}$ | $W_{2,2}$ |
| 2 | $P_6$ | $X_{0,2}$ | $X_{1,2}$ | $X_{2,2}$ | $W_{0,0}$ | $W_{1,0}$ | $W_{2,0}$ |
| | $P_7$ | $X_{0,2}$ | $X_{1,2}$ | $X_{2,2}$ | $W_{0,1}$ | $W_{1,1}$ | $W_{2,1}$ |
| | $P_8$ | $X_{0,2}$ | $X_{1,2}$ | $X_{2,2}$ | $W_{0,2}$ | $W_{1,2}$ | $W_{2,2}$ |
| 3 | $P_9$ | $X_{0,3}$ | $X_{1,3}$ | $X_{2,3}$ | $W_{0,0}$ | $W_{1,0}$ | $W_{2,0}$ |
| | $P_{10}$ | $X_{0,3}$ | $X_{1,3}$ | $X_{2,3}$ | $W_{0,1}$ | $W_{1,1}$ | $W_{2,1}$ |
| | $P_{11}$ | $X_{0,3}$ | $X_{1,3}$ | $X_{2,3}$ | $W_{0,2}$ | $W_{1,2}$ | $W_{2,2}$ |
| 4 | $P_{12}$ | $X_{1,0}$ | $X_{2,0}$ | $X_{3,0}$ | $W_{0,0}$ | $W_{1,0}$ | $W_{2,0}$ |
| | $P_{13}$ | $X_{1,0}$ | $X_{2,0}$ | $X_{3,0}$ | $W_{0,1}$ | $W_{1,1}$ | $W_{2,1}$ |
| | $P_{14}$ | $X_{1,0}$ | $X_{2,0}$ | $X_{3,0}$ | $W_{0,2}$ | $W_{1,2}$ | $W_{2,2}$ |
| 5 | $P_{15}$ | $X_{1,1}$ | $X_{2,1}$ | $X_{3,1}$ | $W_{0,0}$ | $W_{1,0}$ | $W_{2,0}$ |
| | $P_{16}$ | $X_{1,1}$ | $X_{2,1}$ | $X_{3,1}$ | $W_{0,1}$ | $W_{1,1}$ | $W_{2,1}$ |
| | $P_{17}$ | $X_{1,1}$ | $X_{2,1}$ | $X_{3,1}$ | $W_{0,2}$ | $W_{1,2}$ | $W_{2,2}$ |
| 6 | $P_{18}$ | $X_{1,2}$ | $X_{2,2}$ | $X_{3,2}$ | $W_{0,0}$ | $W_{1,0}$ | $W_{2,0}$ |
| | $P_{19}$ | $X_{1,2}$ | $X_{2,2}$ | $X_{3,2}$ | $W_{0,1}$ | $W_{1,1}$ | $W_{2,1}$ |
| | $P_{20}$ | $X_{1,2}$ | $X_{2,2}$ | $X_{3,2}$ | $W_{0,2}$ | $W_{1,2}$ | $W_{2,2}$ |
| 7 | $P_{21}$ | $X_{1,3}$ | $X_{2,3}$ | $X_{3,3}$ | $W_{0,0}$ | $W_{1,0}$ | $W_{2,0}$ |
| | $P_{22}$ | $X_{1,3}$ | $X_{2,3}$ | $X_{3,3}$ | $W_{0,1}$ | $W_{1,1}$ | $W_{2,1}$ |
| | $P_{23}$ | $X_{1,3}$ | $X_{2,3}$ | $X_{3,3}$ | $W_{0,2}$ | $W_{1,2}$ | $W_{2,2}$ |

It can be seen that column outputs generated in the same cycle can be used to generate more than one block output. For example, in the third cycle, column outputs $P_6$, $P_7$, $P_8$ are generated, $P_8$ is used to generate block output $Z_{0,0}$, and $P_7$ is used to generate block output $Z_{0,1}$.

It can also be seen that each time the vertical pool engine starts processing a new row of windows, the horizontal pool engine has to wait a number of cycles before it can start generating block outputs. The number of cycles the horizontal pool engine has to wait is based on the size of the filters to be applied to the channels of the input tensor. As described below, the number of cycles may also be based on whether there is any padding. For example, weighted sum column outputs for three different columns are needed to generate a weighted sum block output for a 3×3 filter, thus after 3 processing cycles of the vertical pool engine there will be enough column outputs to generate a weighted sum block output. From that point on, though, one block output per cycle can be generated until the end of the row is reached. However, only weighted sum column outputs for two different columns are needed to generate a weighted sum block output for a 2×2 filter, thus after 2 processing cycles of the vertical pool engine 602 there are enough column outputs to generate a weighted sum block output.

It can be seen that the output for an input channel is generated one output row or line at a time. Specifically, the first row of output elements ($Z_{0,0}$ $Z_{0,1}$) is generated first and then the second row of output elements ($Z_{1,0}$, $Z_{1,1}$) is generated.

It can be seen that in the above example, not all of the column outputs generated by the vertical pool engine 602 and stored in the collector storage unit 604 are used by the horizontal pool engine 606 to generate a block output. Specifically, $P_1$, $P_2$, $P_5$, $P_6$, $P_9$, $P_{10}$ etc. are not used to generate a block output. In some cases, if a weighted sum column output is not be used to generate a block output, then the column output may simply be discarded. However, in other cases, the vertical pool engine 602 may comprise additional logic (not shown) to disable a multiplication unit and/or summation unit if it is known that the weighted sum generated thereby is not going to be used by the horizontal pool engine 606 to generate a block output. In determining whether to add such logic, the power savings associated with disabling a multiplication unit and/or summation unit may be balanced between the additional logic (and the power it consumes). Where it is determined that such logic will only be used occasionally (e.g. when most of the column outputs are expected to be used to generate a block output) then the limited power savings may not justify the additional hardware.

Figure 13:
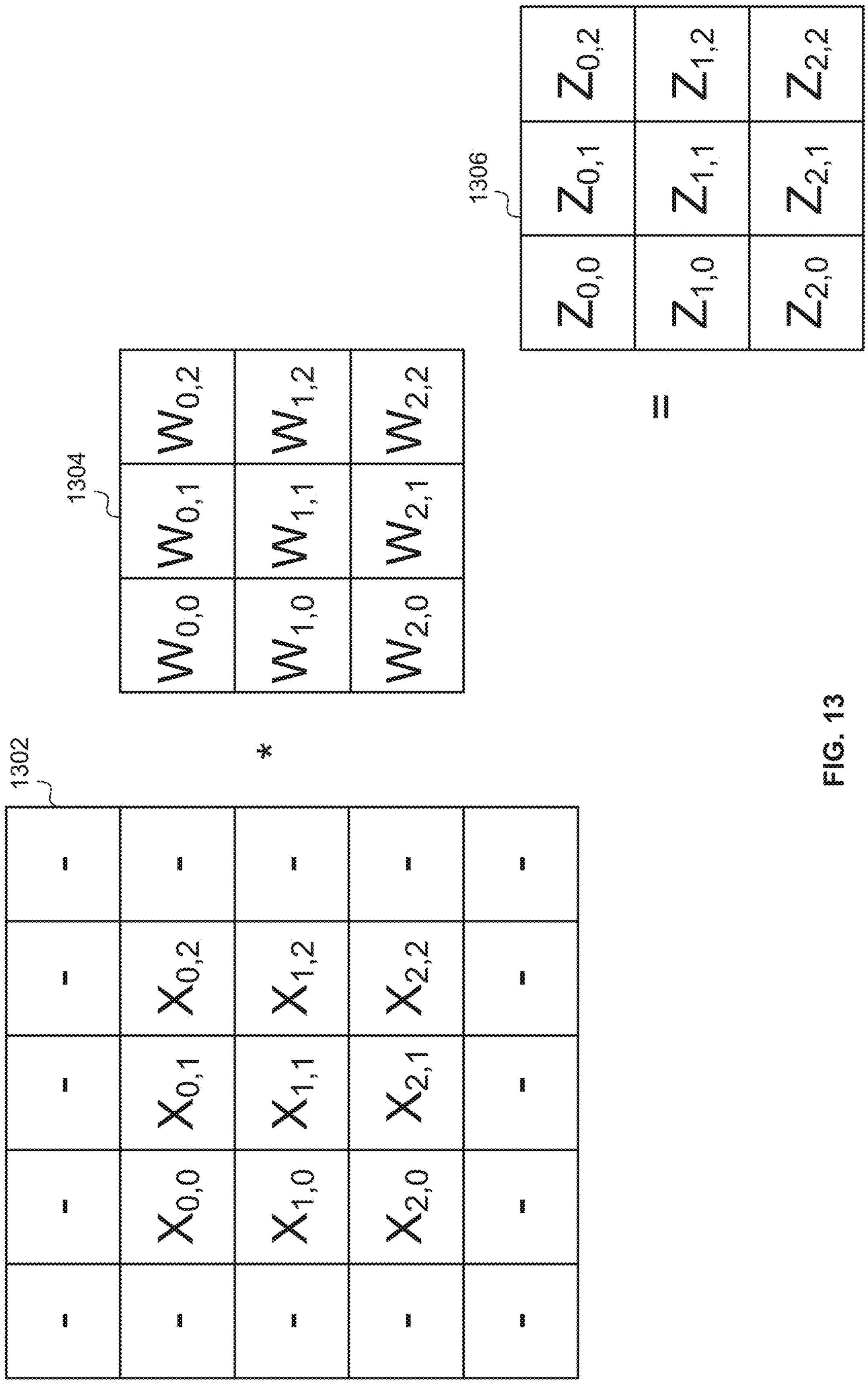
FIG. 13 is a schematic diagram illustrating an example convolution between a padded 3×3 channel of an input tensor and a 3×3 filter.

The above example describes how the reduction engine, and the vertical pool engine thereof, may implement a depth-wise convolution where the stride is 1 in the horizontal and vertical directions, and there is no padding. However, the vertical pool engine 602 may also support depth-wise convolutions with a stride greater than 1 in the horizontal and/or vertical direction, and padding in one or more directions. As is known to those of skill in the art, by default, a convolution starts with the data or element in the top left corner of the input tenser (e.g. element $X_{0,0}$ of input channel 802 FIG. 8) aligned with the weight in the top left corner of the filter (e.g. weight $W_{0,0}$ of filter 804 of FIG. 8) and the filter is stepped across the input according to the stride in the horizontal and vertical directions. This is referred to as a zero-padding convolution. Padding is the addition of rows and/or columns with null values to the input. For example, FIG. 13 shows a padded input channel 1302 which is a 3×3 input channel with a row of padding added to the top, a row of padding added to the bottom, a column of padding added to the left and a column of padding added to the right. In this example, a convolution between the padded input channel 1302 and a 3×3 filter 1304 starts with element $X_{0,0}$ aligned with weight $W_{1,1}$ of the filter 1304 and produces a 3×3 output 1306.

Where there is at least one column of padding then, instead of generating column output(s) for that column, in some cases, zero column output(s) may be simply stored in the collector storage unit while the next or previous column output(s) are being generated. This can reduce the number of cycles the horizontal pool engine 606 has to wait until there are enough column outputs in the collector storage unit to generate an output value or element. For example, to perform a convolution between the padded input channel 1302 of FIG. 13 and the filter 1304 of FIG. 13 in the same manner as the convolution between the input channel 802 of FIG. 8 and the filter 804 of FIG. 8, the first three tensels in the first column of the padded input channel 1302 are provided to the vertical pool engine in a first cycle where a weighted sum is generated for those tensels for each column of weights. However, since it is known that each column output for this column of tensels will be zero, instead of performing the weighted sum calculations for this column of tensels, the collector storage unit is initialised with zero values for these column outputs, and the next column of tensels (i.e. the first three tensels in the second column of the padded input channel 1302) are provided to the vertical pool engine. This means that after the first cycle, the collector storage unit already has column outputs for the first two columns.

Figure 14:
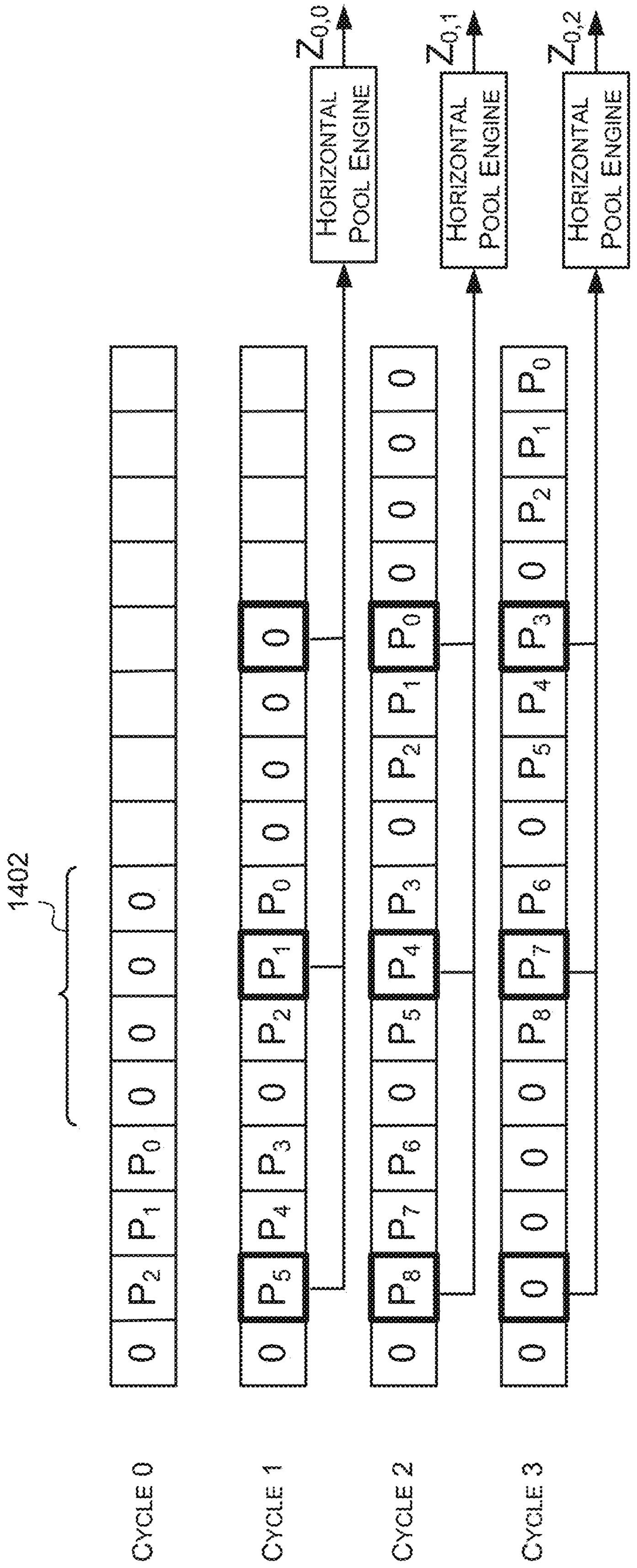
FIG. 14 is a schematic diagram illustrating the state of the collector storage unit of FIG. 6 over several cycles when the reduction engine is configured to perform the convolution of FIG. 13.

This is illustrated in Table 4 and FIG. 14. Specifically, Table 4 shows which input tensels are provided to the vertical pool engine, and what weighted sum column outputs are generated therefrom, each cycle to generate the first row of the output (i.e. output elements $Z_{0,0}$, $Z_{0,1}$ and $Z_{0,2}$). FIG. 14 shows the collector storage unit after each of these cycles. It can be seen that, since the first column is comprised of only zero or null values, instead of providing zeros to the vertical pool engine, a set of zero column outputs are written to the collector storage unit at 1402 and the second column of input tensels are provided to the vertical pool engine. Similarly, since the last column comprises only zeroes or null values, instead of providing those zeros to the vertical pool engine 602, a set of zero column outputs may be written to the collector storage unit while, for example, the vertical pool engine 602 is processing the next vertical position of the input channel.

TABLE 4

| Cycle | Weighted Sum Column Output | Input Tensels | | | Weights | | |
|---|---|---|---|---|---|---|---|
| 0 | $P_0$ | 0 | $X_{0,0}$ | $X_{1,0}$ | $W_{0,0}$ | $W_{1,0}$ | $W_{2,0}$ |
| | $P_1$ | 0 | $X_{0,0}$ | $X_{1,0}$ | $W_{0,1}$ | $W_{1,1}$ | $W_{2,1}$ |
| | $P_2$ | 0 | $X_{0,0}$ | $X_{1,0}$ | $W_{0,2}$ | $W_{1,2}$ | $W_{2,2}$ |
| 1 | $P_3$ | 0 | $X_{0,1}$ | $X_{1,1}$ | $W_{0,0}$ | $W_{1,0}$ | $W_{2,0}$ |
| | $P_4$ | 0 | $X_{0,1}$ | $X_{1,1}$ | $W_{0,1}$ | $W_{1,1}$ | $W_{2,1}$ |
| | $P_5$ | 0 | $X_{0,1}$ | $X_{1,1}$ | $W_{0,2}$ | $W_{1,2}$ | $W_{2,2}$ |
| 2 | $P_6$ | 0 | $X_{0,2}$ | $X_{1,2}$ | $W_{0,0}$ | $W_{1,0}$ | $W_{2,0}$ |
| | $P_7$ | 0 | $X_{0,2}$ | $X_{1,2}$ | $W_{0,1}$ | $W_{1,1}$ | $W_{2,1}$ |
| | $P_8$ | 0 | $X_{0,2}$ | $X_{1,2}$ | $W_{0,2}$ | $W_{1,2}$ | $W_{2,2}$ |

It can be seen from this example that, when there is padding, more of the column outputs are used in generating a block output compared to when there is no padding. For example, only $P_2$ and $P_6$ are not used in generating a block output. At this point in time the most common depth-wise convolution used to implement a neural network is a depth-wise convolution with a 3×3 filter with padding on the left, right, top and bottom.

In yet other cases, where there is at least one column of padding, instead of generating column output(s) for that column, or storing zero column output(s) in the collector storage unit for those columns, the horizontal pool engine 606 may be configured to, for each block output, select and combine only the column outputs from the collector storage unit that are required to generate that block output. For example, in the example shown in Table 4 and FIG. 14, to generate block output $Z_{0,0}$, the horizontal pool engine 606 may be configured to only select column outputs $P_1$ and $P_5$. This may allow the block outputs to be generated in a more efficient manner.

Figure 15:
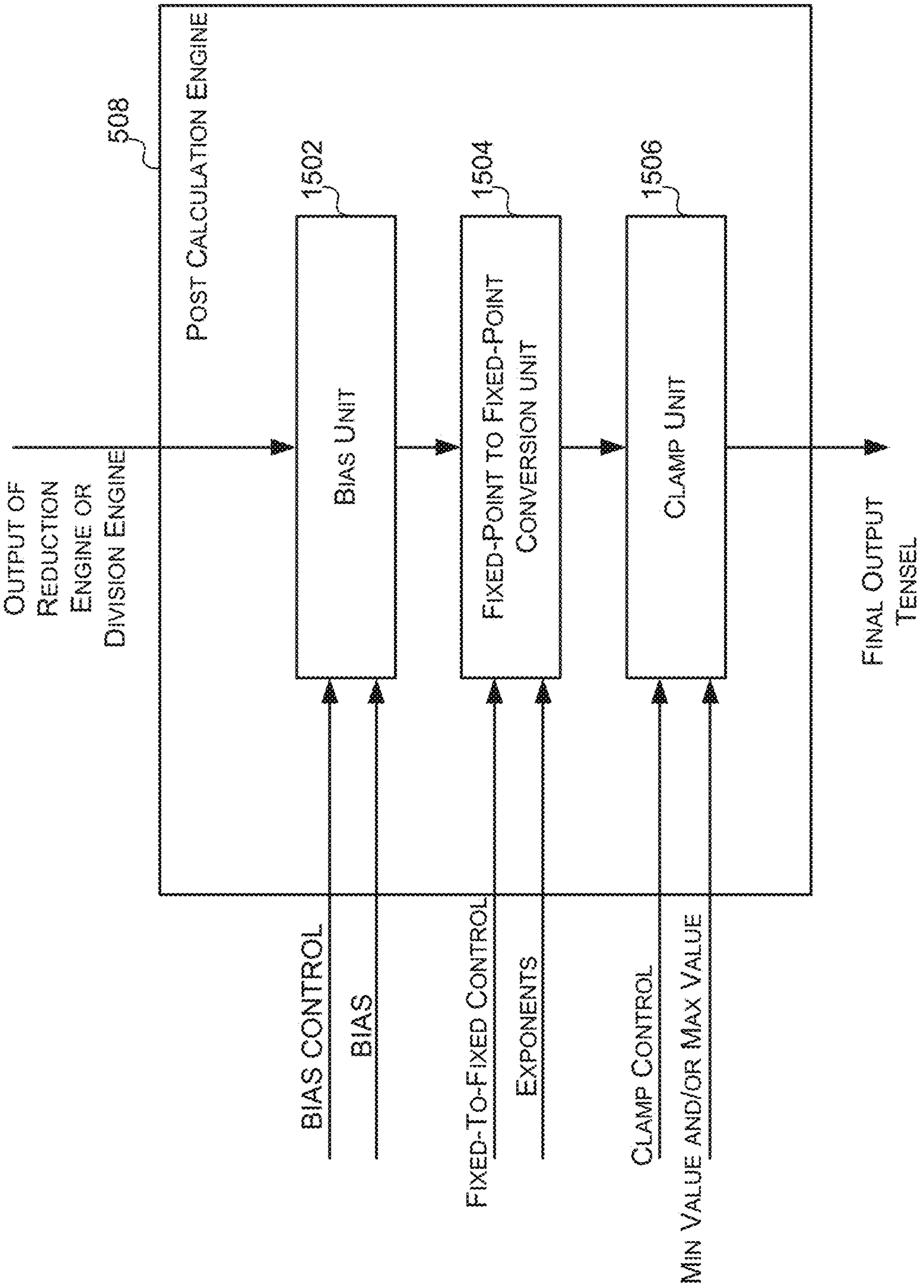
FIG. 15 is a block diagram of an example implementation of the post calculation engine of FIG. 5.

As described above with respect to FIG. 5, in some cases, a pool engine 502 may comprise a post calculation engine 508 which can be used to apply formatting changes etc. to the output of the reduction engine 504 or the division engine 506. Reference is now made to FIG. 15 which illustrates an example implementation of the post calculation engine 508. In the example of FIG. 15 the post calculation engine 508 comprises a bias unit 1502, a fixed-point to fixed-point conversion unit 1504 and a clamp unit 1506. However, this is just an example only and the post calculation may have a different combination of the units described herein, additional units and/or different units.

The bias unit 1502 is configured to receive the output of the reduction engine (i.e. a block output) or the division engine (e.g. a divided block output) and optionally add a bias value thereto. As is known to those of skill in the art, in addition to be associated with a set of weights, a convolution layer of a neural network may be associated with one or more bias values. Specifically, there may be a bias value for each filter applied to the input tensor. When a filter of a convolution layer is associated with a bias value, the final output tensels are generated by adding the bias value to each output element generated by the convolution of the filter and the relevant portion of the input tensor. For example, in the example shown in FIG. 8, convolving the input channel 802 with the filter 804 produces four output elements $Z_{0,0}$, $Z_{0,1}$, $Z_{1,0}$, and $Z_{1,1}$. If the filter is associated with bias value E, then E is added to each of $Z_{0,0}$, $Z_{0,1}$, $Z_{1,0}$, and $Z_{1,1}$ to generate the final output tensels.

Since a bias may optionally be applied to the output of the reduction engine and/or division engine the bias unit 1502 may be configured to receive (i) control information (e.g. BIAS CONTROL) indicating whether or not a bias value is to be applied to the received output, and; (ii) if a bias value is to be applied to the received output, the bias value (e.g. BIAS). Where the control information indicates that a bias value is to be applied to the received value then the bias unit 1502 adds the provided bias to the received value. Where, however, the control information indicates that a bias is not to be added to the received value, the bias unit 1502 may be configured to simply pass the received value to the fixed-point to fixed-point conversion unit 1504 unchanged. In other examples, instead of the bias unit 1502 being configured to pass the received value to the fixed-point to fixed-point conversion unit 1504 when a bias is not to be added thereto, there may be a by-pass path that allows the received value to be provided directly to the fixed-point to fixed-point conversion unit 1504 when a bias is not to be added to the received output. In some cases, either each filter of a depth-wise convolution is associated with a bias, or none of the filters is associated with a bias.

The bias unit 1502 may only be able to receive bias values with a maximum bit width (or maximum number of bits). For example, in some cases the bias unit 1502 may only support bias values up to 32 bits. It will be evident to a person of skill in the art that this is an example only, and that other bias units may support a different maximum bit width for the bias values. The bias values may be signed.

As described above, with respect to the vertical pool engine, the reduction engine 504 may be able to receive and process input tensels and weights in one or more data formats. For example, as described above, the reduction engine 504 may be able to receive input tensels and weights in one or more of the following formats: (1) a symmetric fixed point number format wherein each input tensel is represented by a fixed-length mantissa and an exponent which is shared over a group of values (e.g. all input tensels in an input channel may share the same exponent); and (2) an affine fixed point number format—i.e. a fixed point number format which defines an offset and a scale—such as, but not limited to the Q8A format.

When the input tensels (and any weights) are in a symmetric fixed-point number format defined by a mantissa bit length and an exponent, the fixed-point to fixed-point conversion unit 1504 can receive a value in a first symmetric fixed point number format and convert the received value to a second symmetric fixed point number format. The first and second fixed point number formats may have different mantissa bit lengths and the same exponents, the same mantissa bit lengths and different exponents, or different mantissa bit lengths and different exponents. Such a conversion may be performed to put the output data in a format expected by the component that is to receive the output of the configurable pooling processing unit and/or an output format supported by the configurable pooling processing unit.

The fixed-point to fixed-point conversion unit 1504 may be configured to implement the conversion by rounding the value in the first fixed point number format to a representable number in the second fixed-point number format according to a rounding mode (such as, but not limited to, round to nearest, ties away from zero).

Since a fixed-point to fixed-point conversion may optionally be performed, the fixed-point to fixed-point conversion unit 1504 may be configured to receive (i) control information (e.g. FIXED-To-FIXED CONTROL) indicating whether or not a fixed-point to fixed-point conversion is to be performed on the received value, and; (ii) if a fixed-point to fixed-point conversion is to be performed, information identifying the first and/or second fixed point number formats (e.g. EXPONENTS). In one example, shown in FIG. 15, the first and second fixed point number formats may only differ in exponents, and the fixed-point to fixed-point conversion unit 1504 may be configured to receive information that indicates the exponent of the received value, and the desired exponent of the output of the fixed-point to fixed-point conversion unit 1504. In these examples, the fixed-point to fixed-point conversion unit 1504 may determine, from the difference between two exponent values, a number of most significant bits (MSBs) of the received value that are to be discarded. In another example, instead of the fixed-point to fixed-point conversion unit receiving the exponent of the received value and the desired output of the fixed-point to fixed-point conversion unit, the fixed-point to fixed-point conversion unit may simply receive the difference between the two exponent values.

In the example shown in FIG. 15, the fixed-point to fixed-point conversion unit 1504 may receive one of the following: (1) the output of the reduction engine 504 (i.e. a block output), (2) the output of the division engine 506 (i.e. a division output), or (3) the output of the bias unit 1502. While it is advantageous to add the bias before performing the fixed-point to fixed-point conversion so that the bias is taken into account in re-scaling the output, it will be evident to a person of skill in the art that this is an example only and the components of the post calculation engine 508 may be in a different order.

Where a fixed-point to fixed-point conversion is not to be performed for a received value, the fixed-point to fixed-point conversion unit 1504 may be configured to simply pass the received value to the clamp unit 1506 unchanged. In other examples, instead of the fixed-point to fixed-point conversion unit 1504 being configured to pass the received value to the clamp unit 1506 when a fixed-point to fixed-point conversion is not to be performed, there may be a by-pass path that allows the value to be provided directly to the clamp unit 1506 when a fixed-point to fixed-point conversion is not to be performed.

The clamp unit 1506 is configured to receive a value and perform a maximum clamping operation and/or a minimum clamping operation thereon. Performing a maximum clamping operation on a value comprises determining whether the value exceeds a maximum value, and if so, replacing the received value with (or resolving it to) the maximum value. Performing a minimum clamping operation on a value comprises determining whether the value falls below a minimum value, and if so, replacing the received value with (or resolving it to) that minimum value. In other words, the camp unit 1506 can be used to ensure that output tensels of an output channel fall within a desired range. The clamp unit 1506 can be used to implement a simple activation function, such as a ReLU function (i.e. $f(x)=\max(0, x)$).

As described in more detail below, where the configurable pooling processing unit 500 is used in a neural network accelerator that implements a neural network over several hardware passes and also has a dedicated activation processing unit, being able to perform a simple activation function in the configurable pooling processing unit 500 may allow (i) a simple activation function to be applied to a tensor more efficiently, and (ii) may allow more than one activation function to be applied in a single hardware pass. Since a ReLU operation is one of the most common non-linear operations performed in a NN and relatively easy to implement in hardware, this can significantly increase the number of operations that can be performed in a single hardware pass without substantially increasing the complexity of the neural network accelerator.

Since a clamping operation may optionally be performed, the clamp unit 1506 may be configured to receive (i) control information (e.g. CLAMP CONTROL) indicating whether a maximum clamping operation and/or a minimum clamping operation is to be performed; (ii) if a maximum clamping operation is to be performed, information identifying the maximum value (e.g. MAX VALUE); and (iii) if a minimum clamping operation is to be performed, information identifying the minimum value (e.g. MIN VALUE).

Where no clamping operation is to be performed on a received value, the clamp unit 1506 may be configured to simply pass the received value to the output of the post calculation engine 508 as the final output tensel. In other examples, instead of the clamp unit 1506 being configured to pass the received value to the output of the post calculation engine 508 when a clamp operation is not to be performed, there may be a by-pass path that allows the value to be provided directly to the output of the post calculation engine 508 when a clamp operation is not to be performed.

In some cases, a clamping operation is not performed when the received value was generated from an input (input tensor or weights) in an affine fixed point number format and the offset was removed therefrom prior to the calculation. This is because the re-quantisation/re-scaling has not yet been performed. This may occur, for example, when a weighted sum is generated as part of a depth-wise convolution operation from an input tensor that is in an affine fixed point number format.

The bit length of an output tensel generated by the post calculation engine 508 may depend on the operations performed on the received value. For example, in some cases, the output of the reduction engine or the division engine may be 24 bits and if a 32-bit bias value is added thereto the output of the bias unit may be 32 bits. If neither a fixed-point to fixed-point conversion nor a clamping operation is performed thereon the output tensel may then be 32-bits. If, however, a fixed-point to fixed-point conversion is performed on the received value directly or on the received value after a bias has been added thereto the value may be reduced to, for example, a 16 bit value. Therefore in these cases the output tensel may be only 16 bits.

As described above, if the input tensor and/or weights for a depth-wise convolution operation is/are in an affine fixed point number format, it may be efficient to remove the offset(s) therefrom prior to performing the convolution calculations. In such cases, the output values are subsequently re-quantised to the appropriate affine fixed point number format. In some cases, the re-quantisation may be performed by a module or unit external to the configurable pooling processing unit, such as a tensel rescale processing unit described below. In other cases, the configurable pooling processing unit may comprise (e.g. in the post calculation engine 508) hardware that can perform the re-quantisation to the appropriate fixed point number format. Where the configurable pooling processing unit is to form part of a neural network accelerator, it may be more efficient to have an external unit, such as tensel rescale processing unit, which can be used to re-quantise the data generated by multiple different processing units, than to have the requantisation capability built into the configurable pooling processing unit.

Figure 16:
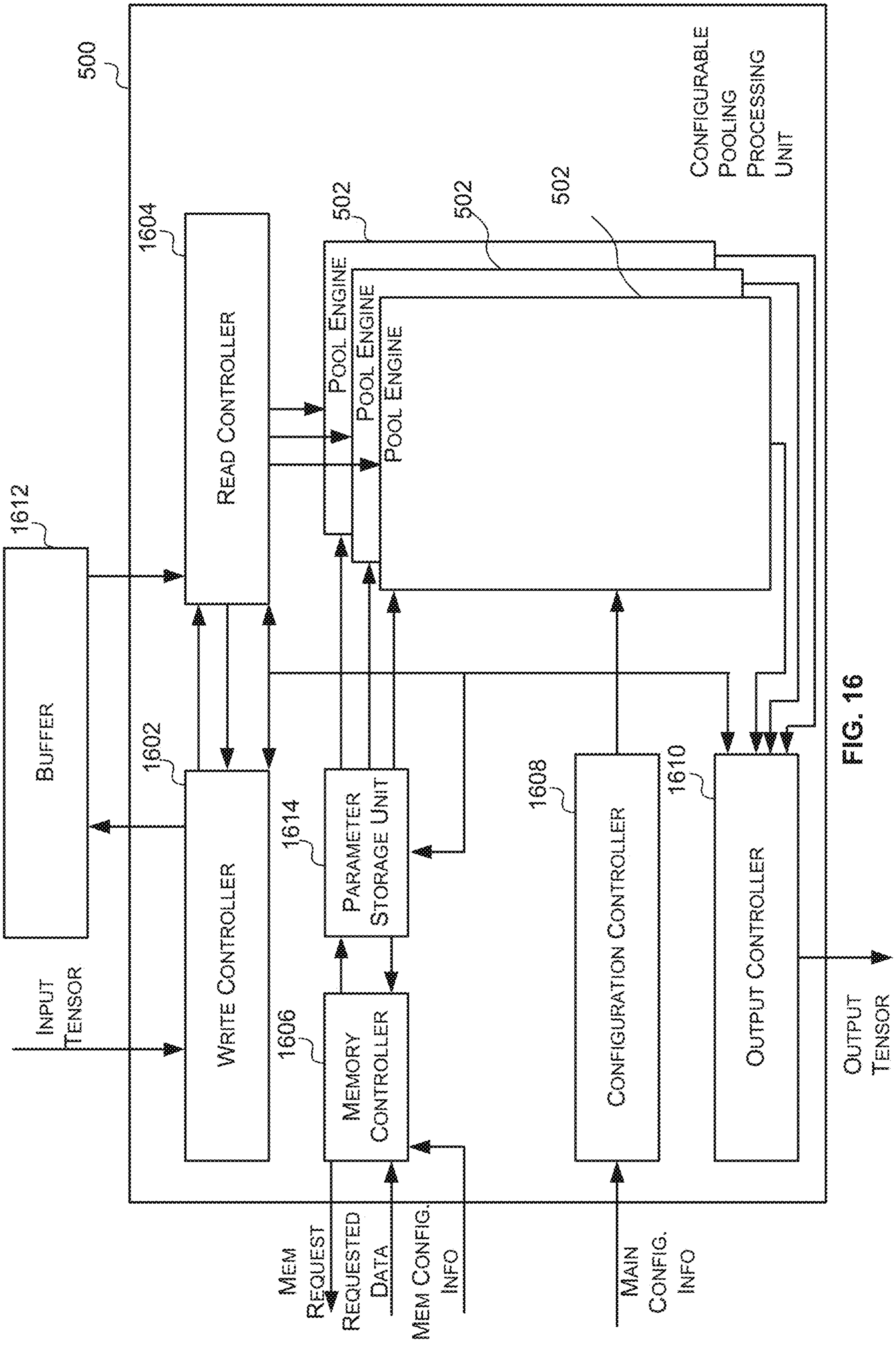
FIG. 16 is a block diagram of an example implementation of the configurable pooling processing unit of FIG. 5 that comprises a parameter storage unit.

Reference is now made to FIG. 16 which illustrates an example implementation of the configurable pooling processing unit 500. The configurable pooling processing unit 500 of FIG. 16 comprises the pool engines 502 of FIG. 5 which operate as described above to process a channel of the input tensor at a time, and a plurality of controller modules 1602, 1604, 1606, 1608, 1610 which are configured to control the flow of data and control information through the configurable pooling processing unit 500.

In the example shown in FIG. 16 the configurable pooling processing unit 500 is configured to receive the input tensor as a stream of input tensels and temporarily store the received input tensels in an external buffer 1612 until they have been processed by a pool engine 502. The external buffer 1612 may not be necessarily large enough to store an entire input tensor, so as input tensels are processed they may be removed from the external buffer 1612 or marked as being available for eviction. As described in more detail below, when the configurable pooling processing unit 500 is part of a neural network accelerator the external buffer 1612 may be shared with other processing units (and therefore referred to as a shared buffer). However, in other examples, the buffer may be internal, or form part of, the configurable pooling processing unit 500.

To manage the receipt, storage and retrieval of the input tensels of an input tensor, the configurable pooling processing unit 500 comprises a write controller 1602 and a read controller 1604. The write controller 1602 is configured to receive the input tensels of the input tensor and store the received input tensels in the external buffer 1612. The read controller 1604 is configured to retrieve the appropriate input tensels from the external buffer 1612 and provide them to the pool engines 502 at the appropriate time.

In some cases, the write controller 1602 may be able to receive a plurality of input tensels each cycle, which may be referred to as a set of input tensels, and store the set of input tensels in the external buffer 1612. As described below, where the configurable pooling processing unit 500 forms part of a neural network accelerator (NNA) the write controller 1403 may, in some cases, be configured to receive the input tensor from a normalisation processing unit.

In some cases, the write controller 1602 may be configured to receive the input tensels of the input tensor in a predetermined order. In some cases, the write controller 1602 may be configured to receive the input tensels of the input tensor in a first processing order, which may be referred to as the partial back end processing order. In other cases, the write controller 1602 may be configured to receive the input tensels in a second, different, processing order, which may be referred to as the front end processing order. In yet other cases, the write controller 1602 may be configured to receive the input tensels of the input tensor in another order. For example, the write controller 1602 may be configured to receive the input tensor in a variation of the front end processing order. Specifically, as described in more detail below, in the front end processing order the tensels are received in sets, wherein each set comprises tensels in the same channel and height, but with different width positions. Where the input bus or interface of the configurable pooling processing unit can receive a certain number of elements each with a maximum bit width, and the bit width or bit length of each element is less than half of the particular bit width, then the write controller 1602 may be configured to receive a set with tensels in multiple channels. For example, if the input bus or interface of the configurable pooling processing unit can receive PARALLELISM elements up to 32-bits wide each cycle, and the input tensels are only 8 bits wide, the write controller 1602 may be configured to receive 4×PARALLELISM tensels per cycle. This may allow the external buffer to be loaded faster in some circumstances.

In the partial back end processing order the elements or tensels of a tensor are received in width order, plane/channel order, then height order, however only a predetermined number (e.g. CALC_BLOCKS) of different width positions are received before receiving the next set of planes/channels.

Figure 17:
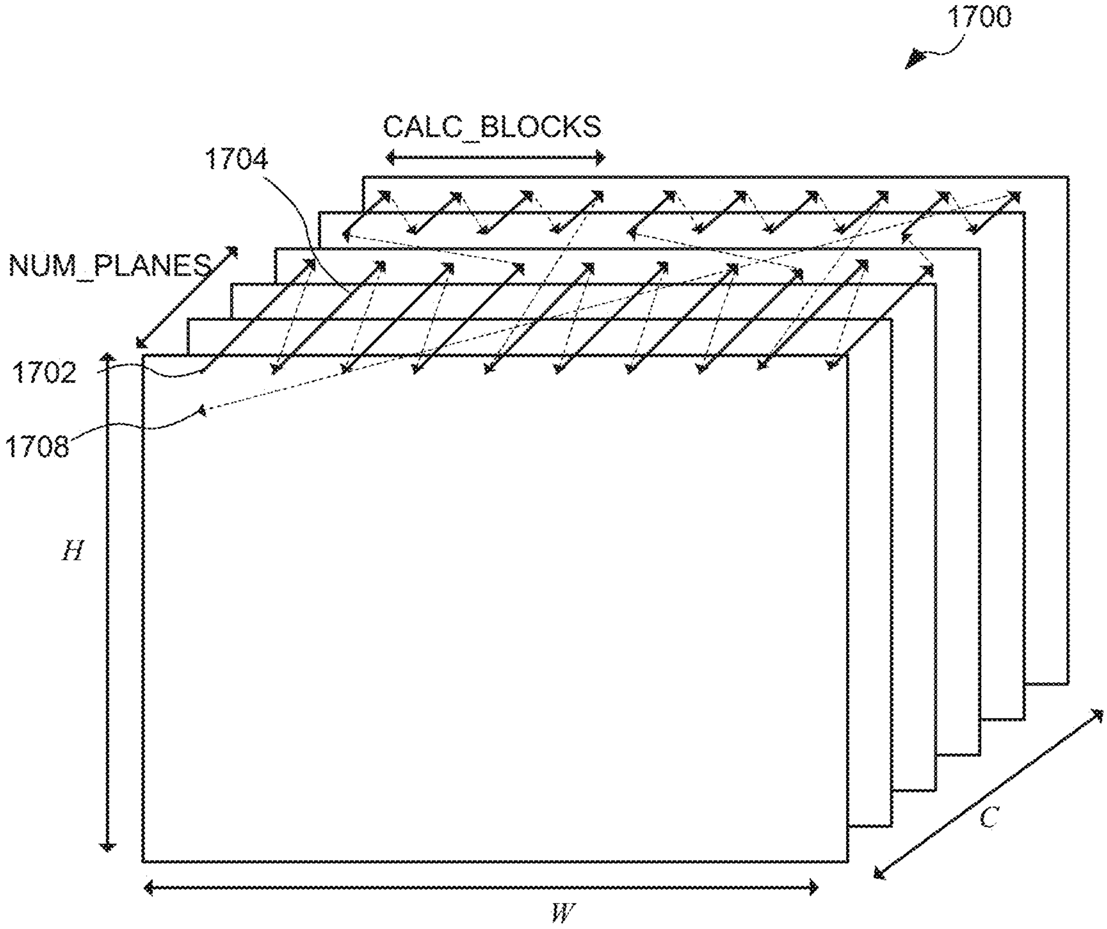
FIG. 17 is a schematic diagram illustrating a partial back end processing order for a tensor.

The partial back end processing order is illustrated in FIG. 17. Specifically, in FIG. 17, the tensels of the tensor 1700 are received in blocks or sets of tensels. A set of tensels that are received together may be referred to as a transaction. Each set of tensels that are received together are identified in FIG. 17 by a solid arrow. The order in which sets of tensels are received is identified by dotted lines. Specifically, after a set of tensels is received, the set of tensels linked to that sets of elements by a dotted line is received. For example, after the set of tensels 1702 is received, the set of tensels 1704 is received. It is noted that all of the sets of tensels of the tensor 1700 that are received are not explicitly identified in FIG. 17. Specifically, after the set of tensels starting at point 1708 is received, further sets of tensels are received. It will be evident to a person of skill in the art, from the description herein, the order in which the remaining tensels of the tensor 1700 are received. If the tensor 1700 can be described as having a width W, height H, and number of channels or planes C (which may also be referred to as the depth) as shown in FIG. 17, then in the partial back end processing order, tensels are received in width order, plane/channel order, then height order. However only a predetermined number (e.g. CALC_BLOCKS) of different width positions are received before moving to the next set of planes.

In particular, in the partial back end processing order, each set of tensels that are received includes tensels in a first predetermined number (e.g. NUM_PLANES) of planes/channels at the same height position and the same width position (e.g. same column and row). At step (1) a second predetermined number (e.g. CALC_BLOCK) of sets of tensels at different width positions are received consecutively. Then at step (2), step (1) is repeated for the next set of planes. Once all the tensels for a set of width positions for all planes have been received, then at step (3) steps (1) and (2) are repeated for the next set of width positions starting with the first set of planes/channels. Once all the tensels for a whole row of the input tensor for all of the channels have been received, then at step (4), steps (1), (2) and (3) are repeated for the next row starting with the first set of planes/channels and the first width positions. Step (4) is then repeated until the entire input tensor has been received. Receiving the tensels of the input tensor in this order may allow the tensels to be efficiently stored in the external buffer 1612.

In some cases, the write controller 1602 may be able to write tensels from a predetermined number of planes/channels to the same position or address in the external buffer. This predetermined number may be referred to as NUM_PLANES. NUM_PLANES may be based on the size of each addressable block of memory of the external buffer and the maximum size of each tensel. For example, if each addressable block of memory of the external buffer is 256 bits and each tensel has a maximum bit width of 16, then NUM_PLANES may be sixteen. NUM_PLANES may be fixed such that if the bit width of the tensels is less than 16 bits then only a portion of each block of memory is used. For example, if the tensels of the input tensor are only 8 bits then only half of each block of memory is used, and if the input tensels of the input tensor are only 4 bits then only a quarter of each block of memory is used. To conserve power for these lower bit widths, each addressable block of memory may be divided into sub-sections (e.g. a 128-bit addressable block may be divided into 64-bit sub-sections) such that if a sub-section is not accessed it may not consume power. It will be evident to a person of skill in the art that these are examples only and that other examples may have a different addressable memory block size, a different maximum tensel bit width and/or a different value for NUM_PLANES.

In some cases, the first predetermined number may be equal to NUM_PLANES such that each set of tensels may comprise tensels from up to NUM_PLANES different planes/channels. In some cases, if the last set of channels comprises less than NUM_PLANES channels, then the transmitter may insert dummy values for the remaining channels and notify the write controller 1602 which tensels are invalid or should not be used. In some cases, NUM_PLANES may be equal to 16, however, it will be evident to a person of skill in the art that this is an example only.

Where the configurable pooling processing unit 500 forms part of a neural network accelerator that comprises a convolution processing unit that comprises a number of convolution engines, which may be referred to as CALC_BLOCKS, the second predetermined number may be equal to CALC_BLOCKS, such that CALC_BLOCKS width positions are received before moving to the next set of planes/channels.

Figure 18:
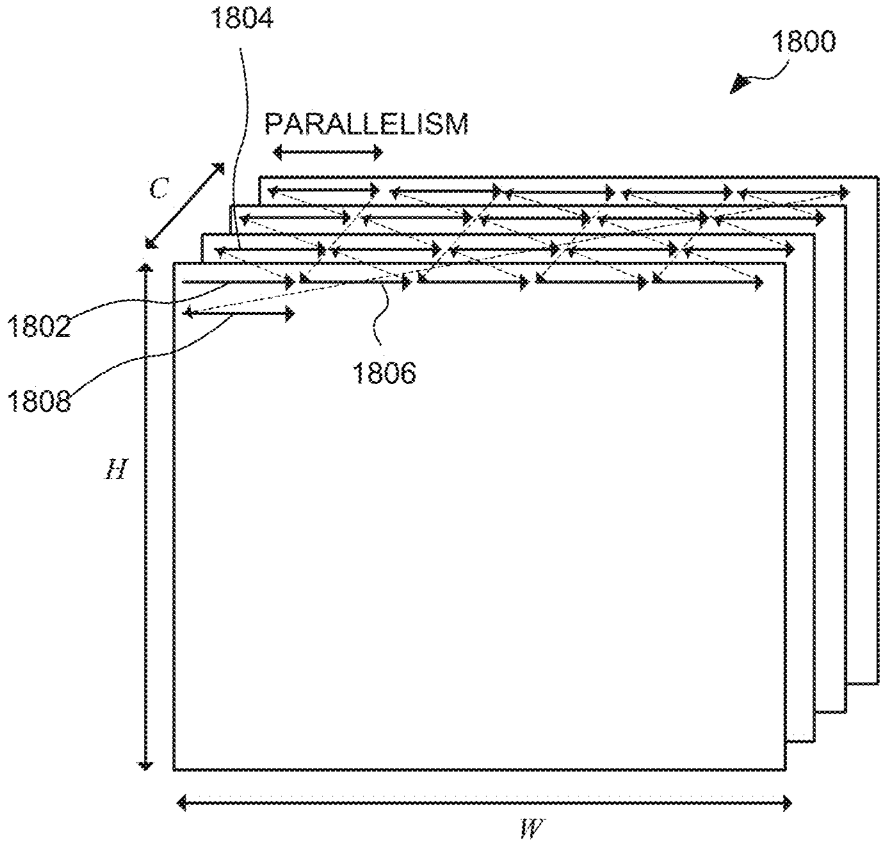
FIG. 18 is a schematic diagram illustrating a front end processing order for a tensor.

In the front end processing order, the elements or tensels of a tensor are received in plane/channel order, width order, then height order. The partial back end processing order is illustrated in FIG. 18. Specifically, in FIG. 18, the tensels of the tensor 1800 are received in blocks or sets of tensels. The number of tensels in set (i.e. PARALLELISM) may be the width of the input bus or input interface of the configurable pooling processing unit (e.g. the number of elements that can be received at the same time). A set of tensels that are received together may be referred to as a transaction. Each set of tensels that are received together are identified in FIG. 18 by a solid arrow. The order in which sets of tensels are received is identified by dotted lines. Specifically, after a set of tensels is received, the set of tensels linked to that sets of elements by a dotted line is received. For example, after the set of tensels 1802 is received, the set of tensels 1804 is received. It is noted that all of the sets of tensels of the tensor 1800 that are received are not explicitly identified in FIG. 18. Specifically, after the set of tensels 1808 is received further sets of tensels are received. It will be evident to a person of skill in the art, from the description herein, the order in which the remaining tensels of the tensor 1800 are received. If the tensor 1800 can be described as having a width W, height H, and number of channels or planes C (which may also be referred to as the depth) as shown in FIG. 18, then in the front end processing order tensels are received in plane/channel order, width order, then height order.

In particular, in the front end processing order, each set of tensels includes tensels in a first predetermined number (e.g. PARALLELISM) of width positions at the same height position and in the same channel/plane. At step (1) each sets of tensels at the same height position and the same width positions are received consecutively, starting with those in the first channel (e.g. the set of tensels 1802 are received, then the set of tensels 1804 are received and so on). Once all the tensels at those width positions have been received for all channels, then at step (2), step (1) is repeated for the next set of width positions, starting with the first channel (e.g. after all the tensels at the width positions in the set of tensels 1804 have been received from all channels, the set of tensels 1806 is received). Once all the tensels for a whole row of the input tensor for all of the channels have been received, then at step (3), steps (1) and (2) are repeated for the next row starting with the first channel and the first width positions (e.g. the set of tensels 1808 is received). Step (3) is then repeated until the entire input tensor has been received.

As described above, the write controller 1602 may be able to write tensels from a predetermined number of planes/channels (NUM_PLANES) to the same position or address in the external buffer 1612. It can be seen that when the input tensor is received in front end processing order it will take several cycles (e.g. NUM_PLANES cycles) to receive enough tensels for a write to the external buffer 1612. Accordingly, when the configurable pooling processing unit is configured to receive the input tensor in a front end processing order, the write controller may have a small buffer or other storage unit which it can use to temporarily store a plurality of received sets of tensels before writing the tensels to the external buffer 1612. In some cases, the external buffer 1612 may be divided into a predetermined number (e.g. NUM_BANKS) of banks. In such cases, after NUM_PLANES cycles, the write controller 1602 may be able to write NUM_PLANES blocks to the external buffer at a time—this may be referred to as a write transaction. If PARALLELISM>NUM_BANKS, then there will be PARALLELISM/NUM_BANKS write transactions every NUM_PLANES cycles.

Where the configurable pooling processing unit forms part of a neural network accelerator with a configurable pipeline, as described below, being able to receive the input tensor in the front end processing order may allow the configurable pooling processing unit to receive an input tensor from more processing units etc. instead of being restricted to those processing units that are able to output a tensor in partial back end processing order.

Returning to FIG. 16, the read controller 1604 is configured to retrieve the appropriate input tensels from the external buffer 1612 and provide them to the pool engines 502 at the appropriate time. For example, if the input channel 802 of FIG. 8 represents a channel of the received input tensor which is to be convolved with the filter 804 of FIG. 8, then the read controller 1604 may be configured to provide input tensels $X_{0,0}$, $X_{1,0}$, $X_{2,0}$ to a pool engine (and specifically a vertical pool engine 602 thereof) in a first cycle, provide input tensels $X_{0,1}$, $X_{1,1}$, $X_{2,1}$ to the same pool engine 502 in the next cycle, provide input tensels $X_{0,2}$, $X_{1,2}$, $X_{2,2}$ to the same pool engine 502 in a third cycle and so on. Once the first row of input tensels ($X_{0,0}$, $X_{0,1}$, $X_{0,2}$, $X_{0,3}$) have been provided to the pool engine they are no longer required and can be removed from, or marked as available for eviction from, the external buffer 1612.

As described above, in some cases, each address of the external buffer 1612 may be able to store, at the same address, up to NUM_PLANES tensels at the same width and height position, but different channels. Where NUM_PLANES is greater than or equal to the number of pool engines, this allows the read controller 1604 to efficiently retrieve the same column or partial column, for up to NUM_PLANES different channels, from the external buffer 1612. The read controller 1604 can then provide each column or partial column pertaining to one channel to each of the pool engines 502. Each pool engine 502 then works on the same column or partial column of a different channel in parallel. In some cases, the read controller 1604 may be able to read at least a G-tensel column, or partial column, for each of up to NUM_PLANES channels from the external buffer 1612 with a single read request or single transaction, where G is the number of tensels that can be processed by the vertical pool engine 602 in a cycle. In some cases, the read controller 1604 may be able to read two G-tensel columns, or partial columns, for each of up to NUM_PLANES channels from the external buffer 1612 with a single read request or single transaction.

In some cases, the read controller 1604 may be configured to provide all of the columns or partial columns for the first NUM_PLANES channels to the pool engines 502 to generate a whole row of the output before moving to the next set of NUM_PLANES channels. This allows efficient use of the column outputs stored in the collector storage unit.

However, in other cases, the read controller 1604 may be configured to only provide enough columns or partial columns for the first NUM_PLANES channels to the pool engines to generate a first predetermined number of outputs of a row before moving to the next set of NUM_PLANES channels. The first predetermined number of outputs may be equal to the output bus or interface width (e.g. OUTPUT_PARALLELISM)—i.e. the number of elements that can be output at the same time. For example, where OUTPUT_PARALLELISM is equal to sixteen, NUM_PLANES is equal to sixteen, the number of channels of the input tensor is greater than sixteen, and the width of the output tensor is greater than sixteen, the read controller 1604 may be configured to provide enough columns or partial columns for the first sixteen channels to the pool engines to generate the first sixteen width positions of the first row of the corresponding output channels, the read controller 1604 then may be configured to provide enough columns or partial columns to the pool engines to generate the first sixteen width positions of the next set of sixteen output channels. Only after the first sixteen width positions of the first row of each output channel have been generated does the read controller 1604 provide the next columns or partial columns to generate the next sixteen width positions for the first row of the first sixteen output channels. This may allow the output tensor to be efficiently output or transmitted in an expected order (e.g. the front end processing order).

However, in these cases, the vertical pool engines, collector storage units and horizontal pool engines jump from processing one row of a first output channel to a row of a different output channel before completing the row of the first output channel. This means that there will be column outputs stored in each collector storage unit that will be needed for calculating the next block of width positions for that row of that first output channel. If these column outputs are not saved, then they will eventually be lost and will have to be re-calculated. Accordingly, to preserve the column outputs that will be used again, the read controller 1604 may be configured to store these column outputs in the external buffer 1612, and re-load them into the collector storage unit when the pool engine starts processing that channel again. In some cases, the amount of storage or memory of the external buffer 1612 available for storing column outputs may be limited, which may limit the amount of overlap between consecutive windows of an input channel. In some cases, the amount of storage or memory of the external buffer 1612 available for storing column outputs may be selected to support windows with a maximum two-column overlap—e.g. there may be sufficient space in the external buffer 1612 for storing the relevant column outputs for two columns (i.e. one column output for the left-most column and two column outputs for the second-left most column)—for up to a predetermined number of channels (this may be 512 in some examples). This allows a 3×3 depth-wise convolution operation with a stride of 1 in the width dimension, and most pooling operations in a neural network (since there is typically no overlap between pooling windows) to be implemented without having to re-calculate any of the column outputs. However, it will be evident to a person of skill in the art that this is an example only and that other examples may support larger column overlaps.

In some cases, when the write controller 1602 writes a set of input tensels to the external buffer 1612, the write controller 1602 may provide the read controller 1604 with information (e.g. a pointer) indicating the location of the set of input tensels in the external buffer 1612. Similarly, in some cases, once the read controller 1604 has determined that a set of input tensels is no longer required (e.g. they have been processed by a pool engine 502) the read controller 1604 may notify the write controller 1602 that the set of input tensels are no longer required in the external buffer 1612 and may be evicted.

As described in more detail below, the write controller 1602 may receive control information (e.g. from the configuration controller 1608) indicating how the input tensels are to be stored in the external buffer 1612, and the read controller 1604 may receive control information (e.g. from the configuration controller 1608) indicating which input tensels are to be read from the external buffer 1612 when and which pool engine 502 they are to be provided to.

In the example shown in FIG. 16, the configurable pooling processing unit 500 is configured to, when the configurable pooling processing unit 500 is configured to perform a depth-wise convolution on the input tensor, retrieve the parameters (e.g. weights, bias, zero point) for the depth-wise convolution, store the parameters in a parameter storage unit 1614 and provide the appropriate parameters to the pool engines 502 at the appropriate time. As described above, for a depth-wise convolution each channel of the input tensor is associated with a filter that is formed of a plurality of weights. Each filter may also be associated with a bias value which is added to each element generated by the convolution of the filter with the corresponding channel of the input tensor. Furthermore, as described above, when the input tensels are in an affine fixed point format, it may be efficient to remove the zero points from the input tensels and weights prior to the convolution and then re-quantize the output values. In such cases, the parameters may also include a weight zero point per channel. As described above, the zero point for the input tensor may be provided as part of the main configuration information and removed from each input tensel by the vertical pool engine 602.

To manage the retrieval and storage of the parameters for a depth-wise convolution, the configurable pooling processing unit 500 may comprise a memory controller 1606. The memory controller 1606 is configured to, when the configurable pooling processing unit 500 is configured to perform a depth-wise convolution, retrieve the parameters for the depth-wise convolution from external memory, and store the retrieved parameters in the local parameter storage unit 1614. As noted above, the parameters for a depth-wise convolution include a set of weights for each channel of the input tensor and optionally a bias value per channel and/or a weight zero value per channel. As described above with respect to the vertical pool engine 602, to limit the number of multipliers in each vertical pool engine 602 and reduce the amount of memory to store the parameters, the configurable pooling processing unit 500 may only be able to perform depth-wise convolutions with filters up to a maximum size. For example, the configurable pooling processing units may only be able to perform a depth-wise convolution with filters up to a size of 3×3.

In some cases, the memory controller 1606 may be configured to pre-fetch the parameters for a depth-wise convolution such that all the parameters for a depth-wise convolution are stored in the parameter storage unit 1614 prior to the depth-wise convolution processing beginning. This can hide the latency introduced when reading the parameters from memory. In these cases, the parameter storage unit 1614 may be large enough to store all of the parameters for a depth-wise convolution operation for an input tensor. The minimum amount of storage to be able to store the parameters for a depth-wise convolution may depend on the number of channels of the input tensor, the maximum number of weights per filter, the maximum bit width of the weights, the maximum bit width of the zero point, and the maximum bit width of the bias. For example, if the configurable pooling processing unit 500 can perform a depth-wise convolution operation on an input tensor with up to 512 channels, the maximum number of weights per filter is 9 (e.g. the filter can be up to 3×3 in size), the maximum bit width of the weights is 8, the maximum bit width of the weight zero point is 8, and the maximum bit width of the bias value is 32, then the maximum size of the parameters for a depth-wise convolution is 7168 bytes of data. In such cases, the minimum size of the parameter storage unit 1614 is 7168 bytes. Any extra size over the minimum size can be used to hide latency and help distribute the memory fetches more evenly. In some cases, the parameter storage unit 1614 may be at least twice the minimum size (e.g. 7168 bytes×2) to allow the parameters for a second depth-wise convolution to be pre-fetched or pre-loaded into the parameter storage unit 1614 while a first depth-wise convolution is being processed by the configurable pooling processing unit 500. It will be evident to a person of skill in the art that this is an example only and that another number of channels, another size of filters, and/or other bit widths may be supported.

Figure 19:
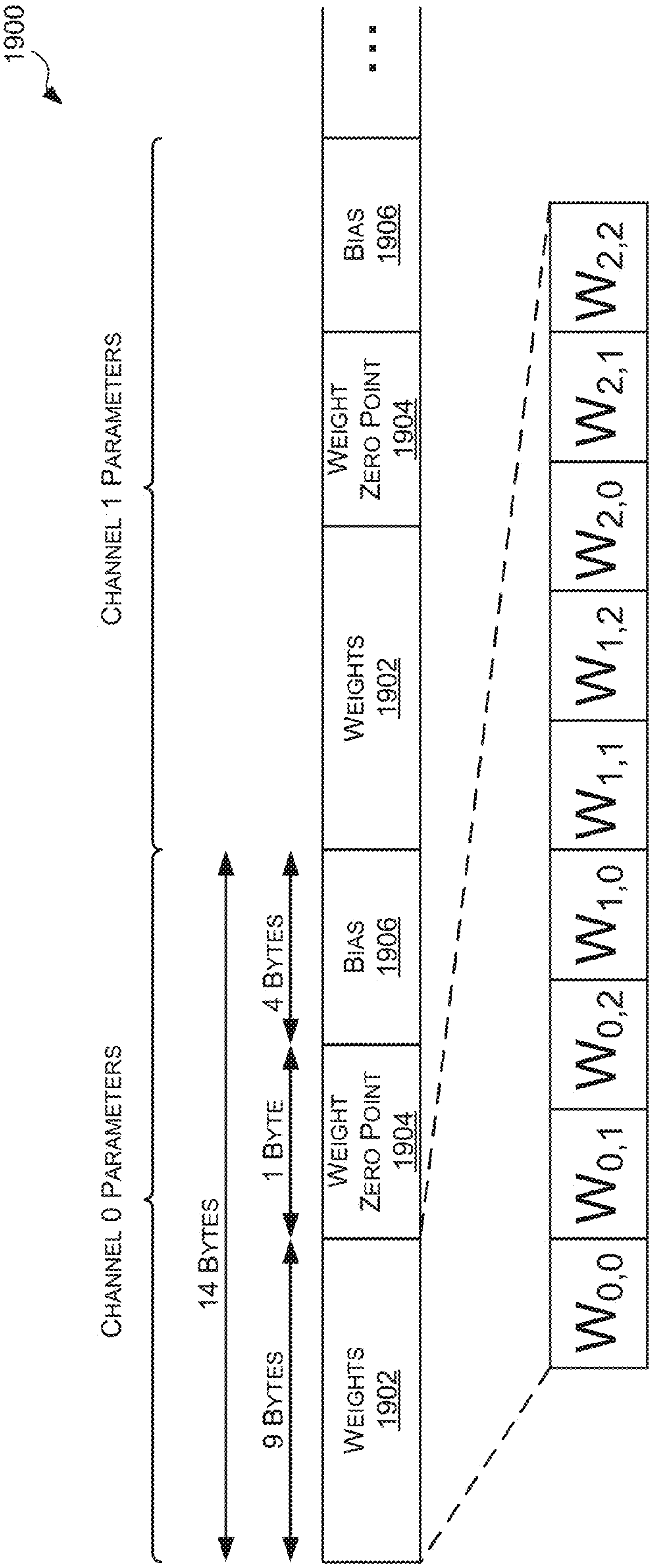
FIG. 19 is a schematic diagram illustrating an example format for storing parameters in the parameter storage unit of FIG. 16.

Reference is now made to FIG. 19 which illustrates an example format 1900 for storing depth-wise convolution parameters in the parameter storage unit 1614 when the maximum filter size is 3×3. In this example, the parameters related to the same channel are packed together. Specifically, the weights 1902 forming the filter for a channel are packed one after another, followed by the zero point or offset 1904 for that filter, and then the bias value 1906 associated with that filter/channel. This is followed by the parameters for the next channel and so on. The weights of a filter may be packed together in row order, such that the weights in the first row are stored first in order, followed by the weights in the second row and so on. FIG. 19 shows how the weights of the filter 804 of FIG. 8 may be stored in this manner. If any weights, biases, or zero points are not used for a particular depth-wise convolution those weights, biases and/or zeros points may be set to zero. Storing the parameters in a manner, such as this, where each channel is allocated the same amount of memory and a specific parameter for a channel is always stored in the same location within that memory, allows for the parameters relating to a specific channel, and a specific parameter thereof, to be easily retrieved. Furthermore, since it is anticipated that the configurable pooling processing unit 500 will most likely be used to process a depth-wise convolution with a 3×3 filter, storing the parameters in this manner optimises the use of the parameter storage unit 1614 for the most likely use case. It will be evident to a person of skill in the art that this is an example only, and the parameters for a depth-wise convolution may be stored in the parameter storage unit 1614 in any suitable manner. For example, storing the parameters in the manner described with respect to FIG. 19 may be inefficient for a 1×1 depth-wise convolution, thus another format may be used for a 1×1 depth-wise convolution.

In the examples described above, when the weights are in an affine fixed point number format, the parameters for a depth-wise convolution may include a weight zero point for each filter which is removed from each weight of that filter prior to performing a convolution operation using that filter in hardware. However, in other examples, when the weights are in an affine fixed point number format, the weight zero point may be removed from the weights prior to the memory controller 1606 retrieving the weights from external memory. Therefore, in these examples, the parameters for a channel may not include a weight zero point. This may increase the bit width of each weight (e.g. each weight may be increased from 8 bits to 9 bits), but save time and resources having to perform the subtraction of the zero point from each weight in hardware. Conversely, providing the weights and zero points separately may allow the weights to be smaller (in terms of number of bits) which, when the weights are originally 8 bits, allows the individual parameters (and the parameters for each channel) to be byte aligned in the parameter storage unit 1614.

Returning to FIG. 16, as noted above, the parameter storage unit 1614 is configured to, when the configurable pooling processing unit 500 is configured to perform a depth-wise convolution on an input tensor, store the parameters for the depth-wise convolution in the memory thereof and provide the appropriate parameters to the pool engines 502 at the appropriate time. For example, the parameter storage unit 1614 may be configured to provide the parameters for the first channel (e.g. channel 0) to a first pool engine 502, the parameters for the second channel (e.g. channel 1) to a second pool engine 502 when the first and second pool engines 502 are configured to perform a convolution on the first and second channels, respectively. The amount of data that is transferred to the pool engines 502 to begin processing a set of channels depends on the number of channels that can be processed at the same time and the size of the parameters per channel. For example, where there are sixteen pool engines 502 such that sixteen channels can be processed at the same time, and the parameters for each channel may be 14 bytes (as shown in FIG. 19), then to start processing a set of sixteen channels, 224 bytes of parameter data are transferred from the parameter storage unit 1614 to the pool engines 502. As described in more detail below, the parameter storage unit 1614 may be configured to receive control information from the configuration controller 1608 that tells the parameter storage unit which parameters should be provided to which pool engines when.

As noted above, in some cases, the memory controller 1606 may be configured to pre-fetch the parameters for a depth-wise convolution. In such cases, to allow the memory controller 1606 to start the pre-fetching of parameters for a next depth-wise convolution sooner, the parameter storage unit 1614 may be configured to notify the memory controller 1606 when a set of parameters is no longer required and thus can be removed or evicted from the parameter storage unit. Where the pool engines 502 are configured to process a channel on a line by line basis, the parameter storage unit 1614 may be configured to notify the memory controller 1606 that the parameters for a channel are no longer required after the last line of that channel has been processed by a pool engine 502.

The configurable pooling processing unit 500 may comprise an output controller 1610 which is configured to receive the output tensels generated by the pool engines 502 and transmit them to an external component in a desired order. For example, in some cases, the output controller 1610 may be configured to output the output tensor in accordance with a back end processing order, which is similar to the described partial back end processing order, in that the tensels are transmitted in blocks wherein each block comprises tensels in the same row and column, and different channels/planes, and the blocks are transmitted in row, channel/plane, and tensel order, except a whole row of tensels for a set of channels/planes is transmitted prior to moving to the next set of channels/planes. In some cases, the output tensor may be output in accordance with the back end processing order when the read controller 1604 is configured to cause the pool engines 502 to generate a whole row of the output for a set of channels at a time. In other cases, the output controller 1610 may be configured to output the output tensor in accordance with the front end processing order described above with respect to FIG. 18. In some cases, the output tensor may be output in accordance with the front end processing order when the read controller 1604 is configured to cause the pool engines 502 to generate only a partial row of the output for a set of channels at a time before moving to the next set of channels. In these cases, the output controller 1610 may comprise or have access to a transpose buffer which is configured to convert the output received from the pool engines to front end processing order. For example, the transpose buffer may receive blocks of one width position for NUM_PLANES channels for OUTPUT_PARALLELISM outputs and transpose and output blocks with OUTPUT_PARALLELISM width positions for one channel.

The configurable pooling processing unit 500 may also comprise a configuration controller 1608 that is configured to receive control information indicating how a received input tensor is to be processed, and control the components (e.g. write controller 1602, read controller 1604, parameter storage unit 1614, output controller 1610, and pool engines 502) to process the received input tensor in the manner indicated. Specifically, the control information may indicate which operation is to be performed on the received input tensor—e.g. a depth-wise convolution operation or one of one more pooling operations (e.g. an average pooling operation, a minimum pooling operation or a maximum pooling operation). The control information may also specify information about the input tensor, such as, but not limited to, the dimensions and/or format of the tensels thereof; and/or specify information about the weights, bias etc. for a depth-wise convolution operation. Based on the received configuration information, the configuration controller 1608 is configured to send control information to the other components of the configurable pooling processing unit (write controller 1602, read controller 1604, parameter storage unit 1614, output controller 1610, and pool engines 502) to control their operation in light of the received control information.

For example, where the received control information indicates that the configurable pooling processing unit is to perform a depth-wise convolution operation, the configuration controller 1608 may (i) send control information to the parameter storage unit indicating which parameters are to be sent to which pool engines 502, (ii) send control information to the read controller 1604 indicating which tensels stored in the external buffer 1612 are to be provided to which pool engines 502, and (iii) send control information to the pool engines 502 indicating that the vertical pool engines thereof are to be configured to generate weighted sum column outputs and the horizontal pool engines thereof are to be configured to generate weighted sum block outputs.

Neural Network Accelerator

As described above, the configurable pooling processing unit 500 may be used in a neural network accelerator (NNA) to perform pooling operations and depth-wise convolution operations on a tensor. The neural network accelerator may have a fixed pipeline structure or a configurable pipeline structure. Having an NNA with a both a convolution processing unit and a configurable pooling processing unit as described herein which can perform a depth-wise convolution operation or a pooling operation can significantly improve the efficiency of processing some NNs as it can decrease the number of hardware passes required to process those NNs by increasing the number of operations that can be performed per hardware pass. As described above, each hardware pass involves reading data from memory, and may include writing data to memory. Reading and writing data from memory consumes a significant amount of power and processing cycles, and may introduce a latency in the start of executing a hardware pass. Therefore decreasing the number of hardware passes to implement an NN increases the power efficiency of the NNA in implementing the NN. Furthermore, when a set of operations are performed in a hardware pass, subsequent operations in the set can be started before earlier operations in the set are complete which speeds up the execution of those operations. Therefore, increasing the number of operations that can be performed in the same hardware pass can reduce the time for performing those operations.

Figure 20:
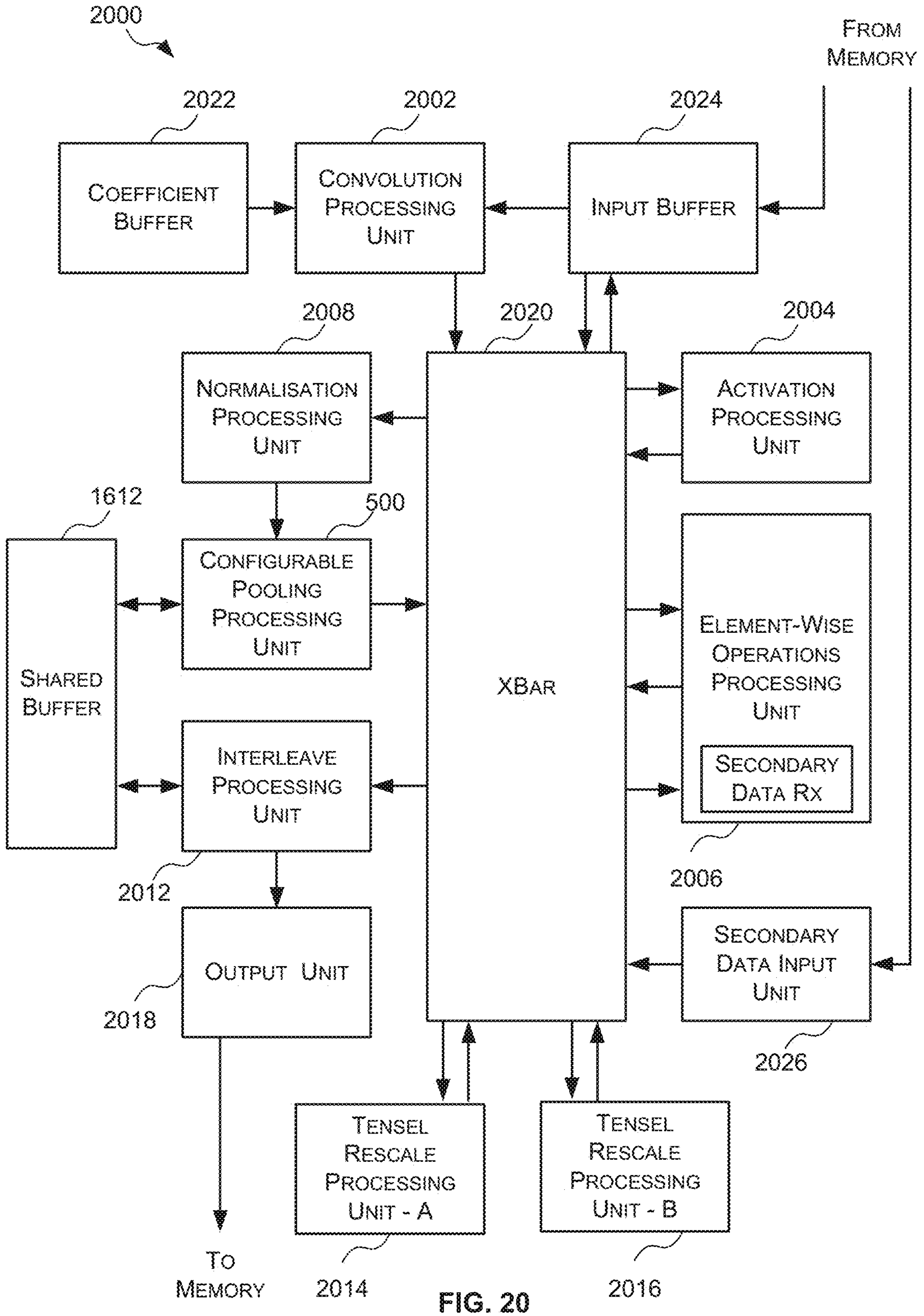
FIG. 20 is a block diagram of an example neural network accelerator comprising the configurable pooling processing unit of FIG. 5, a convolution processing unit and a crossbar.

Reference is now made to FIG. 20 which illustrates an example NNA 2000 with a configurable pipeline of hardware processing units. The NNA 2000 comprises a plurality of hardware processing units 2002, 2004, 2006, 2008, 2012, 2014, 2016 including the configurable pooling processing unit 500 described herein; and a crossbar ("Xbar") 2020 that is coupled to the hardware processing units and can selectively form one of a plurality of pipelines from the hardware processing units. The phrase "forming a pipeline from the hardware processing units" is used herein to mean connecting the inputs and outputs of a set of hardware processing units such that the output of one hardware processing unit becomes the input to another hardware processing unit.

Each hardware processing unit 2002, 2004, 2006, 2008, 2012, 2014, 2016, 500 comprises hardware configured to accelerate performing one or more neural network operations on input data. Specifically, each hardware processing unit 2002, 2004, 2006, 2008, 2012, 2014, 2016, 500 comprises an input port configured to receive an input tensor, hardware logic to perform one or more operations on the input tensor, and an output port configured to output the results of the processing, which may be referred to as the output tensor. As described in more detail below, one or more of the hardware processing units may also comprise one or more additional ports to receive secondary data which is used to process the input tensor, and/or to write and/or read data from a buffer.

The NNA 2000 of FIG. 20 comprises the following hardware processing units: a convolution processing unit 2002 which is configured to perform convolution operations on the received input tensor, an activation processing unit 2004 which is configured to perform non-linear operations on the received input tensor, an element-wise operations processing unit 2006 which is configured to perform element-wise operations on the received input tensor, a normalisation processing unit 2008 which is configured to perform normalisation operations on the received input tensor, the configurable pooling processing unit 500 described herein which is configured to selectively perform a pooling operation or a depth-wise convolution operation on the received input tensor, an interleave processing unit 2012 which is configured to performing interleaving or rearranging of the received input tensor, and tensel rescale processing units 2014, 2016 which are configured to scale or rescale an input tensor. Each of these hardware processing units are described in more detail below. It will be evident to a person of skill in the art that this is just an example set of hardware processing units and that other NNAs may have additional hardware processing units, fewer hardware processing units and/or different hardware processing units.

The NNA 2000 of FIG. 20 is configured to process a NN in one or more hardware passes of the NNA 2000. In a hardware pass of the NNA 2000, the NNA 2000 loads input data into the NNA (e.g. from external memory) and processes that input data via a pipeline formed of one or more of the hardware processing units 2002, 2004, 2006, 2008, 2012, 2014, 2016, 500 to generate processed data. In most hardware passes the processed data is then output from the NNA (e.g. to external memory) via an output unit 2018. However, in some cases, the processed data may remain in the NNA for use in a subsequent hardware pass. For example, as described in more detail below, it may take several passes of the convolution processing unit 2002 to generate a convolution layer output. Therefore, in some cases, the convolution processing unit 2002 may perform partial convolution processing in one hardware pass and store the results of that partial processing in the convolution processing unit 2002 (e.g. the accumulation buffer thereof); and then perform more partial convolution processing in one or more subsequent hardware passes and then combine the partial results generated in the hardware passes to generate the final convolution output. A convolution layer may be implemented over several hardware passes because of the internal storage restrictions of the NNA (e.g. the input buffer 2024 may not be large enough to store the entire input tensor and/or the coefficient buffer 2022 may not be large enough to store the entire tensor of weights) and/or processing restrictions of the NNA.

The term "input data to the NNA" will be used herein to mean the input data that is loaded into the NNA for a hardware pass, and may alternatively be referred to as the "input data for a hardware pass". The input data to a hardware processing unit may be (i) the input data for the hardware pass if the hardware processing unit is the first hardware processing unit in the pipeline for that hardware pass, or (ii) the output data generated by another hardware processing unit if the hardware processing unit is not the first hardware processing unit in the pipeline for that hardware pass.

The input data for a hardware pass is loaded into the NNA via a data input unit 2024, 2026. The NNA may comprise a single data input unit 2024 or more than one data input unit 2024, 2026. As shown in FIG. 20, one of the data input units 2024 may be in the form of an input buffer 2024 which can be configured to store the input data for the hardware pass. The input buffer 2024 may be referred to as the primary data input unit. The input buffer 2024 may be coupled to both the convolution processing unit 2002 and the crossbar 2020, which allows the input buffer 2024 to provide the received input data to the convolution processing unit 2002 or the crossbar 2020. Although the input buffer 2024 is shown in FIG. 20 as a single input buffer, the input buffer may be formed of a plurality of banks. In some cases, it may only be possible to use the input buffer 2024 once in a hardware pass, thus the input buffer 2024 may either be able to provide input data to the convolution processing unit 2002 or the crossbar 2020 in a hardware pass, but not both.

The NNA 2000 of FIG. 20 comprises a second, secondary or alternate data input unit 2026 by which the input data for a hardware pass can be loaded into the NNA, which may be less complex and use less energy than the primary data input unit (e.g. the input buffer 2024). For example, as described in more detail below, the element-wise operations processing unit 2006 may be able to perform element-wise operations on received input data using a secondary set of input data which is loaded into the NNA. Accordingly, there may be a secondary data input unit 2026 which is configured to load the secondary data input into the NNA which is provided to the element-wise operations processing unit 2006 (e.g. the second data receiver (Rx) thereof). By coupling the secondary data input unit 2026 to the crossbar 2020, the secondary data input unit 2026 can provide an alternate path to load the input data for a hardware pass into the NNA 2000.

To allow the secondary data input unit 2026 to be simpler and more energy efficient than the input buffer 2024, the secondary data input unit 2026 may not have all of the features of the input buffer 2024. For example, while the NNA may be configured to perform fixed point number format operations, the input buffer 2024 may be able to receive input data in a floating point number format and convert it into a fixed point number format, whereas the secondary data input unit 2026 may only be able to receive input data in a fixed point number format. Furthermore, in some cases, the input buffer 2024 may be able to receive input data in a plurality of different formats, whereas the secondary data input unit may only be able to receive input data in a subset of those formats. This may be because, for example, the secondary data input unit 2026 may have less memory or storage available than the input buffer 2024.

Accordingly, where the input data for the hardware pass is not going to be first processed by the convolution processing unit 2002 (and it meets any other requirements for using the secondary data input unit 2026) it may be more energy efficient to load the input data for the hardware pass into the NNA via the secondary data input unit 2026 than the input buffer 2024. In some cases, it may only be possible to use the secondary data input unit 2026 once in a hardware pass, thus the secondary data input unit 2026 may either be used to provide secondary input data to the element-wise operations processing unit 2006 or to provide the input data for a hardware pass, but not both. In these cases, if the secondary data input unit 2026 is used to provide the input data for a hardware pass, then the element-wise operations processing unit 2006 cannot perform an element-wise operation with secondary input data in that hardware pass. However, the element-wise operations processing unit 2006 can still be used to perform element-wise operations without secondary input data in that hardware pass.

In the example shown in FIG. 20, the secondary data receiver (Rx) of the element-wise operations processing unit 2006 is coupled, or connected, to the crossbar 2020. This allows the secondary data receiver (Rx) of the element-wise operations processing unit 2006 to receive secondary input data from the secondary data input unit 2026 or another unit via the crossbar 2020. However, in some cases, the secondary data receiver (Rx) of the element-wise operations processing unit 2006 may only be able to receive secondary input data from the secondary data input unit 2026. In these cases, the crossbar 2020 may be simplified by removing the connection between the secondary data receiver (Rx) of the element-wise operations processing unit 2006 and the crossbar, and connecting the secondary data receiver (Rx) directly to the secondary data input unit 2026. In such cases, the secondary data input unit may comprise logic (e.g. demultiplexer) that is configured to receive information each hardware pass indicating whether it is active in that hardware pass, and if so, whether the received data is to be provided to the crossbar 2020 or the secondary data receiver (Rx) and direct the received data to the appropriate device. This allows the data received by the secondary data input unit to be used to provide the input data for the hardware pass via the crossbar 2020, or provide secondary data to the secondary data receiver (Rx) of the element-wise operations processing unit 2006 directly (without having to go through the crossbar 2020).

In some cases, the NNA 2000 may include a memory interface (not shown) configured to provide an interface between the NNA 2000 and external memory (not shown). In these cases, the memory interface may be configured to receive from external memory the input data for the NNA and provide it to the input buffer 2024 and/or the secondary data input unit 2026.

Each hardware pass the NNA receives control information, which may also be referred to as command information or configuration information, identifying the components of the NNA which are active in that hardware pass, and the order in which the active components are to be used in the hardware pass. The control information may also specify any individual component configurations for the hardware pass. For example, as described in more detail below, the functions and/or operations that are implemented by one or more of the activation processing unit 2004, the element-wise operations processing unit 2006, the normalisation processing unit 2008 and the configurable pooling processing unit 500 may be configurable on a per hardware pass basis. In these cases, the control information may include information identifying the function and/or operations that are to be implemented by one or more of those processing units in the hardware pass.

Where the NNA 2000 comprises a memory interface (not shown), the control information may be received via the memory interface. In some cases, the NNA 2000 may comprise a command decoder (not shown) that is configured to receive the control information, decode the received control information, and send information to the components of the NNA 2000 indicating whether they are active in the hardware pass, and if so, how they are to configure themselves for the hardware pass. In other cases, each component in the NNA may directly receive, each hardware pass, control information which indicates whether that component is active in the hardware pass, and if so, how that component is to configure itself for the hardware pass. Either way, each component in the NNA receives, for each hardware pass, control information indicating whether that component is to be active in that hardware pass and if so, how it is to be configured. The information indicating how the crossbar 2020 is to be configured for a hardware pass may comprise information identifying a pipeline of the plurality of pipelines to be formed by the units of the NNA.

Specifically, each hardware pass the crossbar 2020 determines, from the control information whether it is active in the current hardware pass. If the crossbar 2020 determines that it is active in the current hardware pass, the crossbar 2020 dynamically configures itself to form the pipeline of the plurality of pipelines identified by the control information for that hardware pass. In some cases, the crossbar 2020 may not be active in a hardware pass if, for example, there is only one hardware processing unit active in the hardware pass (e.g. the convolution processing unit 2002) and the result of the hardware pass is stored internally (e.g. within the NNA) or is passed to the output unit 2018 via an alternate (e.g. by-pass) path. For example, in some cases there may be an alternate or by-pass path (not shown) between the convolution processing unit 2002 and the output unit 2018 that allows the output of the convolution processing unit 2002 to be sent directly to the output unit 2018 (e.g. without passing through the crossbar 2020).

The crossbar 2020 comprises a plurality of input ports (shown in FIG. 20 by arrows pointing into the crossbar 2020), a plurality of output ports (shown in FIG. 20 by arrows pointing out from the crossbar 2020) and routing logic (e.g. multiplexors (not shown)) that allows the crossbar 2020 to selectively connect input ports of the crossbar 2020 to output ports of the crossbar 2020. In the example of FIG. 20, each input port of the crossbar 2020 may be coupled, or connected, to an output port of a hardware processing unit or a data input unit, and each output port of the crossbar 2020 may be coupled, or connected, to an input port of a hardware processing unit or a data input unit. An example implementation of the crossbar 2020 is described below with respect to FIG. 21.

In some cases, the crossbar 2020 may be able to form any possible pipeline from the units of the NNA (e.g. hardware processing units and data input units). In other words, in some cases, the crossbar 2020 may be able to connect the hardware processing units and data input units in any possible manner (e.g. any output port of a unit may be connected to any input port of a unit). However, in other cases, there may be one or more restrictions on which units of the NNA can be connected to each other, which may limit the number of different pipelines which can be formed by the crossbar 2020. For example, in some cases, any unit (e.g. hardware processing unit, data input unit) of the NNA 2000 may only be used once during a hardware pass. In these cases, it may not be permissible to create a pipeline in which the output port of a unit is connected to the input port of the same unit. For example, it may not be permissible to create a pipeline in which the output port of the activation processing unit is coupled to the input port of the activation processing unit. In other cases, there may be other restrictions. For example, in some cases, a first unit may format the data for a second unit so that for data to be processed by the second unit it must be first sent to the first unit. For example, in the example of FIG. 20 the normalisation processing unit 2008 may be configured to format the input data to the configurable pooling processing unit 500 (e.g. the normalisation processing unit may put the data in partial back end processing order), thus the configurable pooling processing unit 500 may be configured to receive the input data for a hardware pass via the normalisation processing unit 2008. Similarly, in the example of FIG. 20, in many cases the interleave processing unit 2012 may reformat the data for the output unit 2018, thus the output unit 2018 may be configured to receive any input data via the interleave processing unit 2012. There may be a few cases where the input data to the output unit 2018 may not need to be reformatted, in these cases the interleave processing unit 2012 may be by-passed. It will be evident to a person of skill in the art that these are example restrictions.

In some cases, the control information identifying the pipeline of the plurality of pipelines to be implemented by the crossbar 2020 in a hardware pass may explicitly identify which input ports of the crossbar 2020 are to be connected to which output ports of the crossbar 2020. In some cases, the crossbar 2020 may comprise a register for each output port, and the value of the register indicates the input port that is to be connected to that output port. For example, the input ports may be numbered and the register for an output port may be set, by the control information, to the value of the relevant input port. For example, if the output from the activation processing unit 2004 is to be directed to the input of the element-wise operations processing unit 2006, and the output port of the activation processing unit 2004 is connected or coupled to input port 2 of the crossbar 2020, the register associated with the output port of the crossbar 2020 connected or coupled to the input port of the element-wise operations processing unit 2006 may be set to 2.

As described above, a software tool (running on for example the computing-based device 2400 of FIG. 24) may be used to identify the hardware passes of the NNA to process a NN—e.g. the software tool may determine the number of hardware passes, the components that are active in each hardware pass, and the configuration of the crossbar for each hardware pass (e.g. the order in which the active components in each hardware pass process data). In some cases, such a software tool may determine that the configuration of the crossbar 2020 for a hardware pass is valid, only if, when the output of a processing unit is the input to another processing unit in a hardware pass, the crossbar creates a connection between the relevant ports of the crossbar 2020. For example, if the order of the processing units in the hardware pass is such that the output of the convolution processing unit 2002 is to be provided as an input to the activation processing unit 2004, then the configuration of the crossbar 2020 may only be determined to be valid if the port of the crossbar 2020 corresponding to the output of the convolution processing unit 2002 is connected or coupled to the port of the crossbar 2020 corresponding to the input of the activation processing unit 2004. In some cases, a crossbar 2020 configuration may still be valid when the output of the convolution processing unit 2002 is provided as an input to the output unit even if the ports of the crossbar 2020 corresponding to the convolution processing unit 2002 and the output unit 2018 are not connected, because, as described above, there may be a separate path between the convolution processing unit 2002 and the output unit 2018.

In other cases, the control information identifying the pipeline of the plurality of pipelines to be implemented by the crossbar 2020 may simply identify the units (e.g. hardware processing units, data input units) that are active in the hardware pass and the order thereof, and the crossbar 2020 may be configured to dynamically determine which input ports of the crossbar 2020 to connect to which output ports of the crossbar 2020 to implement the hardware pipeline defined by the identified hardware processing units and the identified order.

In some cases, each input port and each output port of the crossbar 2020 may have a plurality of data channels. The number of data channels defines the number of data values that can be received on an input port in the same cycle, or transmitted on an output port in the same cycle. For example, if an input port has sixteen data channels, then 16 data values can be received on that port each cycle. In some cases, each input port and each output port of the crossbar 2020 may comprise the same number of data channels (which may be referred to as XBAR_PARALLELISM). As described in more detail below, the convolution processing unit 2002 may comprise a plurality of convolution engines which are each configured to perform a multiply-accumulate calculation on a set of input data values and a set of weights. In some cases, the number of channels per input/output port is equal to the number of convolution engines. For example, in some cases, the convolution processing unit 2002 may comprise 28 convolution engines and each input and output port of the crossbar 2020 may comprise 28 data channels. In other cases, the number of data channels per input/output port may be less than the number of convolution engines. In yet other cases, the number of data channels per input/output port may be greater than the number of convolution engines. Having the number of data channels per input/output port be greater than the number of convolution engines may allow data to be transferred between some processing units faster, particularly those processing units which comprise, or have access to, a storage module (e.g. the configurable pooling processing unit 500 which has access to the shared buffer). For example, such a configuration may allow data to be loaded into the shared buffer more quickly.

Each data channel of a port may have the same bit width. For example, all data channels of an input port or an output port may be 32-bits wide—i.e. each data channel of that input port or output port may be able to receive/output a 32-bit data element. In some cases, when the bit-width of the received/output data elements are less than or equal to half of the bit width of the data channel, multiple data elements may be received per data channel. In other words, in these cases multiple data elements may be packed into a single data channel. For example, if a data channel is 32-bits wide and each data element is 16 bits, then two 16-bit data elements may be received/output on that data channel at a time.

In some cases, all input ports and output ports of the crossbar 2020 have the same data channel bit width (e.g. 32 bits). However, in other examples, one or more of the input ports and/or output ports of the crossbar 2020 may have different channel bit-widths. For example, some components (e.g. hardware processing units, data input units) may be able to produce/receive data up to a first bit width (e.g. 32 bits) whereas other components may be able to produce/receive data up to only a second, lower, bit-width (e.g. 16 bits). In these cases, a subset of the input ports and/or output ports may have data channels of the first, higher bit width (e.g. 32 bits) (i.e. those coupled or connected to the hardware processing units that produce/receive data up to the first bit width), and another subset of the input ports and/or output ports may have data channels with the second, lower, bit width (e.g. 16 bits). Reducing the bit width of the data channels of one or more input ports and/or one or more output ports of the crossbar 2020 may reduce the complexity of the crossbar 2020 and reduce the number of connections between components.

Where the crossbar 2020 has input and/or output ports with different bit widths, to allow a higher bit-width input port of the crossbar 2020 to be coupled to a lower bit-width output port of the crossbar 2020, the crossbar 2020 may be configured to dynamically perform a bit-width conversion when a higher bit-width input port is coupled or connected to a lower bit-width output port of the crossbar 2020. For example, in some cases, any higher-bit width input port may be coupled to logic (e.g. a clamp) that can selectively reduce the bit width of the received data elements to the lower bit width. The logic may be configured to discard the most significant bits of the higher bit width data elements. The logic (e.g. clamp) may be configured such that any higher bit-width value that is lower than the minimum in the lower bit-width is resolved to the new minimum value, and any higher-bit width value that is higher than the maximum in the lower bit-width is resolved to the new maximum.

Similarly, to allow a lower bit-width input port of the crossbar 2020 to be coupled to a higher-bit width output port of the crossbar 2020, the crossbar 2020 may be configured to dynamically perform a bit-width conversion when a lower bit-width input port of the crossbar 2020 is coupled or connected to a higher bit-width output port. For example, in some cases, any lower-bit width input port may be coupled to logic that can selectively extend the bit width of the received data element to the higher bit-width. Where the input data elements are signed then the logic may be configured to sign extend the most significant bits (MSBs) of the data elements.

As described above, each unit of the NNA (e.g. processing unit or data input unit) that is active in a hardware pass receives an input tensor and produces an output tensor. Where multiple units are active in a hardware pass then the output tensor of one unit of the NNA may be passed to another unit of the NNA via the crossbar 2020. Since a unit of the NNA will often be unable to send the complete output tensor at once, there may be a predetermined order, which may be referred to herein as the processing order, in which the elements of the tensor are output from a unit. In some cases, there may be multiple processing orders which may be used by the units of the NNA. The different processing orders may provide advantages for certain operations.

Where there are multiple processing orders, some of the units of the NNA (e.g. processing units and data input units) may support only one processing order, and some of the units of the NNA (e.g. processing units and data input units) may support multiple processing orders. Where different units of the NNA may use different processing orders, the control information for a hardware pass may comprise information identifying which processing order is to be used by each active unit so that the active units can configure themselves to transmit/receive the data in accordance with the correct processing order.

Each of the example hardware processing units of FIG. 20 will now be described. The convolution processing unit 2002 is hardware configured to receive an input tensor and a set of weights and perform convolution operations between the input tensor and the weights and output the results of the convolution operations. The convolution processing unit 2002 may have one or more convolution engines which are configured to perform a multiply-accumulate operation between a set of input data values (e.g. input tensels) and a set of weights. The weights to be used by the convolution processing unit 2002 in a hardware pass may be stored in a coefficient buffer 2022. In some cases, the input tensor to be processed by the convolution processing unit 2002 in a hardware pass may be stored in the input buffer 2024. An example implementation of a convolution processing unit 2002 is described below with respect to FIG. 22.

The activation processing unit 2004 is hardware configured to receive input data (e.g. an input tensor) and apply a non-linear function (which may also be referred to as an activation function) thereto. Example, non-linear functions which may be implemented (or approximated) by the activation processing unit 2004 include, but are not limited to, a Tanh function, a sigmoid function, a Rectified Linear Unit (ReLU) function or a leaky ReLU (LReLU) function. In a ReLU function, the output element $y_{i,j,k}$ is calculated by identifying a maximum value as set out in equation (3) wherein for x values less than 0, y=0. A LReLU function outputs the input if it is greater than zero, and outputs a fraction (e.g. 0.01×) of the input when it is negative. An example implementation of a LReLU function is set out in equation (4).

$$y_{i,j,k}=f(x_{i,j,k})=\max\{0,x_{i,j,k}\} \tag{3}$$

$$y_{i,j,k}=f(x_{i,j,k})=\max\{0.01*x_{i,j,k},x_{i,j,k}\} \tag{4}$$

In some cases, the activation function that is performed by the activation processing unit 2004 in a hardware pass may be configurable. For example, in some cases, the activation processing unit 2004 may receive information for a hardware pass that identifies one activation function of a plurality of activation functions that is to be applied to the input data in that hardware pass.

In some cases, the activation processing unit 2004 may be configured to store, in entries of a lookup table, data representing the activation function to be implemented in the hardware pass. In these cases, the activation processing unit 2004 may be configured to use the input data to lookup one or more entries in the lookup table and generate the output of activation function from the one or more entries in the lookup table and/or the input data. For example, the activation processing unit 2004 may be configured to calculate the output of the activation function by interpolating between two or more entries read from the lookup table. An example implementation of an activation processing unit 2004 is described in the Applicant's GB Patent No. 2552242, which is herein incorporated by reference in its entirety.

The element-wise operations processing unit 2006 is hardware configured to receive input data (e.g. an input tensor) and perform an element-wise operation on the input data (e.g. input tensor), optionally with another data set (e.g. another tensor) which may be obtained or retrieved from external memory via a secondary data input unit 2026. An element-wise operation is a same operation that is performed on each element of the input data/tensor (e.g. each input data value or each tensel). Element-wise operations which may be performed on the input data include, but are not limited to, add, multiply, maximum, and minimum.

The other data set/tensor may be the same size (e.g. have the same dimensions) as the input data/tensor such that corresponding elements of the two tensors are combined using an element-wise operation. Alternatively, the other data set/tensor and the input data/tensor may have a different size or dimensions. If, for example, the mismatching dimension of one of the tensors is of size 1, an element-wise operation may be performed between the input data/tensor and the other data set/tensor using a broadcast technique wherein the smaller tensor is broadcast (or expanded) to the size of the other tensor. For example, a tensor of size [N, H, W, C]=[1, 10, 1, 10] can be combined element-wise with a tensor of size [N, H, W, C]=[1, 10, 10, 10] by expanding the W dimension of the first tensor.

The normalisation processing unit 2008 is hardware configured to receive input data (e.g. an input tensor) and apply a normalisation function to the received input data to produce normalised data. Example normalisation functions which may be implemented by the normalisation processing unit 2008 include, but are not limited to, a Local Response Normalisation (LRN) function and a Local Contrast Normalisation (LCN) function. In some cases, the normalisation function which is applied to the input data may be configurable. For example, the normalisation processing unit 2008 may receive information for a hardware pass indicating which of a plurality of normalisation functions is to be applied to the input data in that hardware pass. This allows different normalisation functions to be applied in different hardware passes. An example implementation of a normalisation processing unit 2008 is described in the Applicant's GB Patent No. 2552242, which is herein incorporated by reference in its entirety.

The configurable pooling processing unit 500, as described above, can be configured on a per hardware pass basis to perform a depth-wise convolution operation or one of one or more pooling operations on a received input tensor.

In some cases, the configurable pooling processing unit 500 may be configured to receive the input data in a particular format (e.g. in partial back end processing order described above with respect to FIG. 17) which can be generated by the normalisation processing unit 2008. In such cases, as shown in FIG. 20, the input port of the configurable pooling processing unit 500 may be coupled, or connected, to, the output port of the normalisation processing unit 2008 so as to only receive input data from the normalisation processing unit 2008. In these cases, to allow the input data for a hardware pass to be processed by the normalisation processing unit 2008 and not the configurable pooling processing unit 500, the configurable pooling processing unit 500 may comprise logic (e.g. a multiplexor (not shown)) which allows the configurable pooling processing unit 500 to output either the data received from the normalisation processing unit 2008 or the data generated by the configurable pooling processing unit 500. The configurable pooling processing unit 500 may then receive information each hardware pass indicating whether the configurable pooling processing unit 500 is active, and if so, identifying which output is to be provided to the crossbar 2020. However, it will be evident to a person of skill in the art that this is an example only, and that in other examples, the input port of the configurable pooling processing unit 500 may be directly coupled, or connected, to the crossbar 2020 to allow the configurable pooling processing unit 500 to receive input data from other units of the NNA 2000.

The interleave processing unit 2012 is hardware configured to receive input data (e.g. an input tensor) and perform a rearrangement operation to produce data that is in a particular order. The rearrangement may comprise sorting and/or transposing the received input data.

As shown in FIG. 20, the configurable pooling processing unit 500 and the interleave processing unit 2012 may each have access to a shared buffer 1612 which can be used by these units to write data to and retrieve data from. For example, as described above, the configurable pooling processing unit 500 may temporarily store received input tensels in the shared buffer 1612 until the received tensels have been processed by the configurable pooling processing unit 500. The interleave processing unit 2012 may use the shared buffer 1612 to rearrange the order of received data or the generated data. For example, the interleave processing unit 2012 may be configured to write data to the shared buffer 1612 and then read the same data out in a different order. In some cases, each unit may be allotted a portion of the shared buffer 1612 which only that unit can access. In these cases, the configurable pooling processing unit 500 and the interleave processing unit 2012 may only be able to read data out of the shared buffer 1612 that they have written to it.

The tensel rescale processing units 2014, 2016 are hardware configured to perform rescaling operations on the received input data. As is known to those of skill in the art, for hardware to process a set of values, each value is represented in a number format. Two common types of number formats are fixed point number formats and floating point number formats. As is known to those of skill in the art, a fixed point number format has a fixed number of digits after the radix point (e.g. decimal point or binary point). In contrast, a floating point number format does not have a fixed radix point (i.e. it can "float"). In other words, the radix point can be placed in multiple places within the representation. While representing the network parameters (e.g. input data values (i.e. input tensels), weights, biases) of a NN in a floating point number format may allow more accurate or precise output data to be produced, processing network parameters in a floating point number format in hardware is complex which tends to increase the silicon area, power consumption, memory and bandwidth consumption, and complexity of the hardware compared to hardware that processes network parameters in other formats, such as fixed point number formats. Accordingly, the NNA 2000 may be configured to represent and process the network parameters of a NN in a fixed point number format to reduce the area, power consumption, memory and bandwidth consumption, and complexity of the NNA.

The NNA 2000 may support one or more fixed point number formats for the network parameters (e.g. input data values (i.e. input tensels), weights, bias) and the fixed point format may be configurable on a layer basis or even a partial layer basis. For example, the NNA 2000 may support fixed point number formats defined by a fixed integer exponent exp and a b-bit mantissa m such that a value u is equal to $u=2^{exp}m$. In some cases, the mantissa m may be represented in two's complement format. However, in other cases other signed or unsigned integer formats may be used. When such a fixed point number format is used, the exponent exp and the number of mantissa bits b only need to be stored once for a set of values represented in that number format. Different sets of network parameters may be represented using different mantissa bit lengths m and/or different exponents b.

The NNA 2000 may alternatively or additionally support an affine fixed point number format, which, as described above, is a fixed point number format which defines an offset and a scale. As described above, where the input data to a hardware processing unit (e.g. configurable pooling processing unit 500) is in an affine fixed point number format, it may be more hardware efficient for the hardware to perform the processing in a manner such that the output data does not accurately reflect the scale and/or offset. In general, it may be efficient to perform operations which may involve a change in scale in this manner. Examples of such operations include, but are not limited to, convolution operations, addition operations, and multiplication operations. In contrast, operations such as max pooling or average pooling may not be performed in this manner as the input and output scale are the same. Accordingly, the convolution processing unit 2002 which can perform convolution operations, the configurable pooling processing unit 500 which can perform depth-wise convolution operations, and the element-wise operations processing unit 2006 which can perform addition and multiplication operations, may be configured to operate in this manner. Where a hardware processing unit is configured to operate in this manner, the output of the hardware processing unit may then be re-quantised to put it in the correct format.

This re-quantisation can be performed by the tensel rescale processing units 2014, 2016. There are many known methods and techniques for re-quantising data into an affine fixed point number format. The tensel rescale processing units 2014, 2016 may be configured to perform the re-quantising using any known method or technique. Since the output data of more than one active hardware processing unit may be re-quantised, having multiple tensel rescale processing units 2014, 2016 in the NNA 2000 allows more operations to be performed in a single hardware pass.

Re-quantisation may also be used when operations involve two or more tensors in an affine fixed point number format, for example, when concatenating multiple tensors together into a single tensor, to bring them all to the same format.

Figure 2:
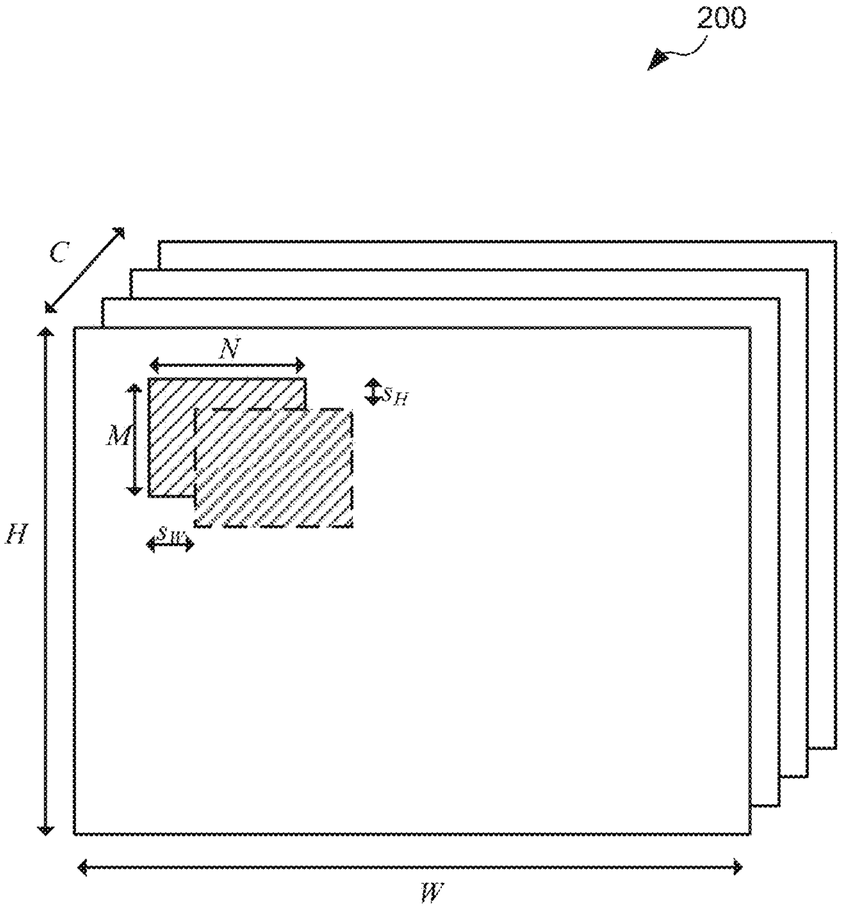
FIG. 2 is a schematic diagram illustrating performing an example convolution operation on an example tensor in a DNN.

In some cases, each tensel rescale processing unit 2014, 2016 can perform the re-quantising on a per tensor basis or a per channel basis. As described above with respect to FIG. 2, the input data to a processing unit is typically a multi-dimensional block of data which is referred to as a tensor. Each plane of the tensor is referred to as a channel and each element of the tensor is referred to as a tensel. The tensel rescale processing units 2014, 2016 may be able to perform rescaling on a per-tensor basis (i.e. all of the input data values are quantised or re-quantised in the same manner)—or on a per-channel basis (i.e. each channel of the input data may be quantised or re-quantised in a different manner). In some cases, the control information for a hardware pass may specify, for any tensel rescale processing unit 2014, 2016 that is active in the hardware pass, whether that tensel rescale processing unit 2014, 2016 is to perform per-tensor or per-channel re-quantisation.

Whether or not a tensel rescale processing unit 2014, 2016 is configured to perform per-tensor or per-channel re-quantisation may depend on the format of the inputs to the processing module that generated the data that is sent to the tensel rescale processing unit 2014, 2016. For example, if the convolution processing unit 2002 receives input data (e.g. an input tensor) quantised with [scale_input, offset input] and it is desirable that the output data be quantised with [scale_output, offset_output], then depending on the format of the weights, the re-quantisation process may be per channel or per tensor. For example, if all of the weights are quantised with the same parameters [scale_weights, offset_weights] then the re-quantisation may be done on a per-tensor basis. If, however, at least two of the filters are quantised using different parameters—e.g. a first filter is quantised with parameters [scale_weights1, offset_weights1] and a second filter is quantised with parameters [scale_weights2, offset_weights2]—then because each channel of the output data (e.g. output tensor) is the result of the input data (input tensor) convolved with a filter, the re-quantisation may be done on a per-channel basis. Using different quantisation parameters for different filters may allow for better quantisation of the filters, as the filter parameters can be chosen at a finer granularity. In some cases, per-channel re-quantisation may only be performed on output generated by the convolution processing unit 2002.

The NNA 2000 may also comprise an output unit 2018 which is configured to output the processed data. For example, the output unit 2018 may output the processed data to memory. In some cases, a hardware pass may be associated with an output data format and the output unit 2018 may be configured to convert the processed data into the output format associated with the hardware pass prior to outputting the processed data.

Crossbar

Figure 21:
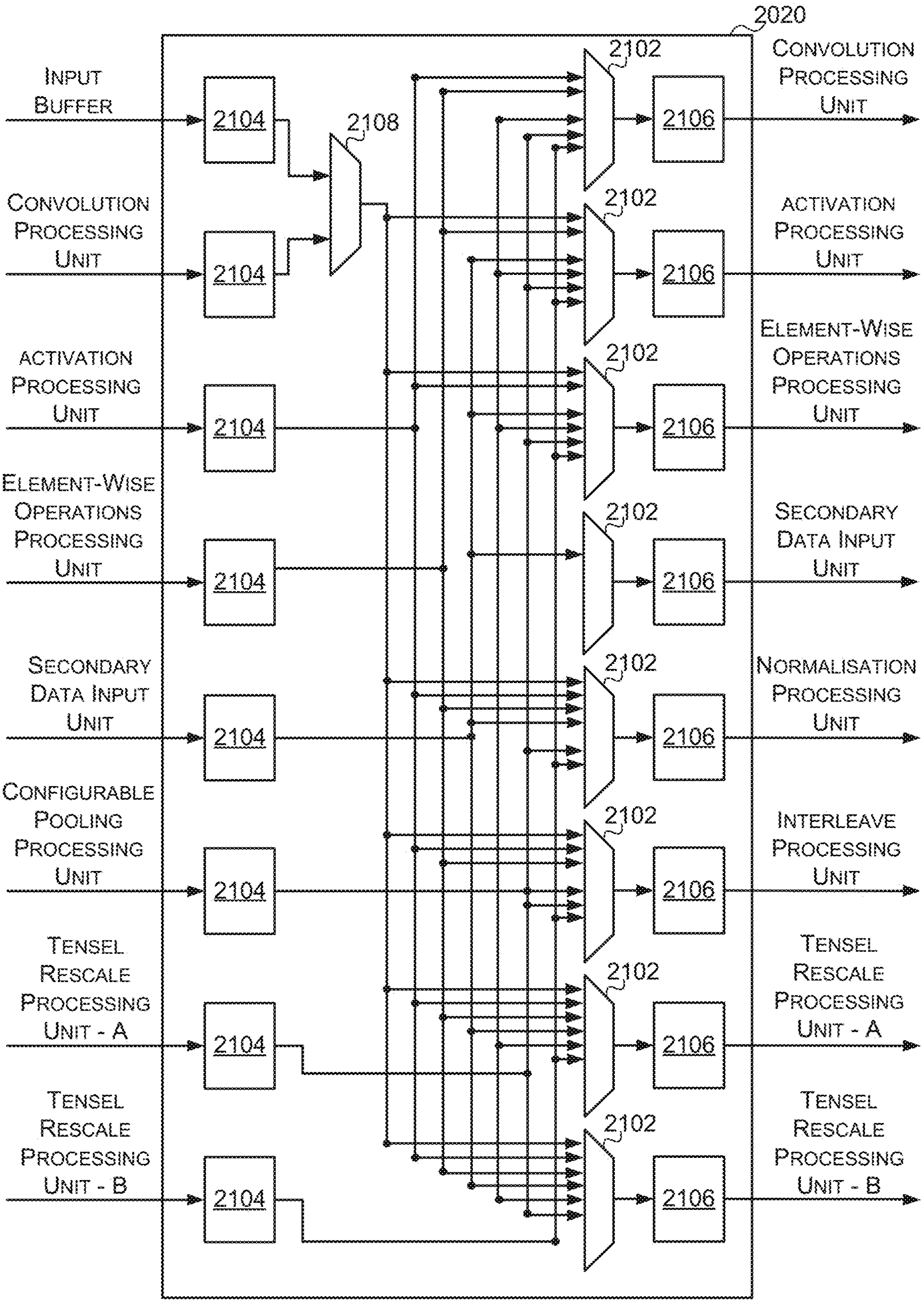
FIG. 21 is a block diagram of an example implementation of the crossbar of FIG. 20.

Reference is now made to FIG. 21 which illustrates an example implementation of the crossbar 2020 of FIG. 20. The term crossbar is used herein to mean a hardware block that has a plurality of inputs, a plurality of outputs and routing, or switching, logic that can selectively couple or connect certain inputs to certain outputs. The crossbar 2020 of FIG. 21 comprises a plurality of input ports, or input interfaces, (identified by an arrow pointing towards the crossbar 2020), a plurality of output ports, or output interfaces, (identified by an arrow pointing away from the crossbar 2020) and a plurality of multiplexors 2102 that connect the input ports to the output ports.

Input ports of the crossbar 2020 may be coupled to an output port of a hardware processing unit or a data input unit of the NNA 2000, and output ports of the crossbar 2020 may be coupled to an input port of a hardware processing unit or a data input unit of the NNA 2000.

In the example shown in FIG. 21 there is a multiplexor 2102 for each output port, which may be referred to as a main multiplexor or an output multiplexer 2102. Each main multiplexor 2102 is coupled to the corresponding output port and controls which input port is connected or coupled to that output port. Accordingly, each main multiplexor 2102 drives one of the output ports. For example, in FIG. 21 there are eight output ports and thus eight main multiplexors 2102. As is known to those of skill in the art, a multiplexor ("mux") is a hardware device that can select between several input signals and forward the selected input signal to an output line. The selection is driven by one or more select signals (not shown). In the crossbar 2020 of FIG. 21 the multiplexor selection signals may be generated by control logic (not shown) based on the control information (i.e. the information identifying the pipeline of the plurality of pipelines of hardware processing units to be implemented) received each hardware pass.

Each main multiplexor 2102 is connected to one or more input ports of the crossbar 2020. In some cases, each main multiplexor 2102 may be connected to each input port of the crossbar 2020 so that any input port can be connected to any output port. However, as described above with respect to FIG. 20, there may be restrictions on which input ports can be connected or coupled to which output ports. Accordingly, to simplify the crossbar 2020, only a subset of the input ports may be connected to one or more of the main multiplexors 2102. In some cases, each main multiplexor may only be connected to the input ports that can be connected to, or coupled to, the corresponding output port. For example, as described above, in some cases, each unit of the NNA 2000 may only be used once in a hardware pass, thus the output port of a unit of the NNA 2000 cannot be coupled to an input port of the same unit as that would involve more than one use of a unit in a hardware pass. Therefore the main multiplexor 2102 for an output port of the crossbar 2020 that is coupled to the input port of a unit of the NNA 2000 may not be coupled to the input port of the crossbar 2020 that is coupled to the output port of that unit. For example, the multiplexor that controls the input to the convolution processing unit 2002 may not receive as an input the output of the convolution processing unit 2002.

In some cases, the complexity of the crossbar 2020 may be simplified by having one or more pre-multiplexors 2108 that pre-multiplexes one or more of the input ports when it is known that only one of those inputs will be passed to an output port in a hardware pass. Specifically, by pre-multiplexing a plurality of the input ports, one or more of the main multiplexors may have one less input. For example, the NNA 2000 of FIG. 20 comprises an input buffer 2024 which can, in a hardware pass, either provide input data to the convolution processing unit, or provide the input data for the hardware pass to the crossbar 2020, but not both. If the input buffer 2024 provides the input data for the hardware pass to the crossbar 2020 then the input buffer 2024 cannot provide input data to the convolution processing unit 2002, thus the convolution processing unit 2002 will not produce output data in that hardware pass. If, however, the input buffer 2024 provides input data to the convolution processing unit 2002 then the convolution processing unit 2002 may provide output data (in some cases it may store the generated data for a subsequent hardware pass). Accordingly, in a hardware pass only one of the convolution processing unit 2002 and the input buffer 2024 may provide data to the crossbar 2020. Therefore both input ports do not need to be coupled to the main multiplexors 2102.

In some cases, as shown in FIG. 21, the crossbar 2020 may comprise a register or a set of registers 2104 coupled to each input port to buffer the input data received from the other units of the NNA, and/or a register or a set of registers 2106 coupled to each output port to buffer the data sent to the other units of the NNA. In these cases, the other units (e.g. processing units and data input units) may have corresponding registers on their input and output ports. Where an input port or an output port is configured to receive and/or send data using handshaking signals, the corresponding register(s) may also be configured to store/buffer the handshaking information.

Convolution Processing Unit

Figure 22:
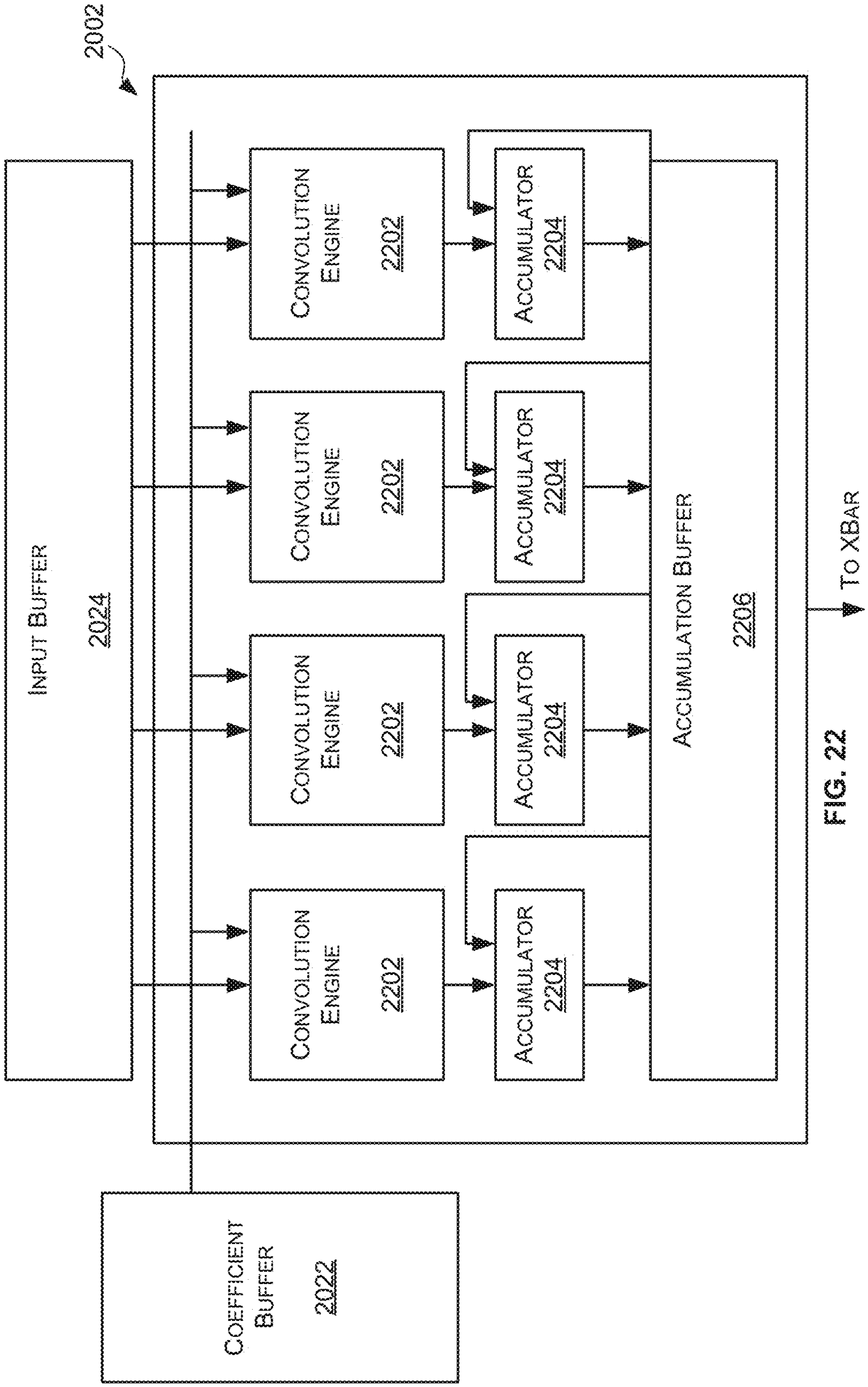
FIG. 22 is a block diagram of an example implementation of the convolution processing unit of FIG. 20 that comprises a plurality of convolution engines.

Reference is now made to FIG. 22 which illustrates an example implementation of the convolution processing unit 2002 of FIG. 20. In this example, the convolution processing unit 2002 comprises a plurality of convolution engines 2202, a plurality of accumulators 2204 and an accumulation buffer 2206.

Figure 23:
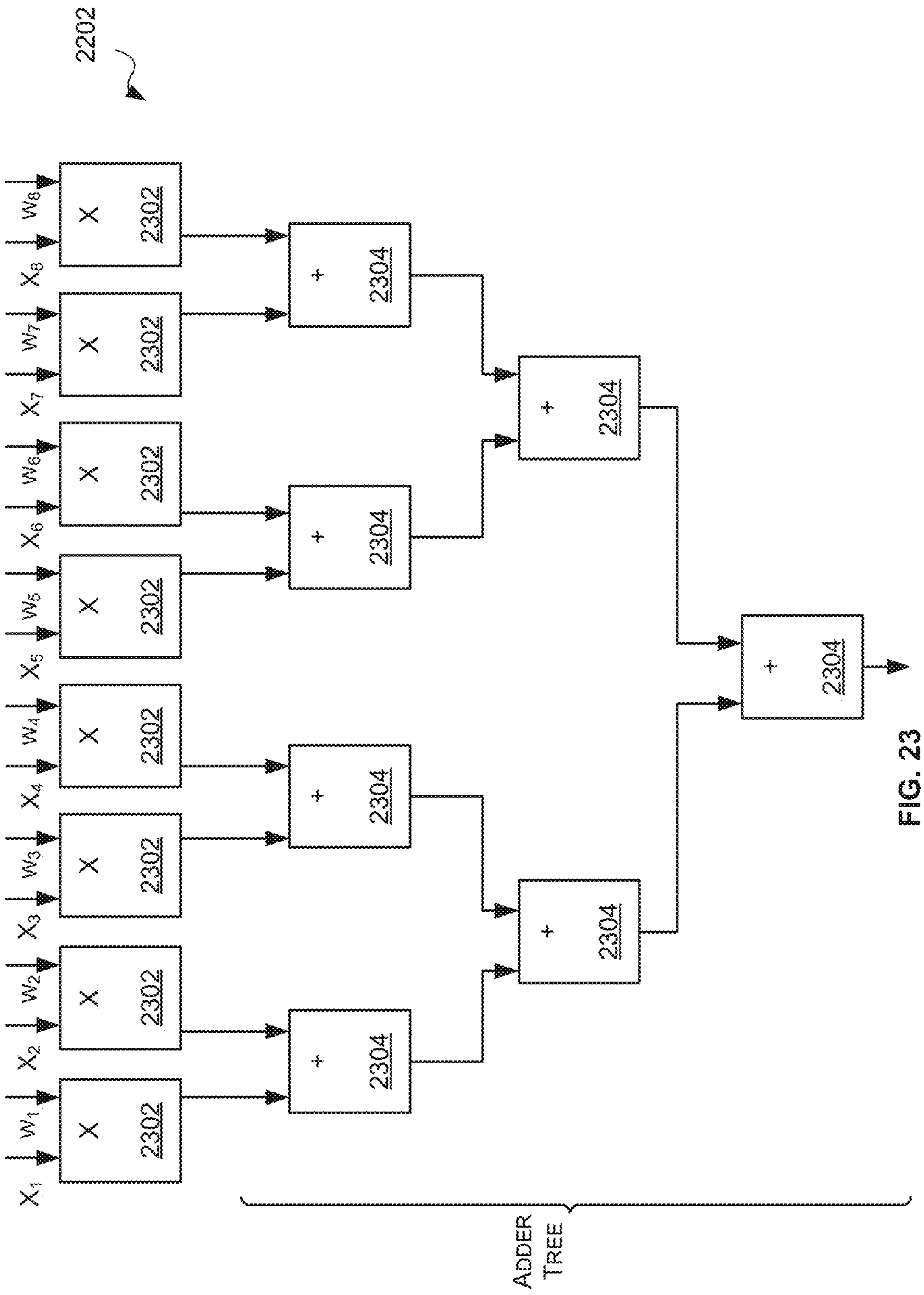
FIG. 23 is a block diagram of an example implementation of the convolution engine of FIG. 22.

Each convolution engine 2202 comprises hardware logic configured to receive a set of weights $\{W_1, W_2 \ldots, W_8\}$ that represent all or a portion of a filter, and a set of input data values $\{X_1, X_2, \ldots, X_8\}$ that represent all or a portion of a window of the input data, and perform a multiply-accumulate calculation on the received weights and input data values. In some examples, as shown in FIG. 23, each convolution engine 2202 may comprise a plurality of multipliers 2302, each of which is configured to multiple a weight ($W_i$) and a corresponding input data value ($X_i$) to produce a multiplication output value. The multipliers 2302 are followed by a plurality of adders 2304 that form an adder tree to calculate the sum of the multiplication outputs. In the example of FIG. 23 the convolution engine 2202 comprises eight multipliers 2302, but in other examples there may be more or fewer multipliers. For example, in some cases there may be 128 multipliers. Generally, if there are Z multipliers, the adder tree comprises Z−1 adders. The example convolution processing unit 2002 of FIG. 22 comprises four convolution engines 2202, however, it will be evident to a person of skill in the art that this is an example only and there may be only one convolution engine, there may be two convolution engines, or there may be more than two convolution engines.

Since it may take more than one hardware pass of the convolution engines 2202 to generate a complete filter result (e.g. because a convolution engine may only receive and process a portion of the weights of a filter and/or a portion of the input data values of a window in a cycle), the convolution processing unit 2002 may comprise a plurality of accumulators 2204. A pass of the convolution engines comprises receiving a set of weights and a set of input data values and performing a multiply-accumulate operation thereon. Each accumulator 2204 receives the output of one convolution engine 2202 and adds the output to previous convolution engine outputs that relate to the same filter. Since a convolution engine 2202 may not generate or produce outputs that relate to the same filter in consecutive cycles the partial results of one or more filters may be stored in an accumulation buffer 2206 and then the appropriate partial results may be provided to the accumulators 2204 each cycle by the accumulation buffer 2206.

As described above, in some cases the input buffer 2024 may be implemented as a plurality of banks of memory. In these cases, there may be a multiplexor (not shown) for each convolution engine that is coupled to each bank of the input buffer to allow the data stored in any of the banks to be selectively directed to any of the convolution engines 2202.

Test Data

As described above, an NNA with both a convolution processing unit, which is capable of performing any type of convolution operation including complex 2D convolutions, and a configurable pooling processing unit as described herein, which is capable of performing a depth-wise convolution operation or a pooling operation, can more efficiently process more NNs as it can allow some NNs to be processed over fewer hardware passes. Example NNs which could be implemented more efficiently on such an NNA are the MobileNet NNs. This is because MobileNet NNs comprise sequences of 1×1 2D convolutions followed by a 3×3 2D depth-wise convolution. Specifically, one example MobileNet NN described in Howard et al. "MobileNets: Efficient Convolutional Neural Networks for Mobile Vision Applications" comprises the following sequence seventeen times: (1) 2D convolution; (2) ReLU; (3) depth-wise convolution; and (4) ReLU. If an NNA has only one processing unit that is capable of performing convolution operations, then only one convolution operation can be performed in a hardware pass, meaning that it would require at least 34 hardware passes to perform those seventeen sequences. Whereas an NNA with both a convolution processing unit and a configurable pooling processing unit could perform the seventeen sequences in as few as seventeen hardware passes. This produces a significant saving in terms of memory reads and writes (as each hardware pass is associated with at least a memory read), and processing time (as the more operations that can be performed in a hardware pass the more efficiently the operations can be performed).

Figure 24:
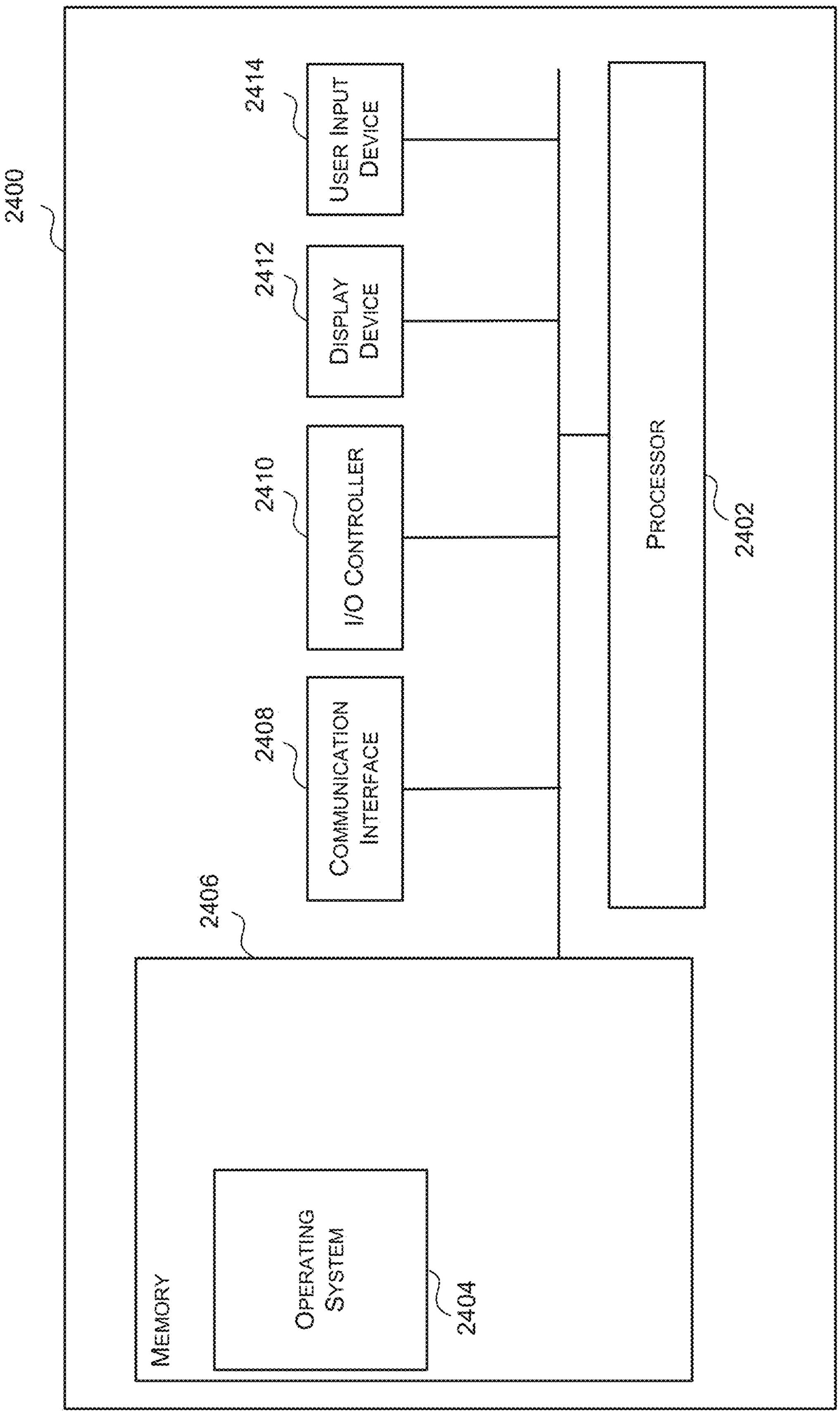
FIG. 24 is a block diagram of an example computing-based device.

FIG. 24 illustrates various components of an exemplary computing-based device 2400 which may be implemented as any form of a computing and/or electronic device, and in which embodiments of the methods described herein may be implemented.

Computing-based device 2400 comprises one or more processors 2402 which may be microprocessors, controllers or any other suitable type of processors for processing computer executable instructions to implement a method described herein. In some examples, for example where a system on a chip architecture is used, the processors 2402 may include one or more fixed function blocks (also referred to as accelerators) which implement a part of the method in hardware (rather than software or firmware). Platform software comprising an operating system 2404 or any other suitable platform software may be provided at the computing-based device to enable application software to be executed on the device.

The computer executable instructions may be provided using any computer-readable media that is accessible by computing-based device 2400. Computer-readable media may include, for example, computer storage media such as memory 2406 and communications media. Computer storage media (i.e. non-transitory machine-readable media), such as memory 2406, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine-readable media, e.g. memory 2406) is shown within the computing-based device 2400 it will be appreciated that the storage may be distributed or located remotely and accessed via a network or other communication link (e.g. using communication interface 2408).

The computing-based device 2400 also comprises an input/output controller 2410 arranged to output display information to a display device 2412 which may be separate from or integral to the computing-based device 2400. The display information may provide a graphical user interface. The input/output controller 2410 is also arranged to receive and process input from one or more devices, such as a user input device 2414 (e.g. a mouse or a keyboard). In an embodiment the display device 2412 may also act as the user input device 2414 if it is a touch sensitive display device. The input/output controller 2410 may also output data to devices other than the display device, e.g. a locally connected printing device (not shown in FIG. 24).

Figure 25:
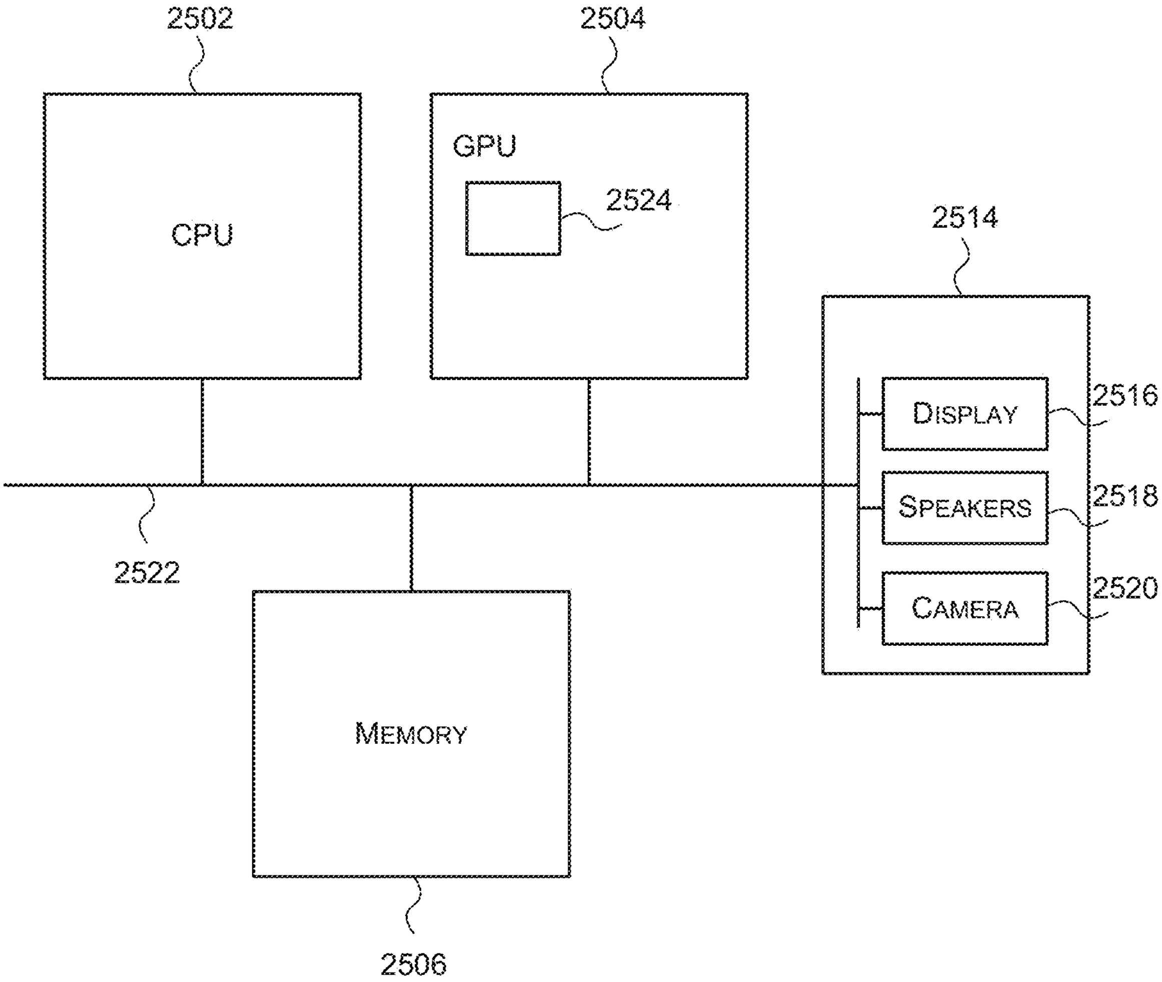
FIG. 25 is a block diagram of an example computer system in which the configurable pooling processing units and neural network accelerators described herein may be implemented.

FIG. 25 shows a computer system in which the configurable pooling processing units and/or the neural network accelerators described herein may be implemented. The computer system comprises a CPU 2502, a GPU 2504, a memory 2506 and other devices 2514, such as a display 2516, speakers 2518 and a camera 2520. A logic block 2524 (which may be a configurable pooling processing unit 500, or a neural network accelerator 2000 described herein) is implemented on the GPU 2504. The components of the computer system can communicate with each other via a communications bus 2522. In other examples, the logic block 2524 may be implemented on the CPU 2502, or independently connected to the communications bus 2522.

The configurable pooling processing unit 500, neural network accelerator 2000, crossbar 2020, convolution processing unit 2002, and convolution engine 2202 of FIGS. 5, 20, 21, 22 and 23 are shown as comprising a number of functional blocks. This is schematic only and is not intended to define a strict division between different logic elements of such entities. Each functional block may be provided in any suitable manner. It is to be understood that intermediate values described herein as being formed by the configurable pooling processing unit, neural network accelerator, crossbar, convolution processing unit or convolution engine need not be physically generated by that component at any point and may merely represent logical values which conveniently describe the processing performed by that component between its input and output.

The configurable pooling processing units, neural network accelerators, crossbars, convolution processing units, and convolution engines described herein may be embodied in hardware on an integrated circuit. The neural network accelerators described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a configurable pooling processing unit, or a neural network accelerator configured to perform any of the methods described herein, or to manufacture a neural network accelerator comprising any apparatus described herein. An integrated circuit definition dataset may be, for example, an integrated circuit description.

Therefore, there may be provided a method of manufacturing, at an integrated circuit manufacturing system, a configurable pooling processing unit or a neural network accelerator as described herein. Furthermore, there may be provided an integrated circuit definition dataset that, when processed in an integrated circuit manufacturing system, causes the method of manufacturing a configurable pooling processing unit or a neural network accelerator to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a configurable pooling processing unit or a neural network accelerator will now be described with respect to FIG. 26.

Figure 26:
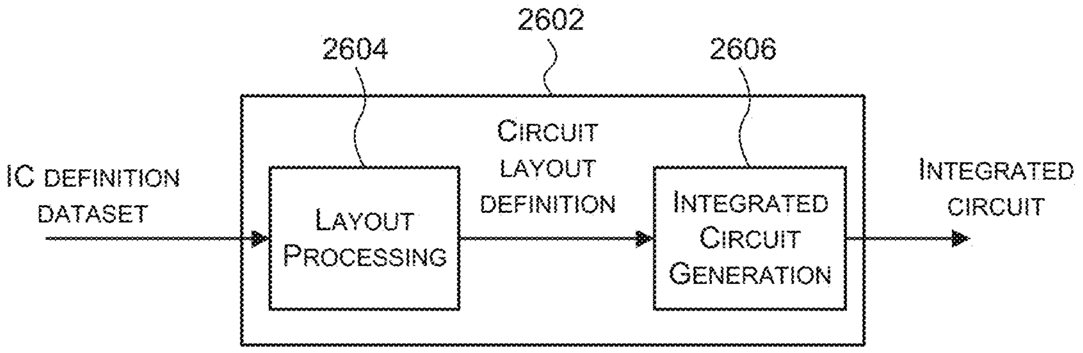
FIG. 26 is a block diagram of an example integrated circuit manufacturing system for generating an integrated circuit embodying the configurable pooling processing units and neural network accelerators described herein.

FIG. 26 shows an example of an integrated circuit (IC) manufacturing system 2602 which is configured to manufacture a configurable pooling processing unit or a neural network accelerator (or any component or unit thereof) as described in any of the examples herein. In particular, the IC manufacturing system 2602 comprises a layout processing system 2604 and an integrated circuit generation system 2606. The IC manufacturing system 2602 is configured to receive an IC definition dataset (e.g. defining a configurable pooling processing unit or a neural network accelerator (or any component or unit thereof) as described in any of the examples herein), process the IC definition dataset, and generate an IC according to the IC definition dataset (e.g. which embodies the configurable pooling processing unit or the neural network accelerator (or any component or unit thereof) as described in any of the examples herein). The processing of the IC definition dataset configures the IC manufacturing system 2602 to manufacture an integrated circuit embodying the configurable pooling processing unit or the neural network accelerator (or any component or unit thereof) as described in any of the examples herein.

The layout processing system 2604 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 2604 has determined the circuit layout it may output a circuit layout definition to the IC generation system 2606. A circuit layout definition may be, for example, a circuit layout description.

The IC generation system 2606 generates an IC according to the circuit layout definition, as is known in the art. For example, the IC generation system 2606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 2606 may be in the form of computer-readable code which the IC generation system 2606 can use to form a suitable mask for use in generating an IC.

The different processes performed by the IC manufacturing system 2602 may be implemented all in one location, e.g. by one party. Alternatively, the IC manufacturing system 2602 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a configurable pooling processing unit or a neural network accelerator (or any component or unit thereof) without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 26 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 26, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A neural network accelerator, comprising:

a plurality of hardware processing units, each hardware processing unit comprising hardware to accelerate performing one or more neural network operations on data, the plurality of hardware processing units comprising (i) a convolution processing unit configured to accelerate performing convolution operations on data, and (ii) a configurable pooling processing unit configured to selectively perform an operation of a plurality of selectable operations on data, the plurality of selectable operations comprising a depth-wise convolution operation and one or more different pooling operations; and a crossbar coupled to each hardware processing unit of the plurality of hardware processing units, the crossbar configured to selectively form, from a plurality of selectable pipelines, a pipeline from one or more of the hardware processing units of the plurality of hardware processing units to process input data to the neural network accelerator.

2. The neural network accelerator of claim 1, wherein at least two of the plurality of selectable pipelines comprises a same set of two or more hardware processing units of the plurality of hardware processing units in a different order.

3. The neural network accelerator of claim 1, wherein the one or more different pooling operations comprises an average pooling operation, a minimum pooling operation and/or a maximum pooling operation.

4. The neural network accelerator of claim 1, wherein the configurable pooling processing unit comprises one or more pool engines, each pool engine configurable to receive elements of a channel of an input tensor and generate one of a plurality of different types of channel outputs, the plurality of different types of channel outputs comprising a depth-wise convolution channel output and one or more pooling operation channel outputs.

5. The neural network accelerator of claim 4, wherein the one or more different pooling operations comprises an average pooling operation.

6. The neural network accelerator of claim 5, wherein each of the one or more pool engines comprises:

a reduction engine configurable to generate for a block of elements of a channel of the input tensor, one of a plurality of types of block outputs, the plurality of types of block outputs comprising a sum of elements in the block and a weighted sum of elements in the block; and a division engine configurable to selectively perform a division operation on the block output generated by the reduction engine;

wherein when an average pooling operation is to be performed on the input tensor, the reduction engine is configured to generate a sum of elements in the block and the division engine is enabled to divide the block output generated by the reduction engine by a number of elements in the block; and wherein when a depth-wise convolution operation is to be performed on the input tensor, the reduction engine is configured to generate a weighted sum for the block and the division engine is disabled.

7. The neural network accelerator of claim 6, wherein a block of elements comprises one or more rows of elements and one or more columns of elements, and the reduction engine is configured to generate a block output by generating column outputs and generating the block output from one or more column outputs.

8. The neural network accelerator of claim 7, wherein:

when an average pooling operation is to be performed on the input tensor, the reduction engine is configured to generate a sum for each column of a block, and generate the sum for the block by summing appropriate column sums, and when a depth-wise convolution operation is to be performed on the input tensor, the reduction engine is configured to generate a weighted sum for each column of a block, and generate the weighted sum for the block by summing appropriate column weighted sums.

9. The neural network accelerator of claim 6, wherein the reduction engine comprises:

a vertical pool engine configurable to receive a column of elements and generate one of a plurality of types of column outputs for that column;

a collector storage unit configured to temporarily store the column outputs generated by the vertical pool engine; and a horizontal pool engine configured to generate a block output from appropriate column outputs stored in the collector storage unit.

10. The neural network accelerator of claim 9, wherein:

when an average pooling operation is to be performed on the input tensor, the vertical pool engine is configured to receive a column of elements in a block and generate a sum of the received elements; and when a depth-wise convolution operation is to be performed on the input tensor, the vertical pool engine is configured to receive a column of elements in a block, and generate a plurality of weighted sums based on the received elements, each weighted sum based on a different set of weights.

11. The neural network accelerator of claim 1, wherein the configurable pooling processing unit is configured to receive an input tensor from the crossbar in one or more of a front end processing order and a partial back end processing order, the input tensor comprising a width dimension, a height dimension and a channel dimension;

wherein in the front end processing order elements of the input tensor are received in channel order, width order and height order on a block basis, each block comprising elements of the input tensor in a same channel and at a same height; and wherein in the partial back end processing order elements of the input tensor are received in a width order up to a maximum number of widths, channel order and height order on a block basis, each block comprising elements of the input tensor at a same height and a same width.

12. The neural network accelerator of claim 1, wherein the neural network accelerator is configured to process a neural network in a plurality of hardware passes of the neural network accelerator, wherein, in a hardware pass of the neural network accelerator, the neural network accelerator is configured to load input data into the neural network accelerator and process the input data via a pipeline of the plurality of selectable pipelines, and the crossbar is configured to receive, for a hardware pass, information identifying a pipeline of the plurality of selectable pipelines to be formed in that hardware pass.

13. The neural network accelerator of claim 1, further comprising a data input unit configurable to receive the input data to the neural network accelerator and output the received input data to an output port of the data input unit; wherein the output port of the data input unit is coupled to the crossbar and the crossbar is configured to selectively connect the output port of the data input unit to an input port of a hardware processing unit of the plurality of the hardware processing units.

14. The neural network accelerator of claim 13, further comprising a second data input unit configurable to receive the input data to the neural network accelerator and output the received input data to an output port of the second input data unit; wherein the output port of the second data input unit is coupled to the crossbar and the crossbar is configured to selectively connect the output port of the second data input unit to an input port of a hardware processing unit of the plurality of hardware processing units.

15. The neural network accelerator of claim 14, wherein the plurality of hardware processing units comprises an element-wise operations processing unit configured to accelerate performing one or more element-wise operations on a set of data, the element-wise operations processing unit configurable to perform the one or more element-wise operations using secondary input data; and the second data input unit is configurable to receive one of the input data to the neural network accelerator and the secondary input data.

16. The neural network accelerator of claim 1, wherein the plurality of hardware processing units comprises an activation processing unit configured to accelerate applying an activation function to data, and at least one other hardware processing unit of the plurality of hardware processing units comprises logic configured to apply an activation function to data generated by that hardware processing unit prior to outputting the generated data.

17. The neural network accelerator of claim 1, wherein the plurality of hardware processing units comprises a plurality of tensel rescale processing units, each tensel rescale processing unit configurable to receive a tensor comprising one or more channels, and quantise the received tensor on a per tensor or a per channel basis to an affine fixed point number format.

18. The neural network accelerator of claim 1, wherein the crossbar comprises a plurality of input ports, a plurality of output ports, and a plurality of multiplexors that selectively connect the input ports of the crossbar to the output ports of the crossbar.

19. A non-transitory computer readable storage medium having stored thereon a computer readable dataset description of the neural network accelerator as set forth in claim 1 that, when processed in an integrated circuit manufacturing system, causes the integrated circuit manufacturing system to manufacture an integrated circuit embodying the neural network accelerator.

20. A method of processing a neural network at a neural network accelerator, the neural network being processed in one or more hardware passes of the neural network accelerator, the method comprising, for at least one hardware pass of the one or more hardware passes:

receiving, at the neural network accelerator, information identifying a pipeline of a plurality of selectable pipelines, each pipeline of the plurality of selectable pipelines being formed of one or more hardware processing units of a plurality of hardware processing units, each hardware processing unit of the plurality of hardware processing units comprising hardware to accelerate performing one or more neural network operations on data, the plurality of hardware processing units comprising (i) a convolution processing unit configured to accelerate performing convolution operations on data, and (ii) a configurable pooling processing unit configured to selectively perform an operation of a plurality of selectable operations on data, the plurality of selectable operations comprising a depth-wise convolution operation and one or more different pooling operations;

dynamically connecting the one or more hardware processing units of the identified pipeline to form the identified pipeline; and processing input data for the hardware pass using the formed pipeline to generate processed data for the hardware pass.

* * * * *